United States Patent
Simone et al.

(10) Patent No.: US 6,470,562 B1
(45) Date of Patent: Oct. 29, 2002

(54) AUTOMATIC SCREENING MACHINE FOR CONTINUOUSLY APPLYING SPLINE TO A WINDOW SCREEN FRAME

(76) Inventors: Albert A. Simone, 110 Egel Ave., Middlesex, NJ (US) 08846; Lisa Simone, 110 Egel Ave., Middlesex, NJ (US) 08846

( * ) Notice: Subject to any disclaimer, the term of this patent is extended or adjusted under 35 U.S.C. 154(b) by 105 days.

(21) Appl. No.: 09/703,014

(22) Filed: Oct. 31, 2000

(51) Int. Cl.[7] .......................... B23P 21/00; B23P 23/00; B23P 11/00; B25B 29/14
(52) U.S. Cl. ..................... 29/564.6; 29/709; 29/243.5; 29/711; 29/281.4
(58) Field of Search ........................... 29/711, 709, 782, 29/712, 717, 243.5, 281.4, 564.6, 564.8, 235, 451, 721, 789; 269/71, 56, 58; 140/109

(56) References Cited

U.S. PATENT DOCUMENTS

| | | |
|---|---|---|
| 2,608,750 A | 9/1952 | Cluzel |
| 2,753,897 A | 7/1956 | Conrad |
| 3,017,698 A | 1/1962 | Hambrecht et al. |
| 3,623,211 A | 11/1971 | Zuhlke |
| 3,705,454 A | 12/1972 | Zuhlke |
| 3,851,684 A | 12/1974 | Wyrick |
| 4,307,503 A | 12/1981 | Auld et al. |
| 4,370,792 A | 2/1983 | Watts |
| 4,562,634 A | 1/1986 | Watts |
| 4,766,661 A | 8/1988 | Croteau |
| 4,856,171 A | 8/1989 | Croteau |
| 4,899,429 A | 2/1990 | Londono |
| 5,052,093 A | 10/1991 | Urlacher |
| 5,069,739 A | 12/1991 | Kautt |
| 5,072,496 A | 12/1991 | Radermacher |
| 5,127,143 A | 7/1992 | Urlacher |
| 5,261,540 A | 11/1993 | Sijsling |

Primary Examiner—S. Thomas Hughes
Assistant Examiner—John C. Hong
(74) Attorney, Agent, or Firm—Ezra Sutton

(57) ABSTRACT

An automated screening and splining apparatus for continuously seating an elongated flexible spline material in a screen frame having a screen retaining channel along first, second, third and fourth perimeter sides and corners of the screen frame and defining a spline sealing area within the screen retaining channel for receiving spline material therein, and the screen frame having first, second, third and fourth perimeter edges, comprising: (a) frame assembly; (b) slide carriage device mounted on the structural support device having first moving device for latitudinal movement along a y-axis between a third position and a second position, and for latitudinal movement along the y-axis between third position and fourth position; and the slide carriage device having second moving device for longitudinal movement along an x-axis between a second position and a third position, and for longitudinal movement along the x-axis between a fourth position and first position; and (c) a spline dispensing head assembly mounted on the slide carriage device for supplying the spline material to the screen retaining channel of the screen frame in a continuous splining cycle, as the slide carriage device move from the first position to the second position, to the third position, to the fourth position and then return to the first position in a continuous, uninterrupted cycle.

54 Claims, 31 Drawing Sheets

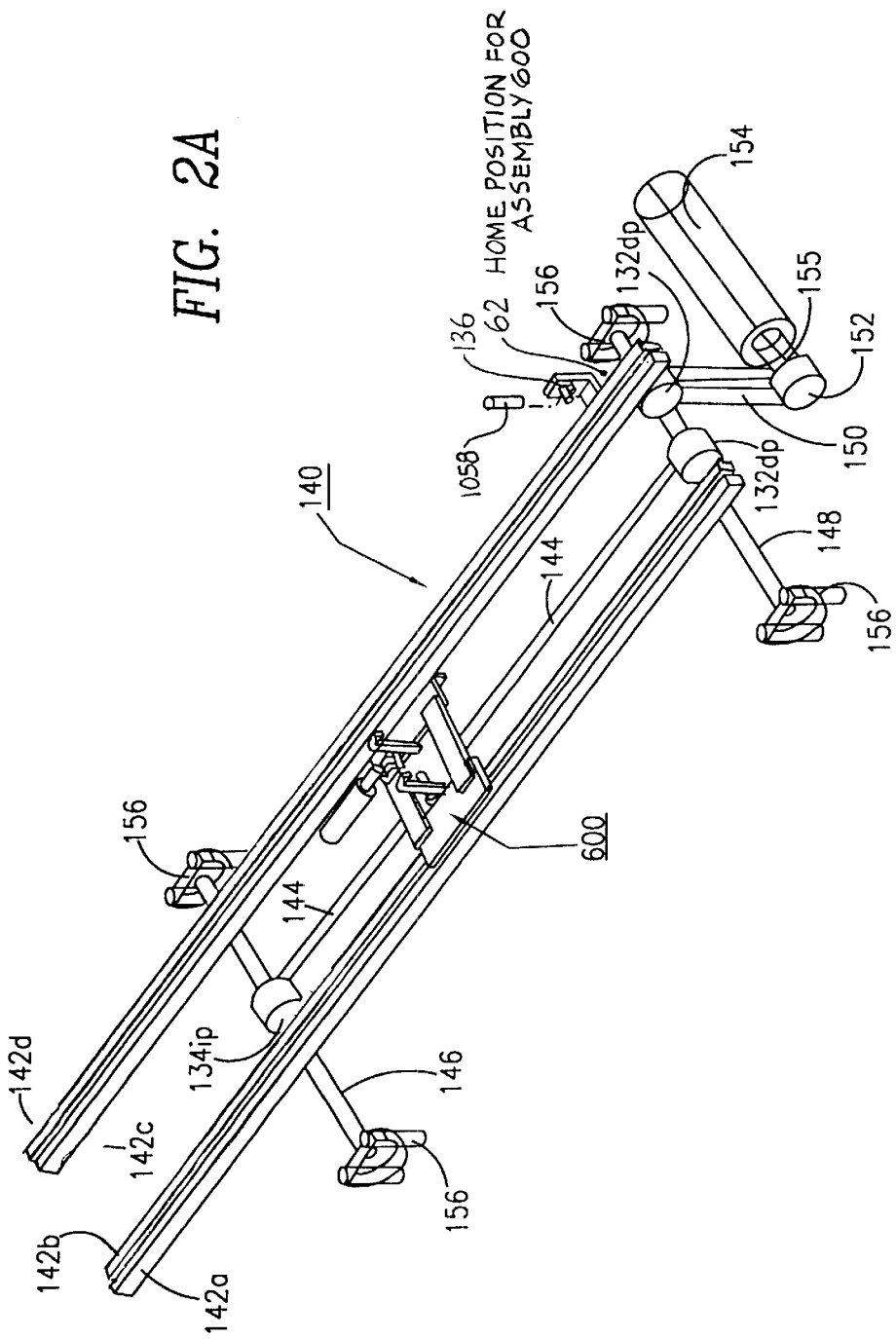

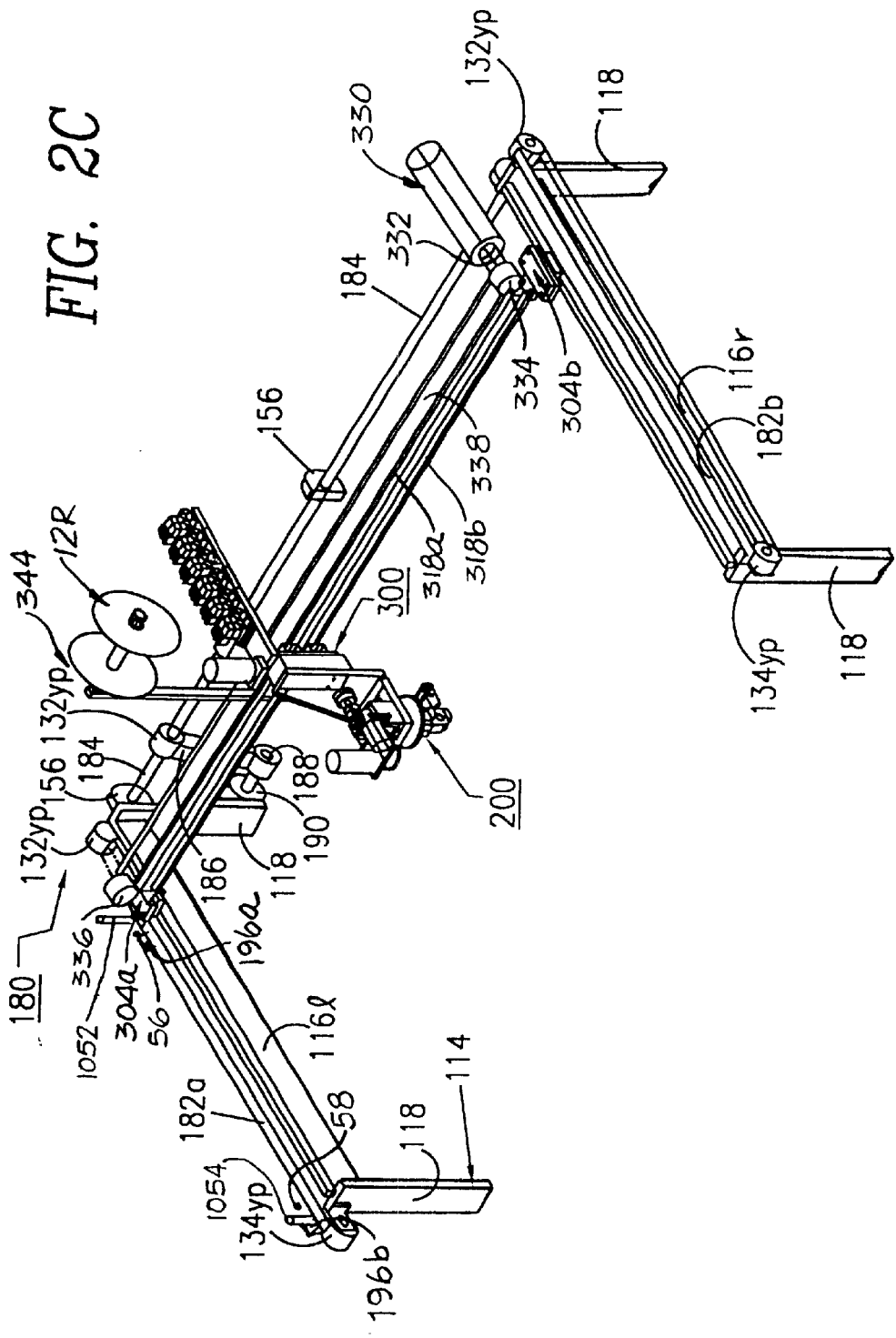

AUTOMATIC SCREENING MACHINE FOR CONTINUOUSLY APPLYING SPLINE TO A WINDOW SCREEN FRAME

FIELD OF THE INVENTION

This invention relates to an automated screening machine that automatically adjusts for different size window screen frames, and automatically clamps the window screen frame from the interior perimeter of the window screen frame to prevent bowing of the window screen frame. More particularly, the screening machine automatically inserts the spline and the screen into the spline groove on all four sides in one continuous cycle without turning of the window screen frame, such that one continuous piece of spline is inserted in the entire perimeter of the window screen frame, and the machine automatically trims the excess screen material from the window screen frame and the screen roll.

BACKGROUND OF THE INVENTION

Standard window screens for homes, offices, trailers, RV's and the like include a rectangular screen frame which consists of an aluminum or steel frame having a fiber mesh screen material made of nylon, metal, fiberglass, or plastic being held in place with flexible spline material made of rubber or soft plastic. The screen material is placed over the screen frame and the spline material is rolled into the grooved channel on the screen frame which tightly secures the screen mesh material to the screen frame. The prior practice for securing the spline material and fabric mesh screen to a screen frame included a rolling procedure or a spline-positioning procedure in which a small hand-held roller or a semi-automatic, but manually-operated, window screen assembly were used to accomplish the aforementioned task. These tools and devices for window screen assembly still require manual dexterity and physical strength in which to operate these appliances.

The use of this type of a manual tool or a semi-automatic manual device makes it difficult for prolonged production runs, as some of the operators developed arm-related medical injuries, such as tendinitis, which resulted in lost production time, lost wages and increased cost of goods manufactured.

Prior art automated window screen assembly devices for securing the spline material and the fabric mesh screen to a screen frame have complex clamping mechanisms which require the device to assure parallelism of the frame members. In addition, these automated devices have complex spline-loading and feeding mechanisms, such that the spline feed assembly and spline head assembly had to move at the same speed to apply spline to the screen frame correctly. Spline loading is complicated and the spline path followed is tortuous, as the spline feed assembly is powered. The spline feeding mechanisms of these automated devices have a round spline wheel for inserting the spline material into the spline grooved channel. This was not done effectively as the spline did not get pushed completely into the square corner. Further, these devices do not automatically detect frame size; so the operator had to know the exact size of the frame and program the frame size into the machine's computer component via a keyboard. In operation with many different sizes, this is very time-consuming and this step added to the cost of manufacture.

The existing automatic window screen devices have other ineffective operational steps where the screen material was cut from the screen roll only when the screen was completely splined which added to the cost of manufacture. In summary, the existing automatic window screen assembly devices are overly complex, bulky, and ineffective in operation which increase the cost of manufacture.

There remains a need for an automated window screening assembly machine that will automatically adjust for different size window screen frames, and will automatically clamp the window screen frame from the interior perimeter of the window screen frame to prevent bowing of the window screen frame. Additionally, the screening machine should automatically insert the spline and the screen material into the spline groove on all four sides in one uninterrupted cycle without turning of the window screen frame, such that one continuous piece of spline is inserted in the entire perimeter of the window screen frame, and the machine should automatically trim the excess screen material from the window screen frame and the screen roll. Further, the automated window screening assembly machine should be of simple design for ease of manufacturing, which will increase productivity and lower the cost of manufacture of a window screen.

DESCRIPTION OF THE PRIOR ART

Window screen assembly apparatus of various designs, structures, styles ad materials of construction have been disclosed in the prior art. For example, U.S. Pat. No. 4,899,429 to Londono is directed to a hand tool for installing a pliable spline in a screen frame. The tool includes a front roller having a convex edge for pushing the screen into the channel of a screen frame, and a back roller having a concave edge for pushing the spline material into the channel over the screen.

U.S. Pat. Nos. 5,052,093 and 5,127,143 to Urlacher are directed to apparatus for inserting a flexible spline into a screen frame. The apparatus includes a carriage which is slidably mounted along one edge of a horizontal tabletop. The carriage includes a roller mounted on a bracket assembly which may be raised or pivoted between an upper inoperative position and a lower operative position With the carriage in the proper inoperative position, a screen frame is placed against the edge of the table and the screen material is positioned over the frame. The carriage is then moved to one end of the frame and lowered into the operative position, whereby the edge of the roller forces the screen material and a spline into a channel in the frame. The carriage is then manually moved along the length of the frame to the opposite end, whereupon it is moved to the inoperative position, the screen frame is rotated 90 degrees, and the carriage is again lowered into its operative position to push the spline and screen material into the channel in the end of the frame. The procedure is repeated for the remaining two sides of the screen frame. Excess screen material is manually removed with a knife blade, and the spline is also cut manually with a knife blade after the screen has been completed.

U.S. Pat. No. 5,069,739 to Kautt is directed to an automated machine for fitting and cutting the seals of a window. The apparatus includes a carriage which is mounted on a gantry for movement in two directions in a horizontal plane. A manipulator head is mounted to the carriage via a vertical shaft for rotation among four positions oriented at 90 degrees to one another. One unit of the manipulator head includes a seal fitting roller and a guide roller, as well as a device for cutting the seal at the desired length. The other unit of the manipulator head includes a suction chamber which is pivotally mounted thereto, the suction chamber serving to hold the seal after it is cut, to bend it and to press it against the surface of the window frame. Each unit is independently moveable by a rack and pinion system. The First unit in a lowered position applies the seal to the window frame and, after a certain length of travel of the manipulator head, the second unit is lowered into contact with the already deposited seal. As the manipulator head nears the end of its travel, the first unit is raised and the cutting device is actuated to cut the seal which is then held against the suction chambers of both units. Subsequently, the suction chamber of the second unit is pivoted downwardly to press the cut end of the seal against the window frame. The entire manipulator head is then rotated 90 degrees and the procedure is repeated.

U.S. Pat. No. 2,753,897 to Conrad discloses a device for assembling framed screens. According to this reference, the apparatus consists of a rectangular support surface having vertically moveable floating carriers that are disposed along the perimeter thereof. A spline 84 is positioned in the channel between the vertically moveable carriers and a piece of screening cut to the proper size is then placed on the support surface overlying the splines. The screen frame is then placed above the sheet of screening so that the grooves are aligned above the spline. The entire assembly is then slid beneath a platen which presses the frame downward, forcing the edges of the screening and the splines into the grooves in one action. Once the platen is raised, the completed screen is removed from the support surface and the entire process is repeated for the next screen.

U.S. Pat. No. 3,851,684 to Wyrick discloses an apparatus for automatically assembling a flexible sheet of material, such as screening, to a frame. The apparatus consists of a work table to which a frame is secured in a stationary position. A length of screen material is pulled across the frame where it is temporarily clamped in place and tensioned. A first moveable carriage having a first pair of pressing rollers traverses a first pair of opposed parallel frame members, pressing the edges of the screen material into the spline grooves disposed therein. Once this step has been completed, the first moveable carriage reverses direction and returns to the starting position, during which time a second moveable carriage having a second pair of pressing rollers is activated to travel in a transverse direction, the second pair of pressing rollers pressing the transverse edges of the screen material into the spline grooves located in the second pair of parallel frame members. This patent is silent both as to how the length of screen is cut from the supply spool and how the excess screen is trimmed from the edges of the frame.

U.S. Pat. No. 4,766,661 to Croteau discloses another apparatus for automatically attaching a fabric material to a rectangular frame. The apparatus consists of a planar frame support surface disposed on a support structure. Two pairs of opposed parallel frame-engaging members include gripping means for holding the frame members securely in place.

Two of the frame engaging members transverse to one another are displaceable to assure that the individual frame members are assembled in a parallel manner. A length of screen material is positioned over the frame to overlie the spline grooves located in the frame members. A spline positioner is then actuated to position and push the spline into the retention groove, while at the same time trimming the excess screen material along the exterior of the groove.

A control module programmed with the dimensions of the rectangular frame controls the movement of the spline positioner so that a the spline positioner reaches a corner of the frame the spline positioner is lifted, rotated 90° and lowered to press the edge of the screen and spline into the adjacent frame member. When a predetermined length of spline corresponding to the perimeter dimension of the rectangular frame has been fed through the spline positioner, the spline is severed. A separate cutting device cuts the screen across its width to sever the finished screen from the supply roll of screen material. U.S. Pat. Nos. 5,666,773 and 5,787,657 to Librande et al disclose a method and apparatus for securing a screen to a window frame. The window screen includes operator elements that secure the window screen relative to a window frame. A pair of single rail operators releasably secure the upper end of the screen relative to the upper end of the window frame. A pair of double rail operators releasably secure the lower end and sides of the screen relative to the lower end and sides of the window frame.

U.S. Pat. No. 5,794,328 to Simone discloses a splining apparatus for seating an elongated flexible spline in the screen retaining channel of a screen frame to secure flexible screen material thereto, including a work support assembly for receiving and holding the screen fame, and a carriage assembly for longitudinal movement between a first position and a second position. The splining apparatus also includes an electronic sensor for sensing he end of the screen frame and for stopping the movement of the spline head assembly at the second position.

None of these prior art patents show or teach the improved automated screening machine of the present invention for continuously applying spline to a window screen frame having these improved features for automatically adjusting for different size window screen frames; for automatically clamping the window screen frame from the interior perimeter of the screen frame to prevent bowing of the frame; for automatically inserting the spline and the window screen into the spline groove on all four sides of the window screen frame in one cycle without turning the frame; for automatically inserting one continuous piece of spline around the perimeter of the window screen frame; and for automatically trimming the excess screen material from the window screen frame and the screen roll.

Accordingly, it is an object of the present invention to provide an improved automatic window screening machine that continuously and automatically applies spline to a window screen frame.

Another object of the present invention is to provide an automated window screening machine that automatically adjusts for different sized window screen frames.

Another object of the present invention is to provide an automated window screening machine that automatically clamps the window screen frame from the interior perimeter of the screen frame to prevent bowing of the window screen frame.

Another object of the present invention is to provide an automated window screening machine that automatically inserts the spline and the window screen material into the spline groove on all four sides of the window screen frame in one cycle without turning the window screen frame.

Another object of the present invention is to provide an automated window screening machine that automatically inserts one continuous piece of spline in the entire perimeter of the window screen frame.

Another object of the present invention is to provide an automated window screening machine that automatically trims the excess window screen material from the window screen frame and the screen roll.

A further object of the present invention is to provide an automated window screening machine that is simple to manufacture and assemble; and is also more cost efficient in operational use than previous automated window screening machines.

SUMMARY OF THE INVENTION

In accordance with the present invention, there is provided an automated screening and splining apparatus for continuously seating an elongated flexible spline material in a screen frame having a screen retaining channel along the first, second, third and fourth perimeter sides and corners of the screen frame and defining a spline sealing area within the screen retaining channel for receiving spline material therein, and the screen frame having first, second, third and fourth perimeter edges. The apparatus includes a frame assembly having a work support for receiving and holding the screen frame thereon; the frame assembly includes a rectangular-shaped structural support in the form of horizontal and vertical frame members, and a splining head slide assembly mounted on the horizontal frame members having a first servomotor for latitudinal movement along a y-axis between a first position and a second position, and for latitudinal movement along the y-axis between a third position and fourth position; and the splining head slide assembly having a second servomotor for longitudinal movement along an x-axis between a second position and a third position, and for longitudinal movement along the x-axis between a fourth position and a first position.

The apparatus also includes a screen roll holder assembly supplying screen material, the holder assembly is attached to the frame assembly; and a spline holder for supplying spline material, the spline holder is attached to the splining head slide assembly. The apparatus further includes a plurality of frame clamping assemblies for holding at least one perimeter edge of the screen frame in position prior to and during the screening and splining cycle; and a plurality of bracing guides for immobilizing at least one perimeter edge of the screen frame in position prior to the screening and splining cycle. In addition, the apparatus also includes a spline dispensing head assembly mounted on the splining head slide assembly for supplying the spline material to the screen retaining channel of the screen frame in a continuous splining cycle, the splining head slide assembly moves from the first position to the second position, to the third position, to the fourth position, and then returns to the first position in a continuous, uninterrupted cycle. The spline dispensing head assembly includes a spline feed sub-assembly for feeding the spline material and the screen material into the screen retaining channel of the screen frame as the splining head slide assembly and the spline dispensing head assembly moves along the first, second, third and fourth perimeter sides of the screen frame.

The spline dispensing head assembly also includes a rotating spline wheel sub-assembly for inserting and seating the spline material and the screen material into the screen retaining channel as the splining head slide assembly and the spline dispensing head assembly moves along the first, second, third and fourth perimeter sides and corners of the screen frame in a 90° degree arc in a continuous cycle during the splining process. The spline dispensing head assembly further includes a screen cutter sub-assembly for cutting the screen material as the screen cutter sub-assembly moves along the first, second, third and fourth perimeter sides, and for severing the spline material at the fourth position adjacent to the first corner after the spline material and screen material have been seated in the screen retaining channel of the screen frame. The apparatus further includes a x-axis frame sizing sensor for sensing and referencing the end of the screen frame at the fourth position adjacent to the first corner of the screen frame for stopping the movement of the spline dispensing head assembly at the fourth position.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein:

FIG. 2A is a front perspective view of the automated screening machine of the present invention showing the clamp carriage sub-assembly and its component parts of the frame assembly in an assembled state;

FIG. 2C is a front perspective view of the automated screening machine of the present invention showing the sliding carriage sub-assembly and its component parts of the frame assembly in an assembled state;

DETAILED DESCRIPTION OF THE PREFERRED EMBODIMENT

Overview

Figure 1:
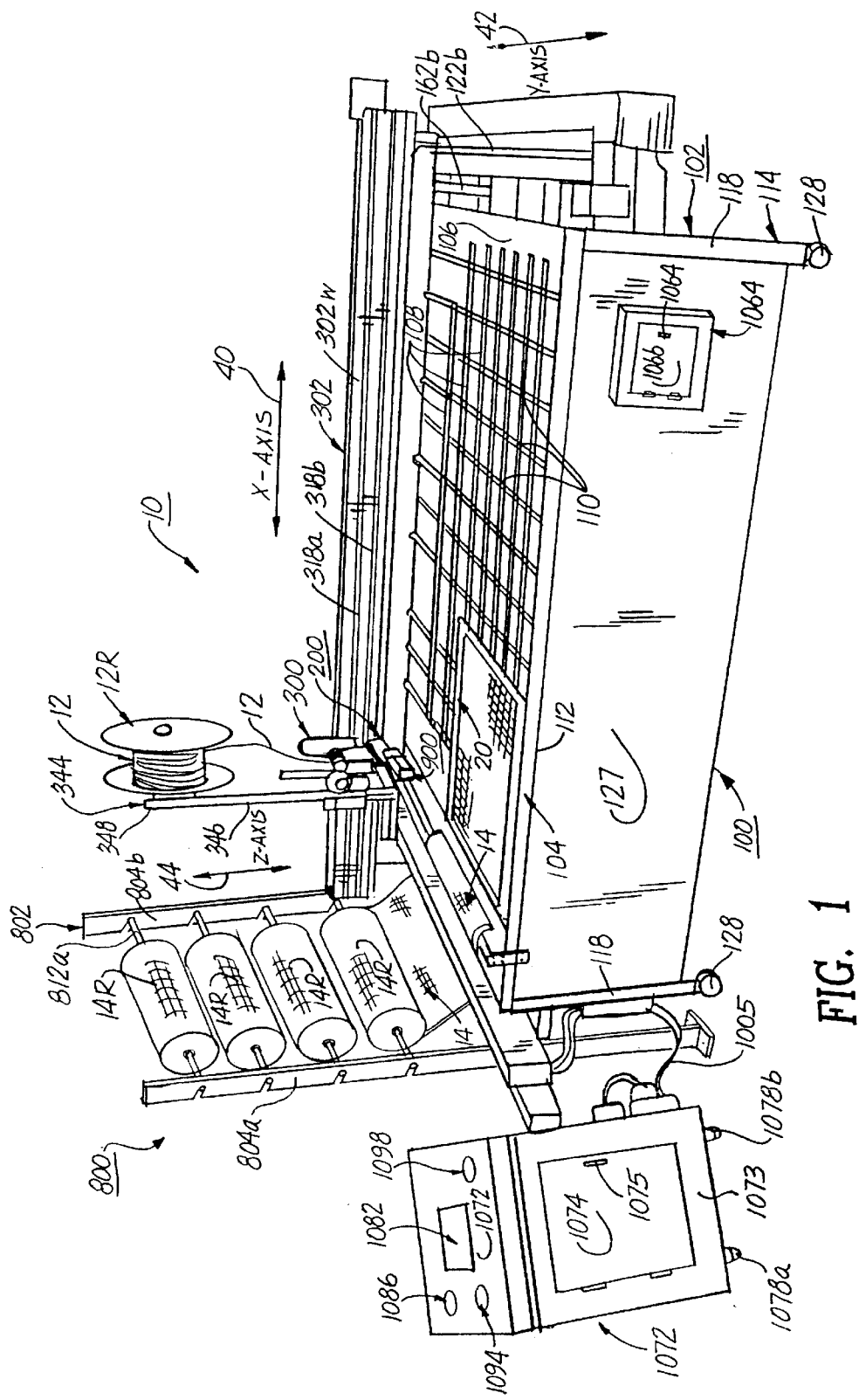
FIG. 1 is a front perspective view of the automated screening machine of the preferred embodiment of the present invention showing the major component assemblies contained therein and in operational use.

The automatic screening apparatus/machine 10 and its component assemblies of the preferred embodiment of the present invention are represented in detail by FIGS. 1 through 27 of the patent drawings. The automatic screening apparatus 10 is used for the continuous applying of spline material 12 and screen material 14 into a screen retaining channel 18 of an aluminum window screen frame 16 in order to form a trimmed screened window frame 20. Apparatus 10 applies the splining material 12, as shown in FIGS. 23, 25, 26 and 27 of the drawings, starting at the home position 30 of the first corner 32 of window screen frame 16, and proceeds to insert the splining material 12 and the screening material 14 into the screen retaining channel 18 along the first, second, third and fourth perimeter sides 22, 24, 26 and 28, as well as the first, second, third, and fourth corners 32, 34, 36 and 38, respectively, of window screen frame 16 in a continuous uninterrupted motion via the spline dispensing head assembly 200 for forming the trimmed screened window frame 20.

Figure 2:
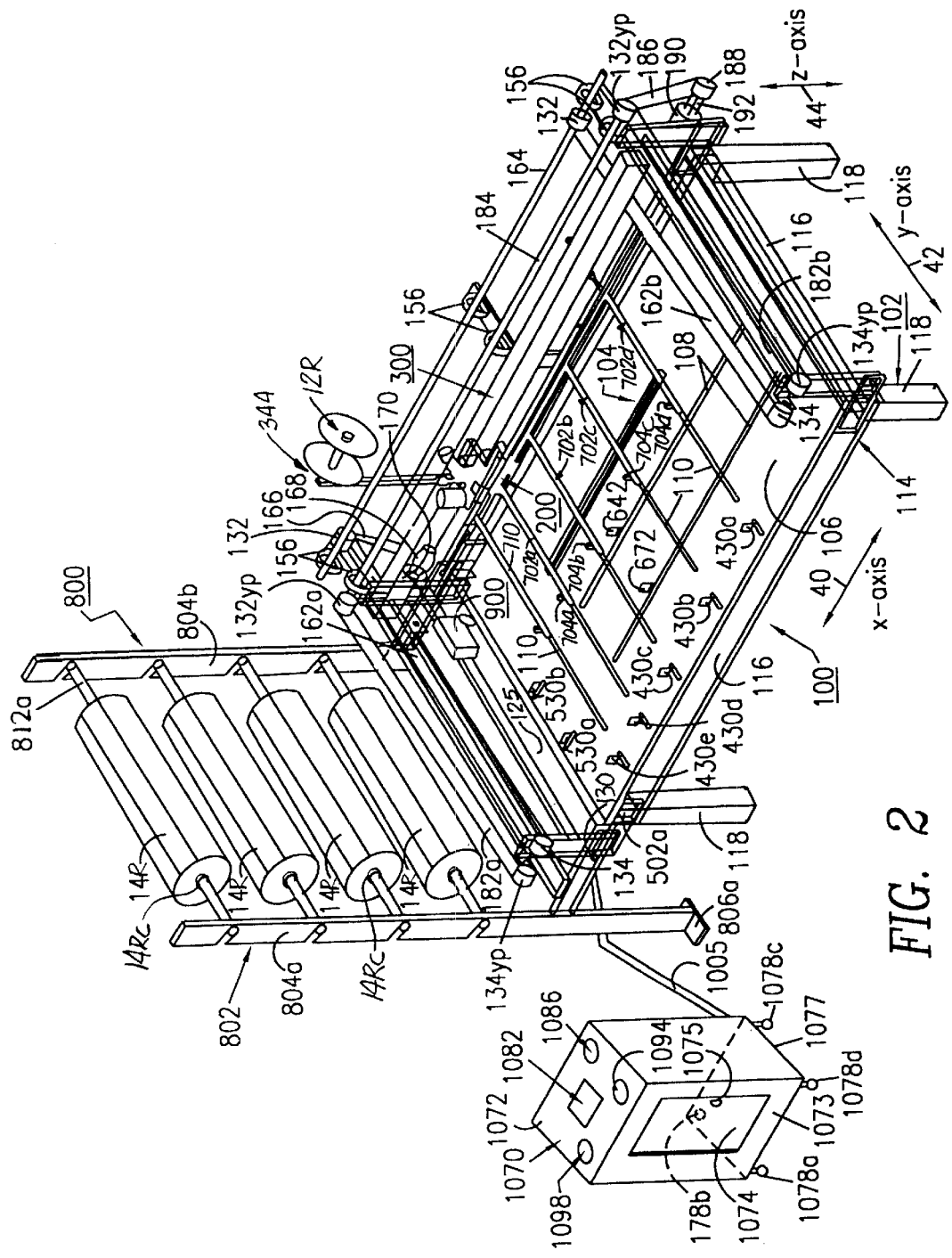
FIG. 2 is a front perspective view of the automated screening machine of the present invention showing the frame assembly and its component parts contained therein and in an assembled state.
Figure 3:
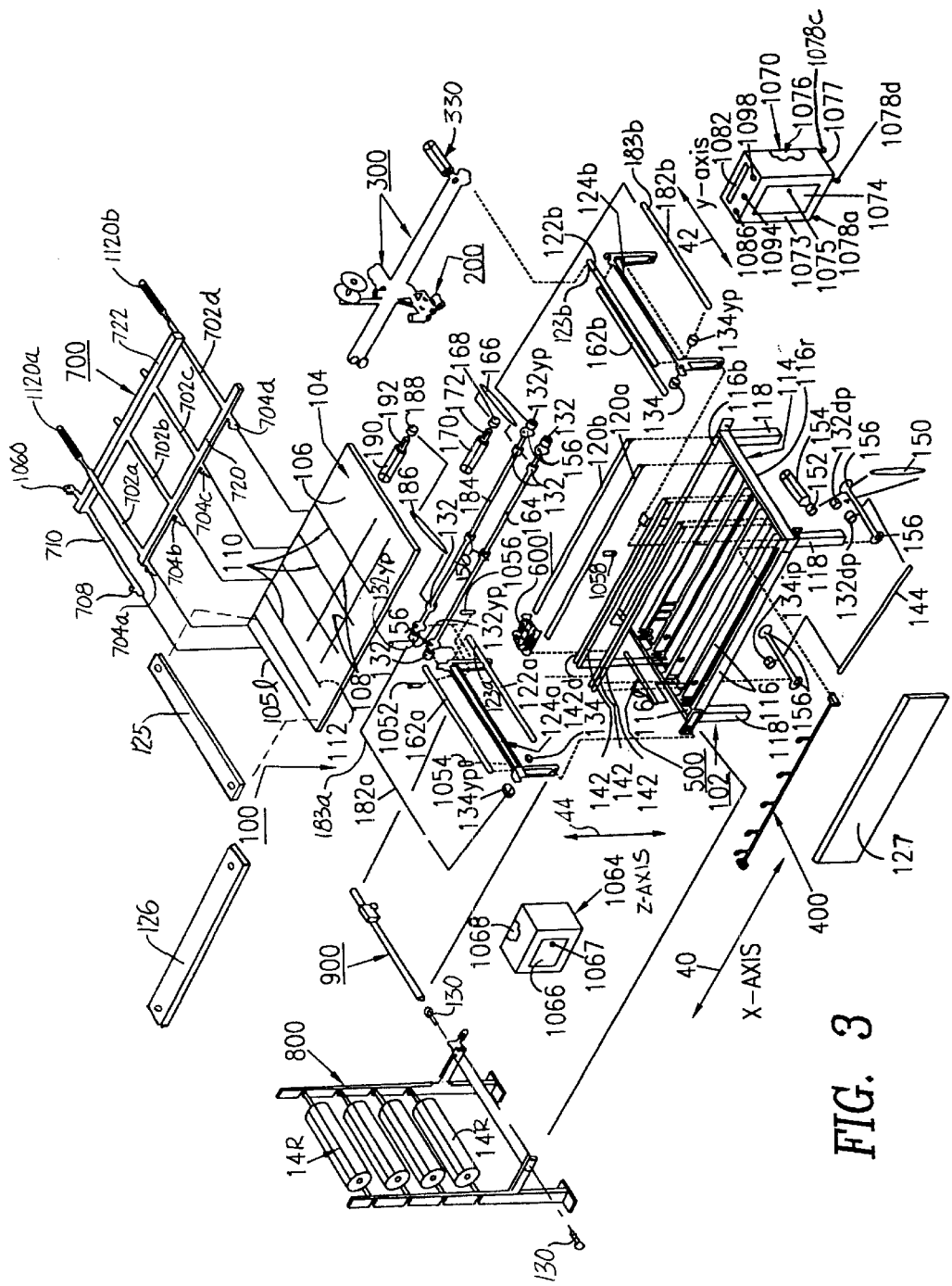
FIG. 3 is an exploded front perspective view of the automated screening machine of the present invention showing the frame assembly and its component parts contained therein and in an unassembled state.

The automatic screening apparatus 10, as shown in FIGS. 1 through 3 of the drawings, includes a frame assembly 100 for mounting the spline dispensing head assembly 200 thereon, a splining head slide assembly 300, a front clamping finger assembly 400, a left side clamping assembly 500, a right side clamping slide carriage assembly 600, a rear side frame clamping assembly 700, a screen tensioning and screen roll holder assembly 800, a screen roll cutter assembly 900, an electronic control system 1000 and an electro-pneumatic control system 1100.

Frame Assembly 100

The frame assembly 100 is used for the precise holding and placement of a window screen frame 16 on the horizontal splining tabletop 104 of frame housing 102 by the various clamping assemblies 400, 500, 600 and 700, as shown in FIGS. 1 to 3 and 24 to 27. Frame assembly 100 is also used to movably mount the spline dispensing head assembly 200 in the y-axis direction in order to initiate the screening process cycle. Frame housing 102 includes the splining tabletop 104 and the machine base main frame 114.

Figure 22:
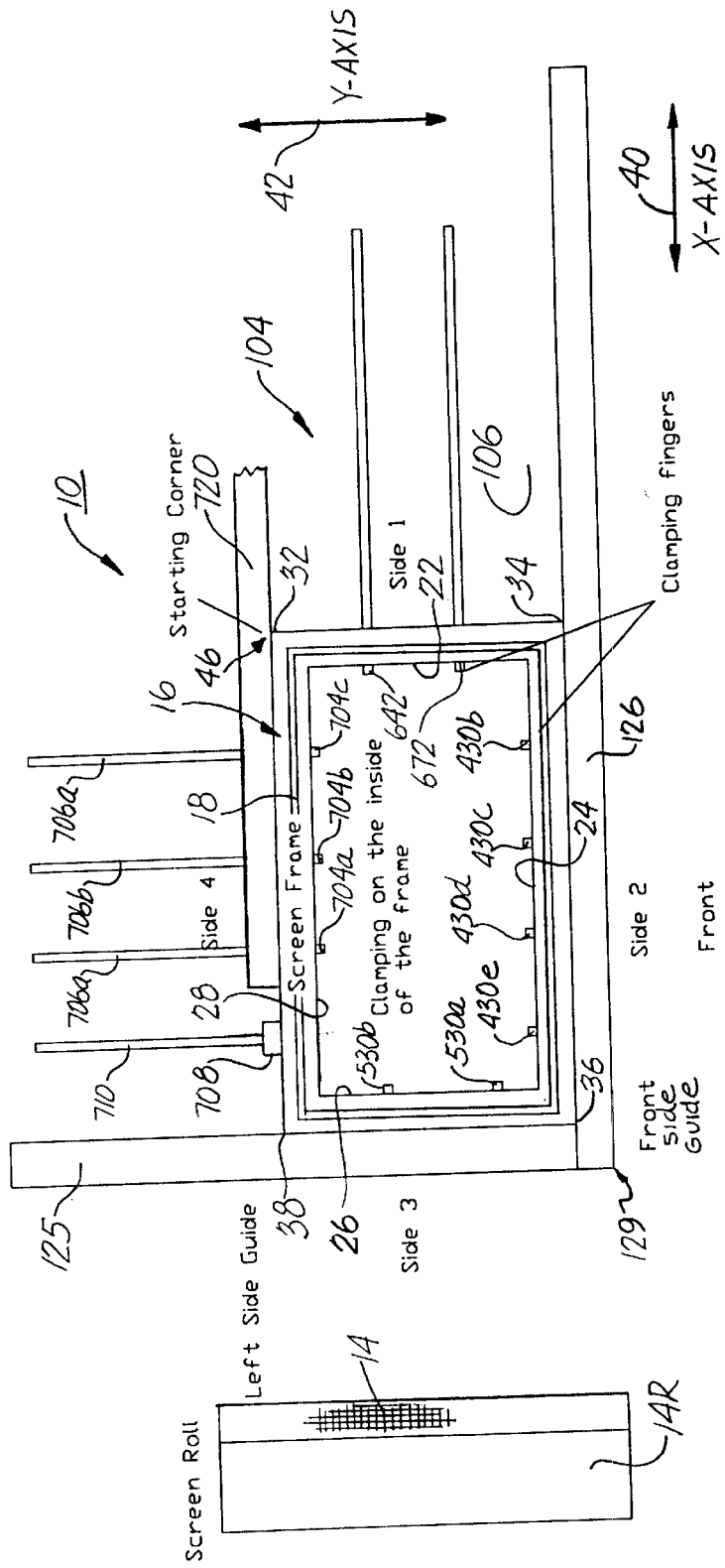
FIG. 22 is a schematic diagram of the automated screening machine of the present invention showing the clamping sequence for holding the screen frame in place prior to the start-up of the screening cycle.

The splining tabletop 104 includes an upper wall surface 106 having a plurality of longitudinal (x-axis) and latitudinal (y-axis) surface wall grooved channels 108 and 110, respectively, therein, which are used for the housing of the various clamping assemblies 400, 500, 600 and 700, therein being used for the holding and placement of the window screen frame 16 against the upper wall surface 104 of the splining tabletop 104. The upper wall surface 106 of splining tabletop 104 also include a left side guide 125 and a front side guide 126 being mounted and aligned with the left side edge 105*l* and the front side edge 105*f*, respectively, of splining tabletop 104, as depicted in FIGS. 2, 3 and 22 of the drawings. The left side guide 125 and front side guide 126 form an L-shaped guide brace 129 being a perfectly squared (a 90° angle) inner corner in which to square the left side 26 and the front side 24 and third corner 36 of screen frame 16 prior to the clamping cycle. The L-shaped guide brace 129 is outwardly movable from the second perimeter side 24, the third perimeter corner 36 and the third perimeter side 26 in order for the spline head dispensing assembly 200 and the splining head slide assembly 300 to move along the first, second, third and fourth perimeter sides 22, 24, 26 and 28 and perimeter corners 32, 34, 36 and 38 on the screen frame 16 in a continuous cycle during the splining and screening process. Splining tabletop 104 also includes a bottom (underside) wall surface 112 for connecting to the machine base main frame 114. Machine base main frame 114 includes a front cover panel 127.

The splining tabletop 104 is supported by a machine base main frame 114. The base main frame 114 is used for the mounting of all of the various assemblies. The base main frame 114 is constructed by a plurality of horizontal and vertical frame members 116 and 118, respectively, that are welded together, as shown in FIGS. 1 through 3 of the drawings. Each outer vertical frame member 118 includes a leveling castor 128 thereon for leveling of the splining tabletop 104, as well as for moving apparatus 10 from one location to another location. The underside wall surface 112 of splining tabletop 104 includes a plurality of tabletop mounting brackets 120*a* and 120*b* for mounting the splining tabletop 104 to the machine base main frame 114 thereto. The tabletop mounting brackets 120*a* and 120*b* are connected to base main frame 114 and are connected to the bottom (underside) wall surface 112 of splining tabletop 104 via screws 138. Frame assembly 100 also includes a pair of y-axis slide rails 122*a* and 122*b* (left side slide rail 122*a* and right side slide rail 122*b*) being mounted and attached to the base main frame 114 by a pair of slide rail support brackets 124*a* and 124*b* (left side support bracket 124*a* and right side support bracket 124*b*), respectively, via bolts 130. The y-axis slide rails 122*a* and 122*b* are used for allowing the movement of the splining head slide assembly 300. Additionally, frame assembly 100 further includes a plurality of drive belt pulleys 132 and idler pulleys 134 (not motor driven) being attached to the various assemblies 100, 300, 600 and 700 by shoulder bolts 130*s*. The base main frame 114 includes three (3) essential sub-assemblies for interconnecting and interacting with the aforementioned assemblies 100, 300, 600 and 700, which include a clamping carriage sub-assembly 140, a rear frame clamping sub-assembly 160, and a sliding carriage sub-assembly 180.

The base main frame 114 includes a clamping carriage sub-assembly 140 being used for moving the (right side) clamping slide carriage assembly 600 in the x-axis direction 40, as shown in FIG. 2A of the drawings. The clamping carriage sub-assembly 140 includes a plurality of clamping carriage guide rails 142*a*, 142*b*, 142*c* and 142*d*, a clamping carriage drive belt 144, a clamping carriage idler bar 146, a clamping carriage drive bar 148, a clamping carriage drive bar belt 150, a clamping carriage drive pulley 152, a clamping carriage servomotor 154 having a motor shaft 155 thereon, a clamping carriage home sensor 1058, drive belt pulleys 132, and idler belt pulleys. The clamping carriage sub-assembly is attached and connected to the machine base main frame 114 by means of bearing blocks 156 and bolts 130, wherein the bearing blocks 156 are mounted to the machine base main frame 114 by bolts 130. Further, the plurality of clamping carriage guide rails 142*a* to 142*d* are also mounted to the machine base main frame 114 by bolts 130 or by welding.

The plurality of clamping carriage guide rails 142*a* to 142*d* are used to support and guide the clamping slide carriage assembly 600, as depicted in FIG. 2A of the drawings. The clamping carriage drive belt 144 is used to drive the clamping slide carriage assembly 600 in the x-axis direction 40. The clamping carriage drive belt 144 is connected to the clamping slide carriage assembly 600 by means of a clamping plate 158. The clamping carriage drive belt 144 is also positioned around the clamping carriage drive bar pulleys 132*dp* and the clamping carriage idler bar pulley 134*ip*. The clamping carriage idler bar 146 and the clamping carriage drive bar 148 are used to also move the clamping slide carriage assembly 600 in the x-axis direction 40. The idler bar 146 and drive bar 148 are both connected to the base main frame 114 by the bearing blocks 156 via bolts 130. Both the idler bar 146 and drive bar 148 are rotated by the clamping carriage drive belt 144 which in turn serves to move the clamping slide carriage assembly 600 in the x-axis direction 40.

The clamping carriage drive bar belt 150 is positioned around the clamping carriage drive bar 148, as well as the clamping carriage servomotor 154 and is also used to drive the clamping slide carriage assembly 600 in the x-axis direction 40. The clamping carriage drive pulley 152 is connected to the motor shaft 155 of clamping carriage servomotor 154 and is used to rotate the clamping drive bar belt 150. The clamping carriage servomotor 154 is connected to the machine base main frame 114 by screws 138 and is the moving means for guiding and positioning the clamping slide carriage assembly 600 in the x-axis direction 40. The clamping carriage home sensor 1058 is used to sense and reference the home position 30 of the clamping slide carriage assembly 600. The clamping carriage home sensor 1058 is attached and connected to the base main frame 114 by a mounting bracket 136.

Figure 2B:
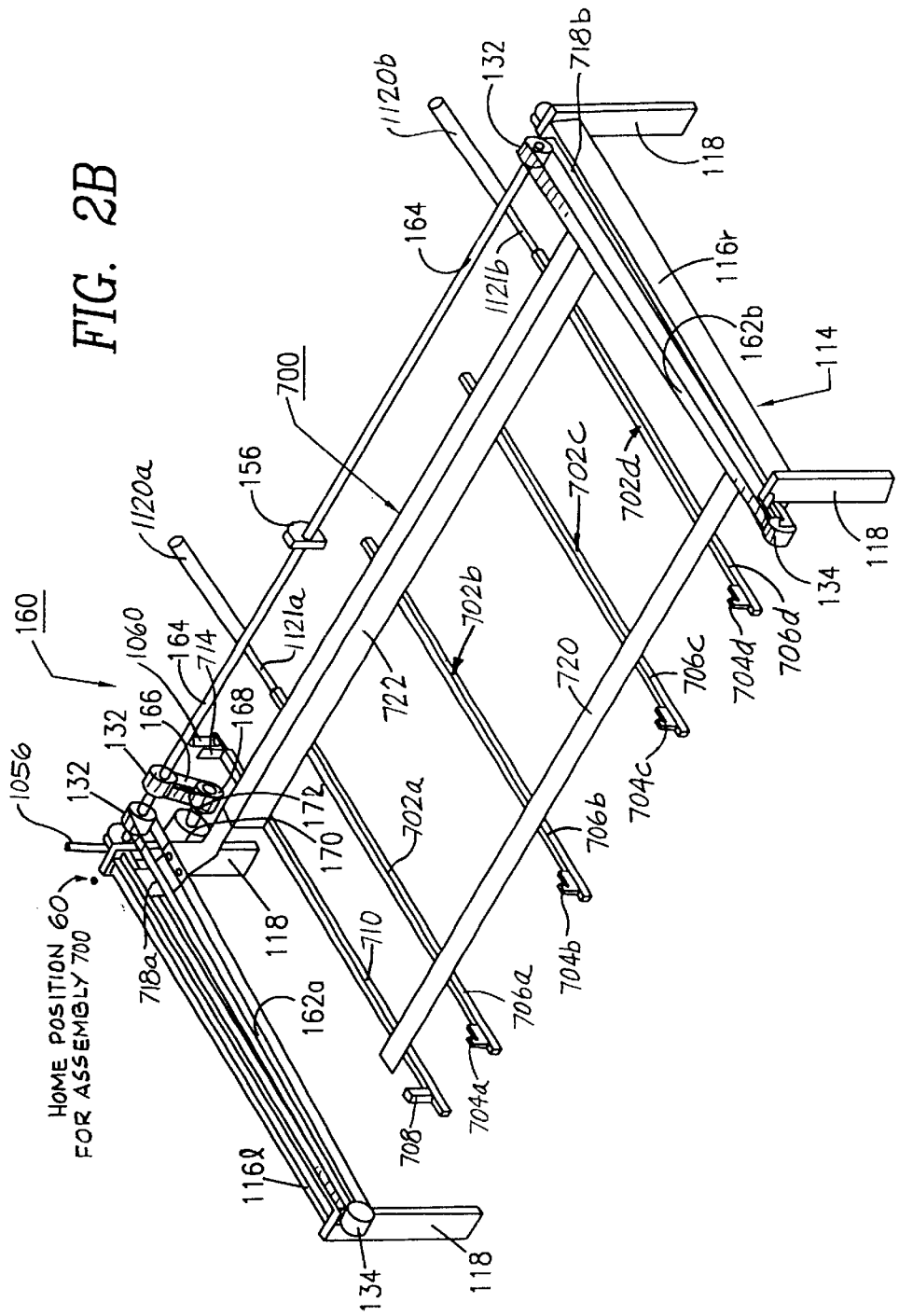
FIG. 2B is a front perspective view of the automated screening machine of the present invention showing the rear frame clamping sub-assembly and its component parts of the frame assembly in an assembled state.

The base main frame 114 also include a rear frame clamping slide sub-assembly 160 being used for moving the (rear side) frame clamping assembly 700 in the y-axis direction 42, as shown in FIG. 2B of the drawings. The rear frame clamping slide sub-assembly 160 includes a pair of rear frame clamping slide drive belts 162*a* and 162*b*, idler bar pulleys 134, a rear frame clamping slide drive bar 164, a rear frame clamping slide drive bar belt 166, a rear frame clamping slide drive pulley 168, a rear frame clamping slide servomotor 170, drive bar pulleys 132, and a rear frame clamping slide home sensor 1056. The rear frame clamping slide sub-assembly 160 is mounted and attached to the machine base main frame 114 by means of bearing blocks 156 and bolts 130, wherein the bearing blocks 156 are mounted to the machine base main frame 114 by bolts 130.

The pair of rear frame clamping slide drive belts 162*a* and 162*b* are used to move the rear frame clamping assembly 700 in the y-axis direction 42. Each of the rear frame clamping slide drive belts 162*a* and 162*b* are positioned around the rear frame clamping slide idler bar pulleys 134 and rear frame clamping slide drive bar pulleys 132. The rear frame clamping slide drive belts 162a and 162b are attached and connected to the rear frame clamping assembly 700 by a pair of clamping plates 158. The rear frame clamping slide drive bar 164 is used to move the rear frame clamping slide drive belts 162a and 162b. The rear frame clamping slide drive bar 164 is mounted to the machine base main frame 114 by bearing blocks 156.

The rear frame clamping slide drive bar belt 166 is also used to move the rear frame clamping assembly 700 in the y-axis direction 42. The rear frame clamping slide drive bar belt 166 is connected to the rear frame clamping assembly 700 by clamping plates 158. The rear frame clamping slide drive bar belt 166 is positioned around the drive bar pulley 132 and the rear frame clamping slide drive pulley 168. The rear frame clamping slide drive pulley 168 is used in conjunction with the rear frame clamping slide servomotor 170 to rotate the rear frame clamping slide drive bar 164. The drive pulley 168 is mounted to the shaft 172 of the rear frame clamping slide servomotor 170. Servomotor 170 is also used in the moving of the rear frame clamping assembly 700 in the y-axis direction 42. Servomotor 170 is mounted to the machine base main frame 114 by a pair of mounting brackets 136. The rear frame clamping slide home sensor 1056 is used to sense and reference the home position 30 of the rear frame clamping assembly 700. The rear frame clamping slide home sensor 1056 is mounted and connected to the base main frame 114 by a mounting bracket 136.

The base main frame 114 further includes a sliding carriage sub-assembly 180 being used for moving the splining head slide assembly 300 in the y-axis direction 42, as shown in FIG. 2C of the drawings. The sliding carriage sub-assembly 180 includes a pair of sliding carriage y-axis drive belts 182a and 182b, idler bar pulleys 134, a sliding carriage y-axis drive bar 184, a sliding carriage y-axis, drive bar belt 186, a sliding carriage y-axis drive pulley 188, a sliding carriage y-axis servomotor 190, drive bar pulleys 132, a sliding carriage y-axis home sensor 1052 and a sliding carriage y-axis max travel sensor 1054. The sliding carriage sub-assembly 180 is mounted and attached to the machine base main frame 114 by means of bearing blocks 156 and bolts 130, wherein the bearing blocks 156 are mounted to the machine base main frame 114 by bolts 130.

The pair of sliding carriage y-axis drive belts 182a and 182b are used to move the splining head slide assembly 300 in the y-axis direction 42. Each of the sliding carriage y-axis drive belts 182a and 182b are positioned around the sliding carriage idler bar pulleys 134yp and around the sliding carriage y-axis drive bar 184. The sliding carriage y-axis drive belts 182a and 182b are connected to the top and bottom drive belt clamps 304 and 306, respectively, of splining head slide assembly 300. The sliding carriage y-axis drive bar 184 is used for driving and moving the y-axis drive belts 182a and 182b. The sliding carriage y-axis drive bar 184 is mounted and attached to the machine base main frame 114 by means of bearing blocks 156.

The sliding carriage y-axis drive bar belt 186 is also used to move the spline dispensing head assembly 200 in the y-axis direction 42. The sliding carriage y-axis drive bar belt 186 is positioned around the sliding carriage y-axis drive bar pulley 132yp and around the sliding carriage y-axis servomotor 190, which in turn drives the spline dispensing head assembly 200 in the y-axis direction 42. The sliding carriage y-axis drive pulley 188 is connected to the motor shaft 192 of the sliding carriage y-axis servomotor 190 and is used to rotate the sliding carriage y-axis drive bar belt 186. The sliding carriage y-axis servomotor 190 is also used to move the spline dispensing head assembly 200 in the y-axis direction 42. The y-axis servomotor 190 is mounted and connected to the machine base main frame 114 by screws 138. The sliding carriage y-axis home sensor 1052 is used to sense and reference the home position 56 of the splining head slide assembly 300. The y-axis home sensor 1052 is mounted and connected to the base main frame 114 by a mounting bracket 196a. The sliding carriage y-axis max travel sensor 1054 is used to sense and reference y-axis maximum travel distance 58 of the splining head slide assembly 300. The y-axis max travel sensor 1054 is mounted and connected to the base main frame 114 by a mounting bracket 196a.

Spline Dispensing Head Assembly 200

The spline dispensing head assembly 200, as shown in FIGS. 1, 4, 5, 23, 25 and 26 of the drawings, is used for guiding, inserting and cutting the splining material 12; inserting the splining material 12 and the screen material 14 into the screen retaining channel 18 of window screen frame 16; and the trimming of excess screen material 14 of the window screen frame 16. The spline dispensing head assembly 200 includes a plurality of sub-assemblies including a spline feed sub-assembly 210, a rotating spline wheel sub-assembly 240, and a screen cutter sub-assembly 280.

Figure 4:
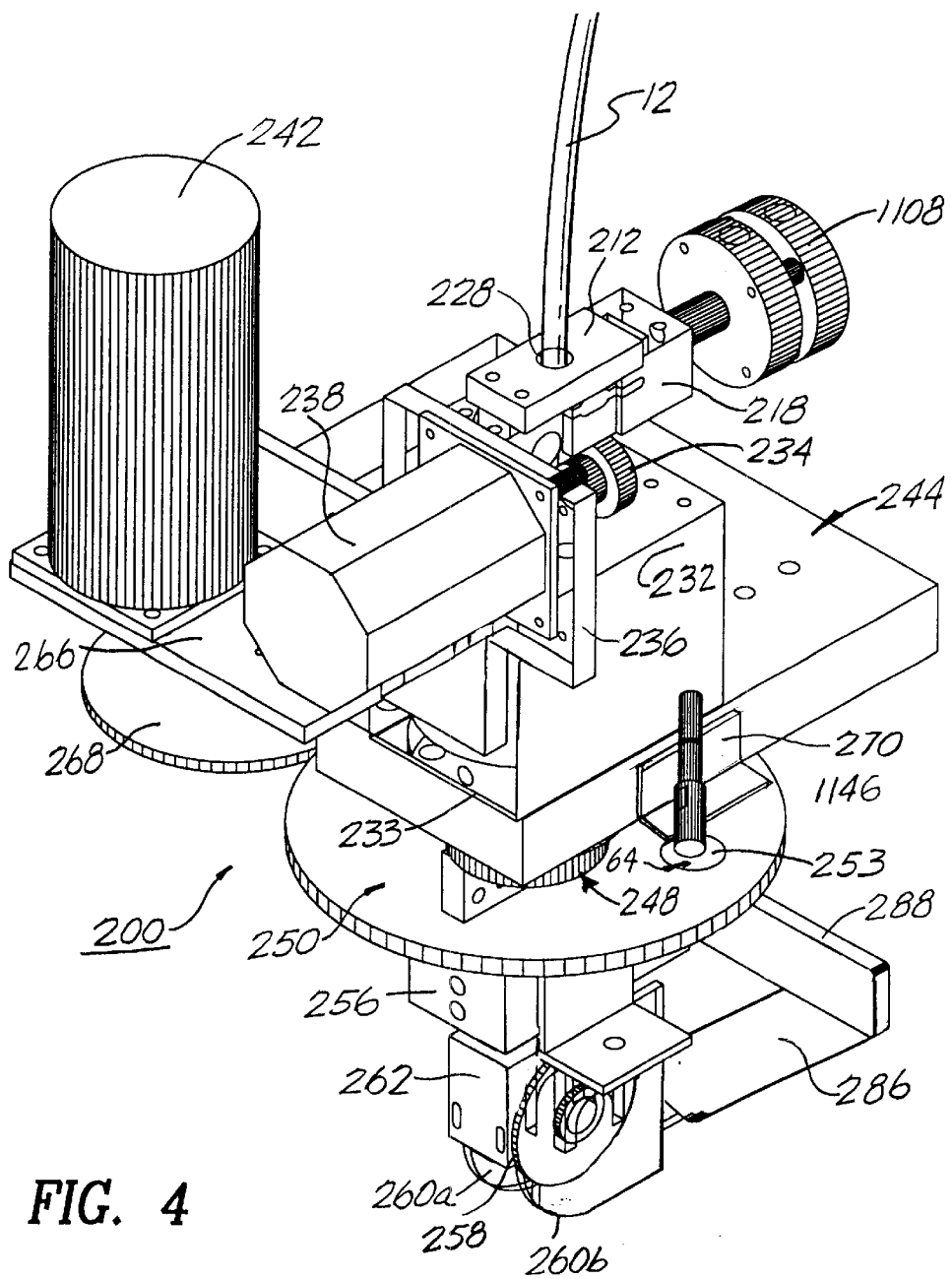
FIG. 4 is a front perspective view of the automatic screening machine of the present invention showing the spline dispensing head assembly and its component parts contained therein and in an assembled state.
Figure 5:
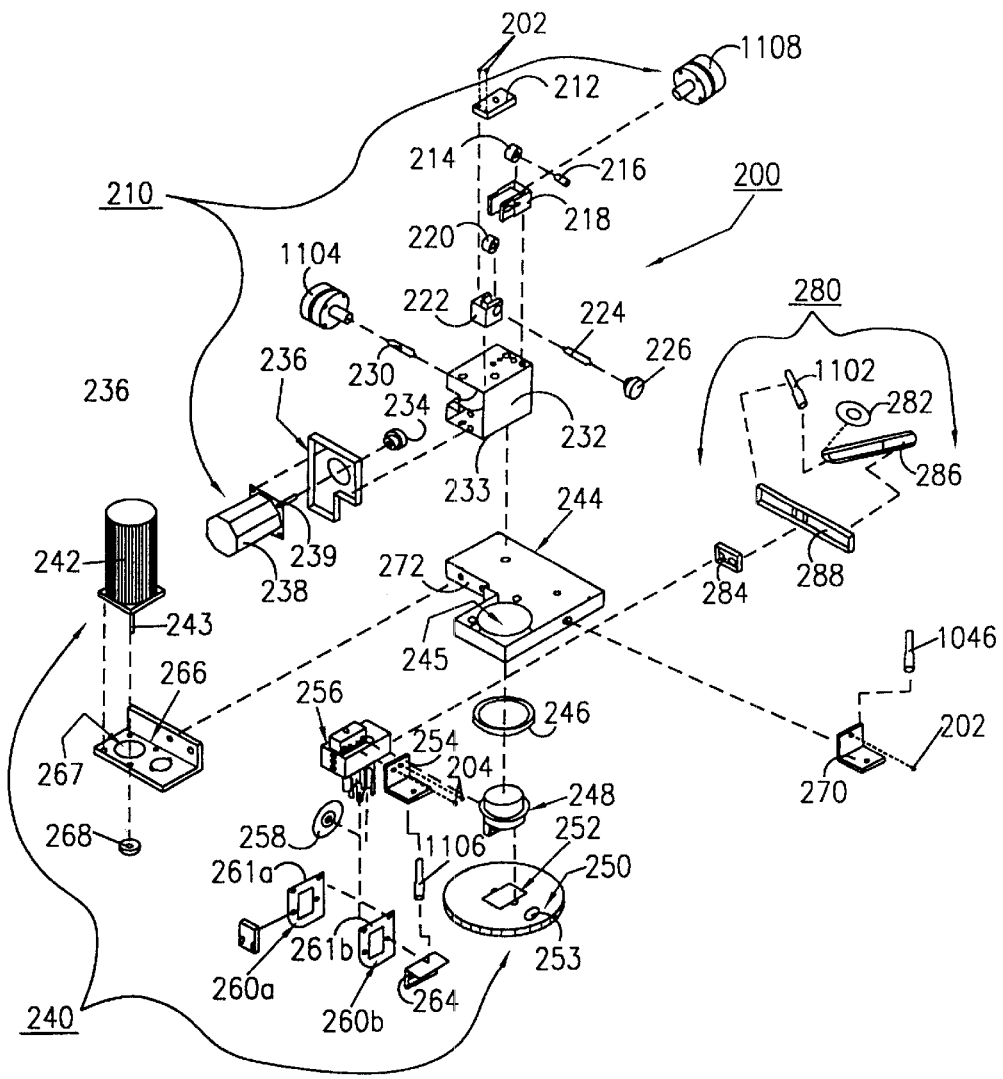
FIG. 5 is an exploded front perspective view of the automated screening machine of the present invention showing the spline dispensing head assembly and its component parts contained therein and in an unassembled state.

The spline feed sub-assembly 210, as shown in FIGS. 4 and 5 of the drawings, is used for feeding the spline material 12 and the screen material 14 into the screen retaining channel 18 of window screen frame 16. The spline feed sub-assembly 210 includes a spline feeder cover 212 having a spline hole opening 228 for receiving spline material 12 therethrough, a spline pinch idler wheel/knob 214, a pinch wheel shaft 216, a spline pinch feeder rear block 218, a spline pinch drive wheel 220, a spline pinch air cylinder 1108, a spline pinch wheel mounting block 222, a spline pinch wheel drive shaft 224, and a spline feeder gear 226. The spline feed sub-assembly 210 also includes a spline cutter air cylinder 1104, a spline cutter 230, a spline feed block 232, a spline feeder motor gear 234, a spline feeder motor bracket 236 having a gear opening 237 therethrough and a spline advance feeder stepper motor 238 having a motor shaft 239 thereon.

The spline hole opening 228 of the spline feed cover 212 is used to align the splining material 12 with spline pinch idler wheel 214 and the spline pinch drive wheel 220. The spline feed cover 212 is amounted and connected to the spline pinch wheel mounting block 222 by machine screws 202. The spline pinch idler wheel 214 is used in conjunction with the spline pinch drive wheel 220 in order to advance the splining material 12. The spline pinch idler wheel 214 is mounted and attached to the spline pinch feeder rear block 218. The pinch wheel shaft 216 is used to mount the spline pinch idler wheel 214 to the spline pinch feeder rear block 218. The spline pinch feeder rear block 218 is used to mount the spline pinch idler wheel 214 to the spline feed block 232. The spline pinch drive wheel 220 is used to grip and drive the splining material 12 into its start position. The spline pinch drive wheel 220 is mounted to the spline pinch drive wheel mounting block 222 by the spline pinch wheel drive shaft 224. The spline pinch wheel mounting block 222 is used to mount the spline pinch drive wheel 220 in conjunction with the spline feed block 232. The spline pinch air cylinder 1108 is used to push the spline pinch idler wheel 214 and the spline pinch drive wheel 220 together, respectively, thereby gripping the splining material 12 for advancement.

The spline pinch air cylinder 1108 is mounted to both the spline pinch feeder rear block 218 and to the spline feeder block 232 by machine bolts 204. The mounting block 222 is attached to the spline feeder block 232. The spline pinch wheel drive shaft 224 is used to mount the spline pinch drive wheel 220 to the spline pinch wheel mounting block 222, as well as being connected to the spline feeder gear 226. The spline feeder gear 226 is mounted to the spline wheel drive shaft 224 in order to connect the spline pinch wheel drive shaft 224 to the spline feeder motor gear 234 thereto. The spline cutter air cylinder 1104 is used to push the spline cutter knife 230 in the splining material 12 to cut. The spline cutter air cylinder 1104 is mounted to the spline feeder block 232 by machine screws 202. The spline cutter knife 230 is used to cut the splining material 12 when the screening and splining cycle has been completed. The spline cutter 230 is mounted within the spline feeder block 232. The spline feeder block 232 is used to guide the splining material 12 into the spline swivel head rotation member 256 of the rotating spline wheel sub-assembly 240. Additionally, the spline feeder block 232 is used to hold and contain the other spline feeding and cutting component parts (i.e. spline cutter 230, spline pinch drive wheel 205, etc.). The spline feeder block 232 is mounted to the swivel head plate 244 by machine screws 202. The spline feeder motor gear 234 is used to rotate the spline feeder gear 226 which in turn rotates the spline pinch wheel drive shaft 224. The spline feeder motor gear 234 is received within gear opening 237 of spline feeder motor mounting bracket 236. The spline feeder motor gear 234 is mounted to the shaft 239 of the spline advance feeder motor 238. The spline feeder motor mounting bracket 236 is used to mount the spline advance feeder stepper motor 238 thereto. The motor mounting bracket 236 is connected to spline feeder block 232 and the spline advance feeder stepper motor 238 by machine screws 202. The spline advance feeder motor 238 is used to advance the splining material 12 through the spline feeder block 232. The spline feeder motor 238 is mounted to the spline feeder motor mounting bracket 236 by machine screws 202.

The rotating spline wheel sub-assembly 240, as shown in FIGS. 4 and 5 of the drawings, is used for rotating, guiding and aligning the splining material 12 and the screen material 14 into the screen retaining channel 18 as it proceeds along each of the first, second, third and fourth perimeter sides 22, 24, 26 and 28 of the window screen frame 16, as well as rotating around each of the first, second, third and fourth corners 32, 34, 36 and 38, respectively, of the window screen frame 16. The rotating spline wheel sub-assembly 240 includes a swivel motor 242 having a motor shaft 243 thereon, a swivel head plate 244, a swivel bearing member 246, a swivel hub 248, a swivel head gear 250 having a rectangular air hub opening 252 and a head gear home locating hole opening 253 therein, a spline guide plate air cylinder top mounting bracket 254, a spline guide plate air cylinder 1106 and a spline swivel head rotation member 256. The rotating spline wheel sub-assembly 240 further includes a spline wheel 258, a pair of lower spline head guide plates 260a and 260b, a lower spline head guide holder 262, a spline guide plate air cylinder bottom mounting bracket 264, a swivel motor bracket 266 having a gear opening 267 therein, a swivel drive gear 268, a swivel head gear home sensor mounting bracket 270 and a swivel head gear home sensor 1046.

The swivel motor 242 is used to rotate the swivel head gear 250. The swivel motor 242 is mounted and attached to the swivel motor bracket 266 by machine screws 202. The swivel head plate 244 is used to mount the various component parts 232, 238, 246, 248 and 250 of the spline dispensing head sub-assembly 210 and the rotating spline wheel sub-assembly 240 thereto. The swivel head plate 244 is mounted and attached to the bottom wall surface 233 of the spline feeder block 232 by machine screws 202. The swivel bearing member 246 is used to rotate the swivel hub 248. The swivel bearing member 246 is adjacently mounted to the swivel hub opening 245 thereto of swivel head plate 244. The swivel hub 248 is used to connect the spline swivel head rotation member 256 to the swivel head plate 244. The swivel hub 248 is detachably connected to the swivel bearing member 246, where then the swivel hub 248 is inserted within the swivel hub opening 245 of the swivel head plate 244, as shown in FIG. 5 of the drawings. The swivel head gear 250 is used to rotate the swivel hub 248. The swivel head gear 250 is mounted and attached to the swivel hub 248 via the centrally located rectangular opening 252 of swivel head gear 250 and also connected to the swivel hub 248 by machine screws 202. The head gear home locating hole opening 253 is used by the swivel head gear home sensor 1046 to sense and reference this hole opening 253 within the swivel head gear 250 such that the swivel head gear home sensor 1046 positions and places the swivel head gear 240 in the home position 30. The spline guide plate air cylinder top mounting bracket 254 is used to mount the spline guide plate air cylinder 1106 via machine screws 202 to the spline swivel head rotation member 256. The spline swivel head rotation member 256 is used to guide both the splining material 12 and the spline wheel 258 into the screen retaining channel 18 of window screen frame 16. Head rotation member 256 is connected to the swivel hub 248 via machine bolts 204 and connected to the screen cutter spacer block 284 of screen cutter sub-assembly 280 via machine screws 202.

The spline wheel 258 is used to insert the splining material 12 into the screen retaining channel 18 of window screen frame 16. The spline wheel 258 is movably connected to the head rotation member 256. The lower spline head guide plates 260a and 260b are used to position the splining material 12 under the spline wheel 258. The lower spline head guide plates 260a and 260b are mounted to the head rotation member 256. The lower head guide holder 262 is used to hold the lower spline head guide plates 260a and 260b in position around the spline wheel 258. The guide holder 262 is mounted to each edge 261a and 261b of guide plates 260a and 260b, respectively, via machine screws 202. The spline guide plate air cylinder bottom mounting bracket 264 is used to connect the spline guide plate air cylinder 1106 to the lower spline head guide plates 260a and 260b. Bottom mounting bracket 264 is mounted and connected to (right side) guide plate 260b via machine screws 202. The spline guide plate air cylinder 1106 is used to raise and lower the lower spline head guide plates 260a and 260b in order to position the splining material 12 under the spline wheel 258. The spline guide plate air cylinder 1106 is mounted to the spline guide plate air cylinder top mounting bracket 254 by a machine screw 202. The swivel motor bracket 266 is used to mount the swivel motor 242 to the swivel head plate 244 via machine screws 202. The swivel motor bracket 266 is mounted and attached to side edge 272 of the swivel head plate 244 by machine screws 202. The swivel drive gear 268 is received within gear opening 267 of swivel motor bracket 266. The swivel drive gear 268 is used to drive and rotate the swivel head gear 250 via swivel motor 242. The swivel drive gear 268 is attached to the motor shaft 243 of swivel motor 242. The head gear home sensor mounting bracket 270 mounts and attaches to the swivel head plate 244 by mounting screws 202. The swivel head gear home sensor 1046 is used to sense and reference the home position 30 of the swivel head gear 250.

The screen cutter sub-assembly 280, as shown in FIGS. 4 and 5 of the drawings, is used for cutting away the excess screening material 14 from the screen retaining channel 18 of window screen frame 16 during the splining and screening cycle. The screen cutter sub-assembly 280 includes a screen cutter 282, a screen cutter spacer block 284, a screen cutter pivot bar 286, a screen cutter pivot bar mounting bracket 288 and a screen cutter frame air cylinder 1102. The screen cutter 282 is used to cut the excess screening material 14 away from the screen retaining channel 18 of sides 22, 24, 26 and 28 of window screen frame 16. The screen cutter 282 is mounted to the screen cutter pivot bar 286 by a machine screw 202. The screen cutter spacer block 284 is used to mount the screen cutter pivot bar 286 to the spline swivel head rotation member 256. The screen cutter spacer block 284 is attached to the head rotation member 256 by a machine screw 202. The screen cutter pivot bar 286 is used to pivot and move the screen cutter 282 into the screen retaining channel 18 of window screen frame 16. The screen cutter pivot bar 286 is mounted and attached to the spline swivel head rotation member 256 by machine screws 202. The screen cutter pivot bar mounting bracket 288 is used to mount the screen cutter pivot bar 286 to the screen cutter spacer block 284 thereto. The screen cutter frame air cylinder 1102 is used to push the screen cutter 282 into the screen retaining channel 18 of window screen frame 16. The screen cutter frame air cylinder 1102 is connected to one end 290 of the screen cutter pivot bar 286 and to one end 292 of the pivot bar mounting bracket 288, as shown in FIG. 5 of the drawings.

The Splining Head Slide Assembly 300

The slide assembly 300, as shown in FIGS. 1, 2, 3, 6, 7, 25 and 26 of the patent drawings, is used to move and guide the spline dispensing head assembly 200 in the x-axis direction 40. The splining head slide assembly 300 is also used to mount the head vertical slide mechanism 1112 and the corner height air cylinder 1110 in order to allow movement in the vertical z-axis direction 44. The splining head splining head slide assembly 300 includes a rail support tube 302; a pair of drive belt clamps 304a and 304b each having top and bottom clamping plates 306a, 310a, 306b and 310b respectively, thereto; a pair of y-axis track bearings 314a and 314b; a pair of upper and lower x-axis track bearings 316a and 316b; and a pair of upper and lower x-axis splining head rails 318a and 318b. The splining head splining head slide assembly 300 also includes a top solenoid bracket 320, a height adjustment plate 322, a piston support plate 324, a head mount plate 326, a corner height air cylinder 1110, and a head vertical slide mechanism/dispensing head slide air cylinder 1112 having a guide bearing 328 thereon. The splining head splining head slide assembly 300 further includes a splining head x-axis servomotor 330 having a motor shaft 332 thereon, a splining head x-axis drive pulley 334, a splining head x-axis idler pulley 336, a splining head x-axis drive belt 338, a drive belt clamping plate 340 having mounting openings 342 thereon, a spline holder 344. Additionally, the splining head splining head slide assembly 300 also includes a splining head x-axis home sensor 1048, a splining head x-axis max travel sensor 1050, a screen cutter frame solenoid valve 1132, a spline cutter solenoid valve 1134, a spline guide plate solenoid valve 1136, a spline pinch solenoid valve 1138, a corner height solenoid valve 1140 and a dispensing head slide solenoid valve 1142.

Figure 6:
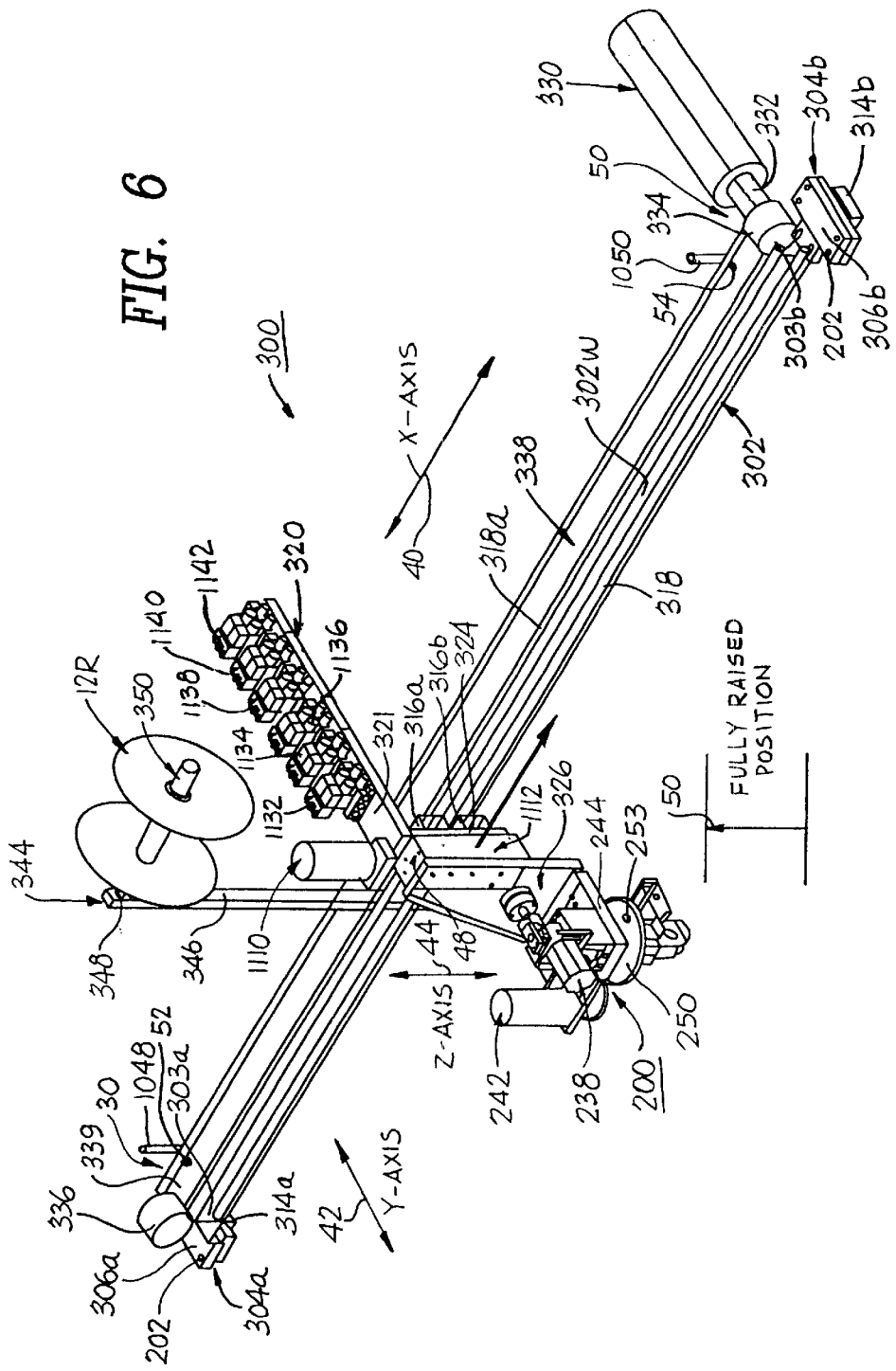
FIG. 6 is a front perspective view of the automated screening machine of the present invention showing the slide assembly and its component parts contained therein and in an assembled state.
Figure 7:
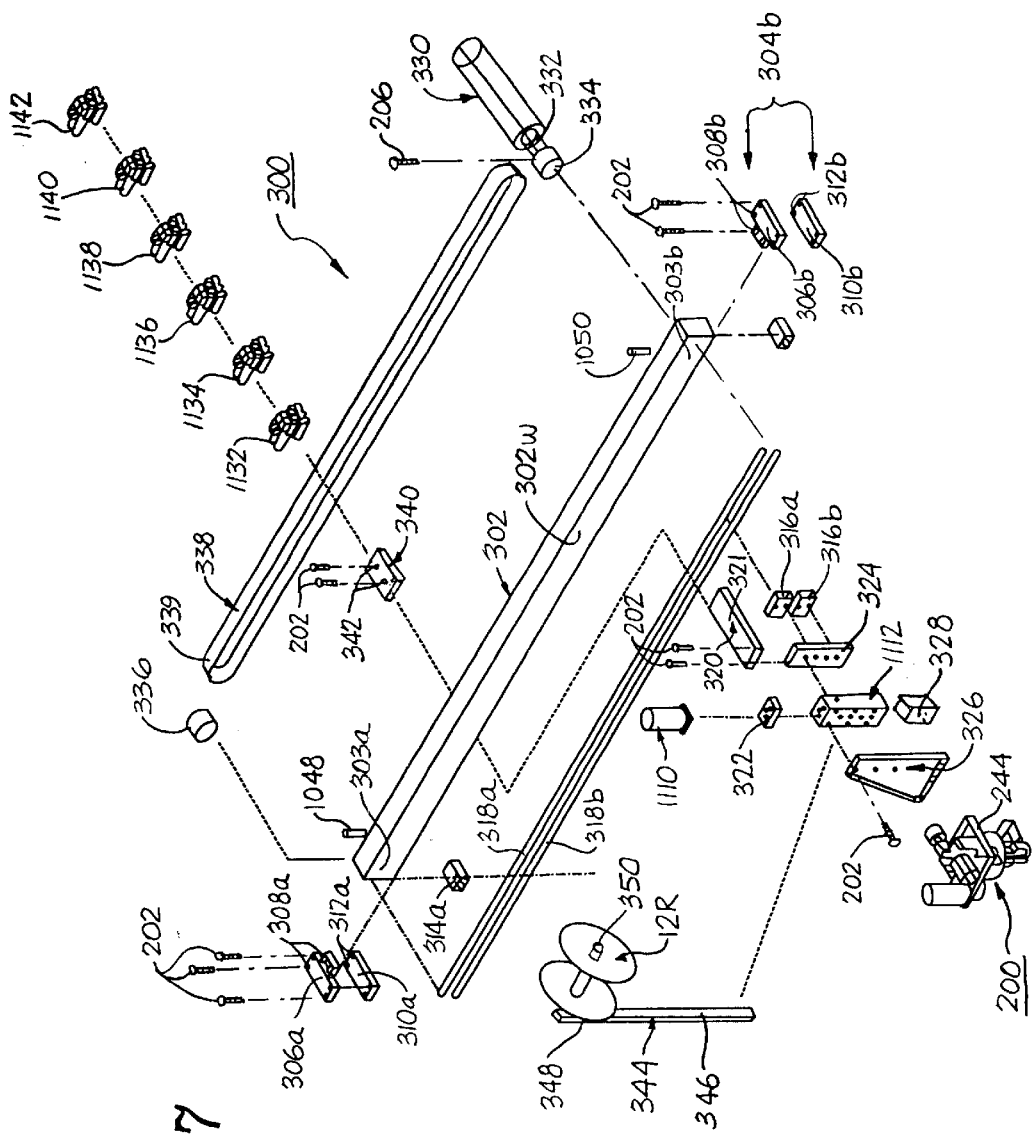
FIG. 7 is an exploded front perspective view of the automated screening machine of the present invention showing the slide assembly and its component parts contained therein and in an unassembled state.

The rail support tube 302 is connected to the left and right side y-axis track bearings 314a and 314b at each tube end 303a and 303b of the rail support tube 302 by machine screws 202. The rail support tube 302 is used as the main support structure/beam for the traveling of the spline dispensing head assembly 200 in the x-axis direction 40. The top clamping plates 306a and 306b of drive belt clamps 304a and 304b are substantially T-shaped and are connected to each tube end 303a and 303b of the rail support tube 302 by machine screws 202 being received through mounting openings 308a and 308b of top clamping plates 306a and 306b, respectively, as shown in FIGS. 6 and 7 of the drawings. The top clamping plates 306a and 306b of drive belt clamps 304a and 304b are used to connect, hold and clamp the rear ends 183a and 183b of the sliding carriage y-axis drive belts 182a and 182b, respectively, of the sliding carriage sub-assembly 180 to that of the rail support tube 302 of splining head splining head slide assembly 300. The bottom clamping plates 310a and 310b are connected to the top clamping plates 306a and 306b to form drive belt clamps 304a and 304b in which to clamp and hold the rear ends 183a and 183b of the sliding carriage y-axis drive belts 182a and 182b, respectively, of the sliding carriage sub-assembly 180 in place.

The left and right y-axis track bearings 314a and 314b are connected to each tube end 303a and 303b of the rail support tube, respectively. The left and right y-axis track bearings 314a and 314b are also connected to the rear ends 123a and 123b of the left and right y-axis slide rails 122a and 122b, respectively. The left and right y-axis track bearings 314a and 314b are used to guide and move the rail support tube 302 along the left and right y-axis slide rails 122a and 122b, respectively, in the y-axis direction 42. The upper and lower x-axis track bearings 316a and 316b are connected to the upper and lower x-axis splining head rails 318a and 318b, respectively, and are also connected to the piston support plate 324. The upper and lower x-axis track bearings 316a and 316b are used to guide and move the piston support plate 324 along the upper and lower x-axis splining head rails 318a and 318b, respectively, in the x-axis direction 40. The upper and lower x-axis splining head rails 318a and 318b are connected to the front wall 302w of rail support tube 302 in a parallel configuration by machine screws 202, as shown in FIGS. 6 and 7 of the drawings.

The top solenoid bracket 320 is connected to the piston support 324 by machine screws 202. The top solenoid bracket 320 is used to support and hold the solenoid valves 1132, 1134, 1136, 1138, 1140 and 1142 in place. The top solenoid bracket 320 is also used to connect the splining head x-axis drive belt 338 to the drive belt clamping plate 340, as depicted in FIGS. 6 and 7. The height adjustment plate 322 is connected to both of the dispensing head slide air cylinder 1112 and to the corner height air cylinder 1110 by machine screws 202. The height adjustment plate 322 is used to support the corner height air cylinder 1110. The piston support plate 324 is connected to the upper and lower x-axis track bearings 316a and 316b and to the dispensing head slide air cylinder 1112 by machine screws 202. The piston support plate 324 is used to mount the dispensing head slide air cylinder 1112 to that of the upper and lower x-axis track bearings 316a and 316b, respectively. The head mount plate 326 is connected to the swivel head plate 244 of the rotating spline wheel sub-assembly 240 and to the dispensing head slide air cylinder 1112 by machine screws 202. The head mount plate 326 is used to mount and attach the swivel head plate 244 of the rotating spline wheel sub-assembly 240 to that of the dispensing head slide air cylinder 1112. The corner height air cylinder 1110 is connected to the height adjustment plate 322 by machine screws 202. The corner height air cylinder 1110 is used to raise and lower the head mount plate 326 (as well as the splining dispensing head assembly 200) to a secondary or corner height position 48. The dispensing head slide air cylinder 1112 is connected to the swivel head plate 244 of the rotating spline wheel sub-assembly 240 and to the head mount plate 326 by machine screws 202. The dispensing head slide air cylinder 1112 is used to move the splining dispensing head assembly 200 in the z-axis direction 44. The guide bearing 328 is connected to the dispensing head slide air cylinder 1112 by machine screws 202. The guide bearing 328 is used to guide and move the dispensing head slide air cylinder 1112 in the z-axis direction 44, as depicted in FIGS. 6 and 7 of the drawings.

The splining head x-axis servomotor 330 is connected to the rail support tube 302 by machine bolts 204. The motor shaft 332 of the splining head x-axis servomotor 330 is connected to the x-axis drive pulley 334 by a set screw 206. The x-axis servomotor 330 is used to rotate the x-axis drive pulley 334. The splining head x-axis drive pulley 334 is connected to the x-axis servomotor 330 (as previously mentioned) and is also wrapped with the splining head x-axis drive belt 338. The x-axis drive pulley 334 is used to connect the splining head x-axis servomotor 330 to that of the splining head x-axis drive belt 338. The splining head x-axis idler pulley 336 is connected to the front wall 302w of the rail support tube 302 by a machine screw 202. The x-axis idler pulley 336 is used to support the non-driven idler end 339 of the x-axis drive belt 338. The splining head x-axis drive belt 338 is wrapped to the x-axis drive pulley 334 and to the x-axis idler pulley 336. The x-axis drive belt 338 is also connected to the top solenoid bracket 320 by the drive belt clamping plate 340. The splining head x-axis drive belt 338 is used to move and guide the splining dispensing head assembly 200 in the x-axis direction 40. The drive belt clamping plate 340 is connected to the top solenoid bracket 320 by receiving machine bolts 204 through mounting openings 342 of the drive belt clamping plate 340. The drive belt clamping plate 340 is used to connect and mount the x-axis drive belt 338 to the top solenoid bracket 320. The spline holder 344 includes a vertical support arm 346 and an integrally attached horizontal holding bar 350 being located at the upper end 348 of the vertical support arm 346. The vertical support arm 346 of spline holder 344 is connected to the piston support plate 324 by machine screws 202. The horizontal holding bar 350 of spline holder 344 is used for holding the spline material roll 12R of splining material 12. The spline material roll 12R is slidably received on the horizontal holding bar 350 thereon, as depicted in FIGS. 1 and 6 of the drawings.

The splining head x-axis home sensor 1048 is connected to the left tube end 303a of the rail support tube 302 by machine screws 202. The x-axis home sensor 1048 is used to sense and reference the home position 52 of the spline dispensing head assembly 200 and splining head splining head slide assembly 300. The splining head x-axis max travel sensor 1050 is connected to the right tube end 303b of the rail support tube 302 by machine screws 202. The x-axis max travel sensor 1050 is used to sense and reference the x-axis max travel distance or position 54 of the spline dispensing head assembly 200 and splining head splining head slide assembly 300.

The screen cutter frame solenoid valve 1132 is connected to the top wall surface 321 of the top solenoid bracket 320 by machine screws 202. The screen cutter frame solenoid valve 1132 is used to change and reverse the flow direction of the compressed air 1130 (from air compressor 1126) to that of the screen cutter frame air cylinder 1102. The spline cutter solenoid valve 1134 is connected to the top wall surface 321 of the top solenoid bracket 320 by machine screws 202. The spline cutter solenoid valve 1134 is used to change and reverse the flow direction of the compressed air 1130 to that of the spline cutter air cylinder 1104. The spline guide plate solenoid valve 1136 is connected to the top wall surface 321 of the top solenoid bracket 320 by machine screws 202. The spline guide plate solenoid valve 1136 is used to change and reverse the flow direction of the compressed air 1130 to that of the spline guide plate air cylinder 1106. The spline pinch solenoid valve 1138 is connected to the top wall surface 321 of the top solenoid bracket 320 by machine screws 202. The spline pinch solenoid valve 1138 is used to change and reverse the flow direction of the compressed air 1130 to that of the spline pinch air cylinder 1108. The corner height solenoid valve 1140 is connected to the top wall surface 321 of the top solenoid bracket 320 by machine screws 202. The corner height solenoid valve 1140 is used to change and reverse the flow direction of the compressed air 1130 to that of the corner height air cylinder 1110. The dispensing head slide solenoid valve 1142 is connected to the top wall surface 321 of the top solenoid bracket 320 by machine screws 202. The dispensing head slide solenoid valve 1142 is used to change and reverse the flow direction of the compressed air 1130 to that of the dispensing head slide air cylinder 1112.

Front Clamping Finger Assembly 400

Figure 8:
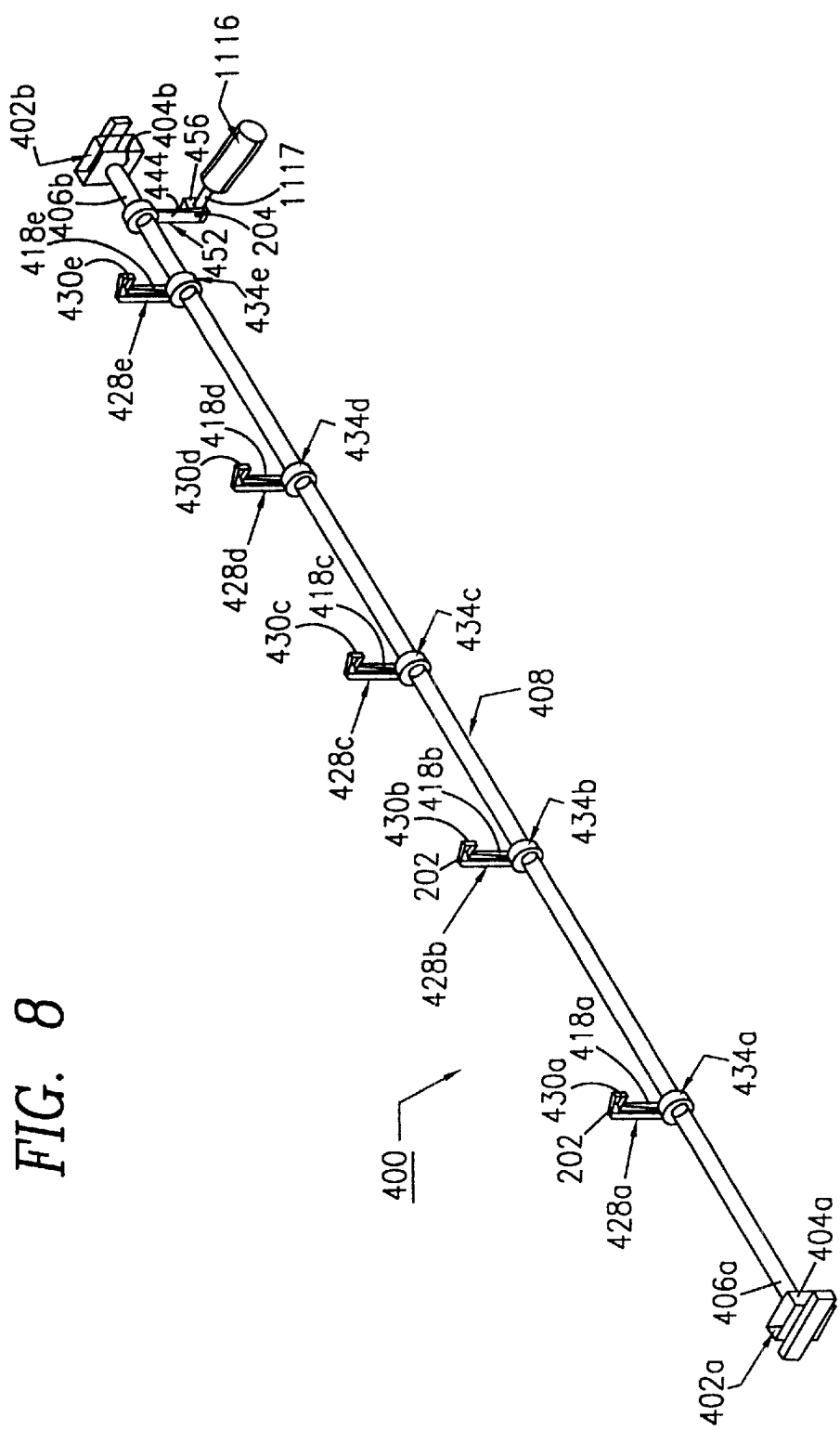
FIG. 8 is a front perspective view of the automated screening machine of the present invention showing the front clamping finger assembly and its component parts contained therein and in an assembled state.
Figure 9:
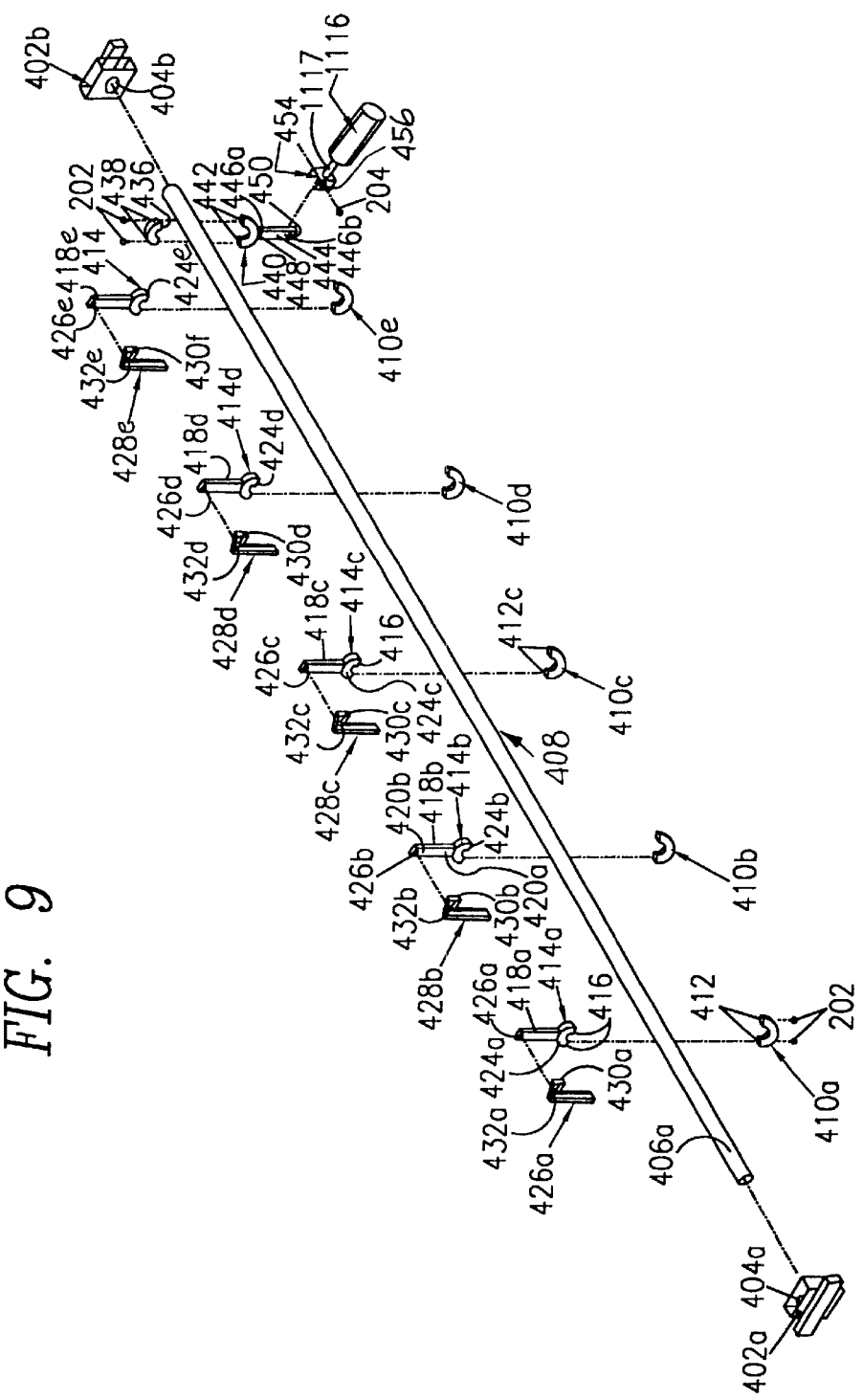
FIG. 9 is an exploded front perspective view of the automated screening machine of the present invention showing the front clamping finger assembly and its component parts contained therein and in an unassembled state.

The front clamping finger assembly 400, as shown in FIGS. 1, 2, 3, 8, 9, 18, 22, 24, and 27 of the patent drawings, is used to clamp and hold the interior second side (front side) 24 of the window screen frame 16. The front clamping finger assembly 400 includes a pair of bearing members 402a and 402b each having a centrally located shaft opening 404a and 404b therethrough for receiving therein a first end 406a and a second 406b, respectively, of the front clamping finger shaft 408, as depicted in FIG. 9. The front clamping finger assembly 400 also includes a plurality of lower half-split collars 410a, 410b, 410c, 410e and 410f each having attachment opening 412 therethrough, and a plurality of upper half-split collars 414a, 414b, 414c, 414d and 414f each having attachment openings 416 therein. Each of the upper half-split collars 414a to 414f includes a mounting arm 418a, 418b, 418c, 418d and 418f, respectively, thereon. Each of the mounting arms 418a to 418f are integrally connected at one end 420a to the outer perimeter edge 424a, 424b, 424c, 424d and 424f of the upper half-split collars 414a to 414f, respectively, as shown in FIG. 9. The other end 420b of mounting arms 418a to 418f each include an attachment opening 426a, 426b, 426c, 426d and 426f, respectively, therethrough.

Additionally, the front clamping finger assembly 400 includes a plurality of L-shaped finger clamps 428a, 428b, 428c, 428d and 428f each having a clamping head 430a, 430b, 430c, 430d and 430f thereon. Each clamping head 430a to 430f includes an attachment opening 432a, 432b, 432c, 432d and 432f therethrough, respectively. Finger clamps 428a to 428f are attached to each of the mounting arms 418a to 418f by aligning each of the corresponding attachment openings 432a to 432f, and 426a to 426f, respectively, which are then connected together by a machine screw 202, as shown in FIG. 9. The lower half-split collar 410a to 410f is joined and connected to the upper half-split collar 414a to 414f by machine screws 202 through the corresponding attachment openings 412 and 416, respectively, as shown in FIGS. 8 and 9, to form a joined finger clamp collar 434a, 434b, 434c, 434d and 434f that are surrounding the front side clamping shaft 508. The formed and joined finger clamp collars 434a to 434f are spaced-apart accordingly, based upon the length of window screen frame 16.

The front clamping finger assembly 400 further includes an upper half-split collar 436 having attachment openings 438 therethrough, and a lower half-split collar 440 having attachment openings 442 therein. The lower half-split collar 440 also includes a pivot arm 444 being integrally attached at one end 446a to the outer perimeter edge 448 of the lower half-split collar 440. The other end 446b of pivot arm 444 includes an attachment opening 450. The upper half-split collar 436 is joined and connected to the lower half-split collar 440 by machine screws 202 through the corresponding attachment openings 438 and 442, respectively, as shown in FIGS. 8 and 9, to form a joined pivot arm collar 452 which is surrounding and clamped to the second end 406b of the front side clamping shaft 408.

The front clamping finger assembly 400 additionally includes a front finger clamp air cylinder 1116 having a piston shaft 1117 thereon. The piston shaft 1117 has a pivot arm mounting bracket 454 thereon having attachment openings 456 therethrough. Pivot arm mounting bracket 454 is attached and connected to the pivot arm 444 by aligning the corresponding attachment openings 456 and 450 together and held together by a machine screw 202, as shown in FIG. 9 of the drawings.

The bearing block members 402a and 402b are connected to the machine base main frame 114 by machine screws 202. The bearing block members 402a and 402b are used for allowing the front side clamping shaft 408 to rotate which in turn pivot the assembled finger clamp collars 434a to 434e. The first and second ends 406a and 406b of shaft 408 are connected to the bearing block members 402a and 402b by set screws 206. The shaft 408 is used to mount the assembled finger clamp collars 434a to 434e. Each of the lower half-split collars 410a to 410e are connected to upper half-split collars 414a to 414e by machine screws 202 to form the assembled finger clamp collars 434a to 434e, respectively. The lower and upper half-split collars are 410a to 410e and 414a to 414e are used to connect the assembled finger clamp collars 434a to 434e to the shaft 408. Each of the L-shaped finger clamps 428a to 428e are connected to each of the mounting arms 418a to 418e of the upper half-split collars 414a to 414e for joining by a shoulder screw 130s. The clamp finger heads 430a to 430e of the assembled finger clamp collars 434a to 434e are used to clamp and hold the front perimeter side 24 of the screen frame 16 to the front side frame guide 126 of L-shaped bracing guide 129. The upper half-split collar 436 and the lower half-split collar 440 are joined together by machine screws 202 to form the assembled pivot arm collar 452. The assembled pivot arm collar 452 is connected to the front side clamping shaft 408 by machine screws 202. The assembled pivot arm collar 452 is used to mount both the upper half-split collar 436 and the lower half-split collar 440 having the pivot arm 444 attached thereto to the shaft 408. The pivot bar 444 is connected to the pivot arm mounting bracket 454 by machine screws 202. The pivot bar 444 is used to pivot the front side clamping finger assembly 400 in order to rotate the front side clamping shaft 408. The front finger frame clamp air cylinder 1116 is mounted to the machine base main frame 114 by machine bolts 204 and to the pivot bar 444 by a piston rod clevis bracket 454. The front finger frame air cylinder 1116 is used to pivot the front side clamping finger assembly 400 in order for the clamp fingers 430a to 430e to engage the interior left perimeter side 24 of screen frame 16.

Left Side Clamping Finger Assembly 500

Figure 10:
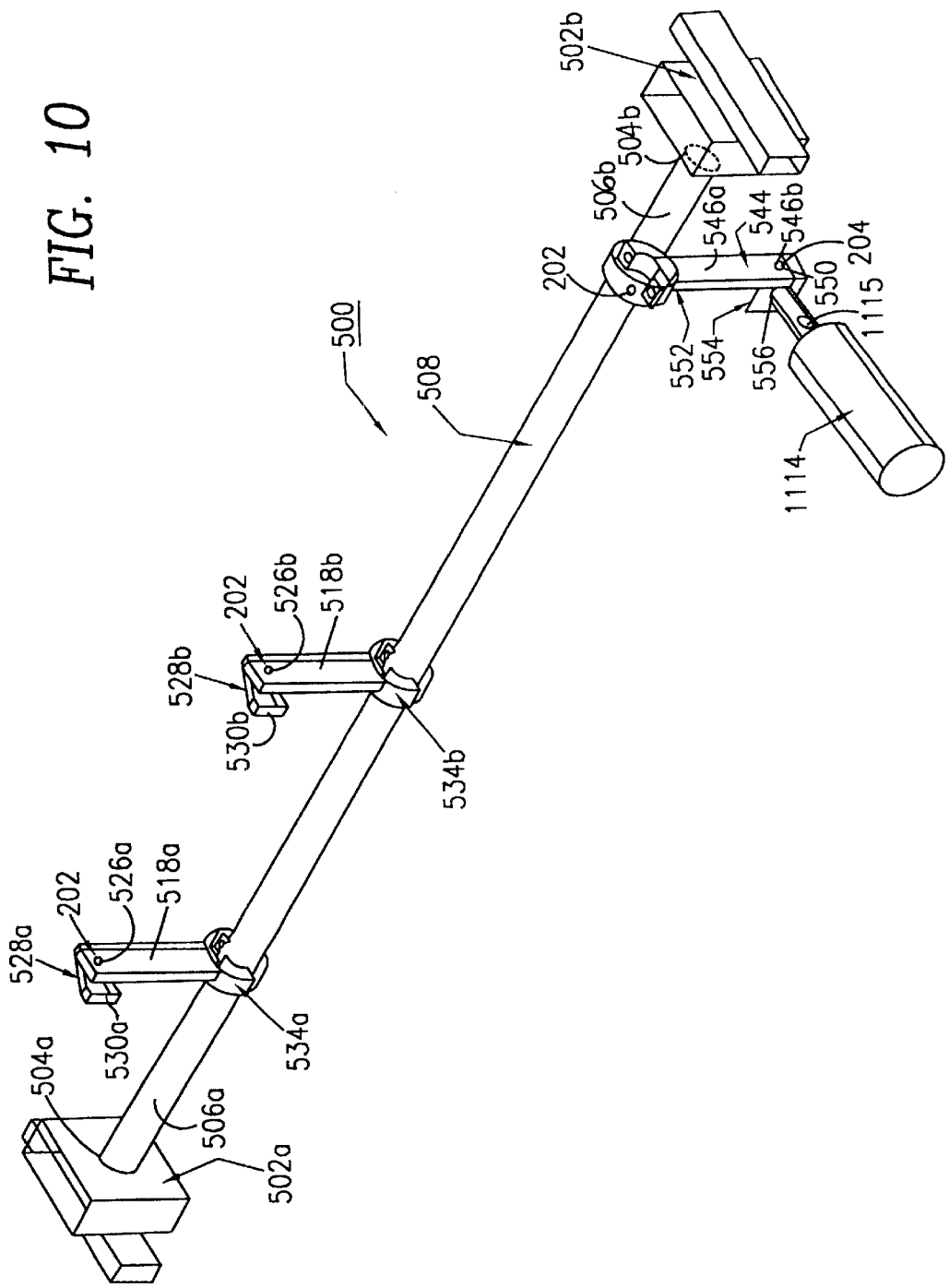
FIG. 10 is a front perspective view of the automated screening machine of the present invention showing the left side clamping finger assembly and its component parts contained therein and in an assembled state.
Figure 11:
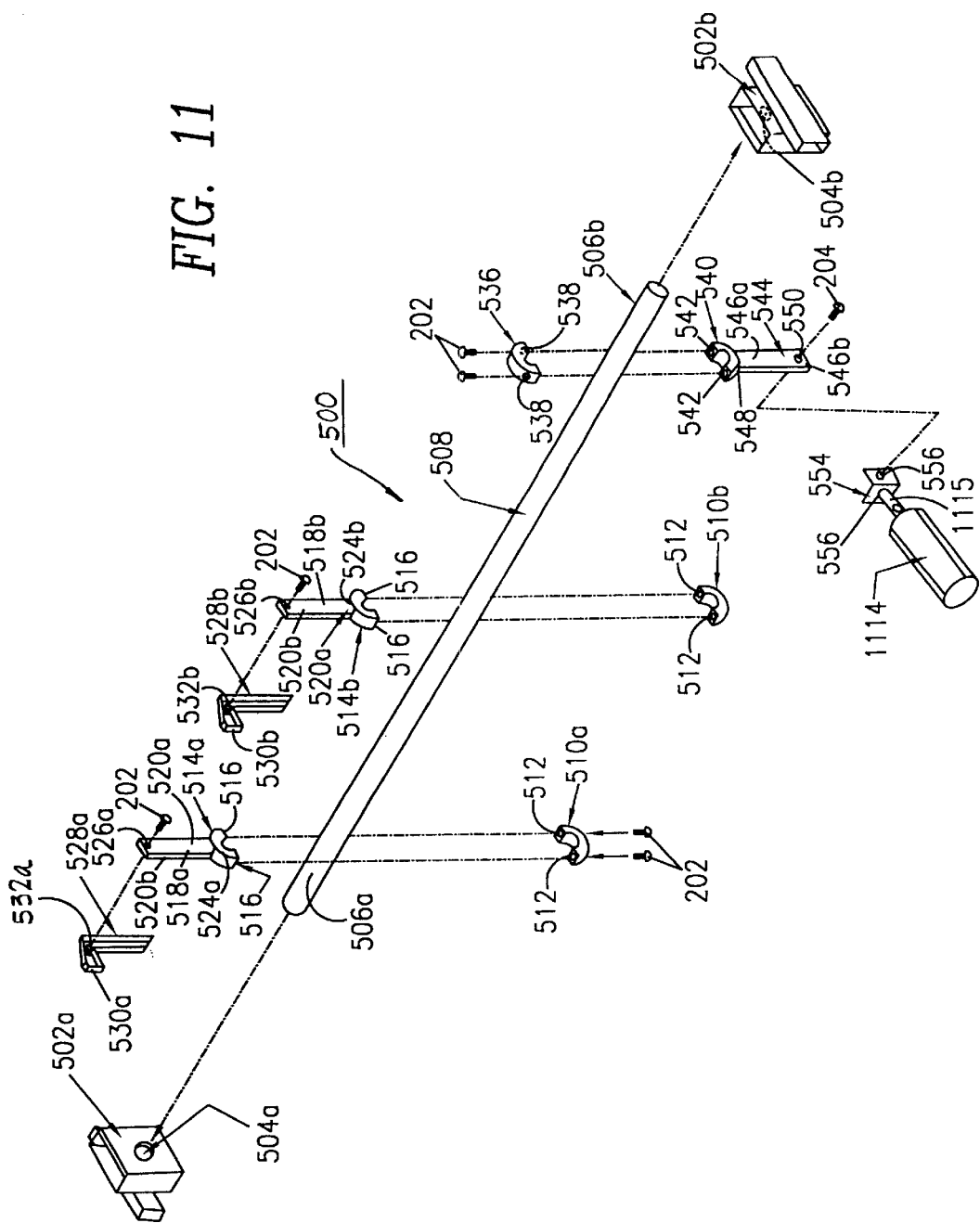
FIG. 11 is an exploded front perspective view of the automated screening machine of the present invention showing the left side clamping finger assembly and its component parts contained therein and in an unassembled state.

The left side clamping finger assembly 500, as shown in FIGS. 1, 2, 3, 10, 11, 18, 22, 24 and 27 of the drawings, is used to clamp and hold the interior third side (left side) 26 of the window screen frame 16. The left side clamping finger assembly 500 includes a pair of bearing members 502a and 502b each having a centrally located shaft opening 504a and 504b therethrough for receiving therein a first end 506a and a second end 506b, respectively, of the left side clamp shaft 508, as depicted in FIG. 11. The left side clamping finger assembly 500 also includes a pair of lower half-split collars 510a and 510b each having attachment openings 512 therethrough and a pair of upper half-split collars 514a and 514b each having attachment opening 516 therein. Each of the upper half-split collars 514a and 514b includes a mounting arm 518a and 518b, respectively, thereon. Each of the mounting arms 518a and 518b are integrally connected at one end 520a to the outer perimeter edge 524a and 524b of the upper half-split collars 514a and 514b, respectively, as shown in FIG. 11. The other end 520b of mounting arms 518a and 518b each include an attachment opening 526a and 526b, respectively, therethrough.

Additionally, the left side clamping finger assembly 500 includes a pair of L-shaped finger clamps 528a and 528b each having a clamping head 530a and 530b thereon. Each clamping head 530a and 530b includes an attachment opening 532a and 532b therethrough, respectively. Finger clamps 528a and 528b are attached to each of the mounting arms 518a and 518b by aligning each of the corresponding attachment openings 532a and 532b, and 526a and 526b, respectively, and then connected together by a machine screw 202, as shown in FIG. 11. The lower half-split collar 510a and 510b is joined and connected to the upper half-split collar 514a and 514b by machine screws 202 through the corresponding attachment openings 512 and 516, respectively, as shown in FIGS. 10 and 11, to form a joined finger clamp collar 534a and 534b that are surrounding the left side clamping shaft 508. The formed and joined finger clamp collars 534a and 534b are spaced-apart.

The left side clamping finger assembly 500 further includes an upper half-split collar 536 having attachment openings 538 therethrough, and a lower half-split collar 540 having attachment openings 542 therein. The lower half-split collar 540 also includes a pivot arm 544 being integrally attached at one end 546a to the outer perimeter edge 548 of the lower half-split collar 540. The other end 546b of pivot arm 544 includes an attachment opening 550. The upper half-split collar 536 is joined and connected to the lower half-split collar 540 by machine screws 202 through the corresponding attachment openings 538 and 542, respectively, as shown in FIGS. 10 and 11, to form a joined pivot arm collar 552 which is surrounding and clamped to the second end 506b of the left side clamping shaft 508.

The left side clamping finger assembly 500 additionally includes a left finger frame clamp air cylinder 1114 having a piston shaft 1115 thereon. The piston shaft 1115 has a pivot arm mounting bracket 554 thereon having attachment openings 556 therethrough. Pivot arm mounting bracket 554 is attached and connected to the pivot arm 544 by aligning the corresponding attachment openings 556 and 550 together and held together by a machine screw 202, as shown in FIG. 11 of the drawings.

The bearing block members 502a and 502b are connected to the machine base main frame 114 by machine screws 202. The bearing block members 502a and 502b are used for allowing the left side clamping shaft 508 to rotate which in turn pivot the assembled finger clamp collars 534a and 534b. The first and second ends 506a and 506b of shaft 508 are connected to the bearing block members 502a and 502b by set screws 206. The shaft 508 is used to mount the assembled finger clamp collars 534a and 534b. Each of the lower half-split collars 510a and 510b are connected to upper half-split collars 514a and 514b by machine screws 202 to form the assembled finger clamp collars 534a and 534b, respectively. The lower and upper half-split collars are 510a, 510b, 514a and 514b are used to connect the assembled finger clamp collars 534a and 534b to the shaft 508. Each of the L-shaped finger clamps 528a and 528b are connected to each of the mounting arms 518a and 518b of the upper half-split collars 514a and 514b for joining by a shoulder screw 130s. The clamp finger heads 530a and 530b of the assembled finger clamp collars 534a and 534b are used to clamp and hold the left perimeter side 26 of the screen frame 16 to the left side frame guide 125 of L-shaped bracing guide 129. The upper half-split collar 536 and the lower half-split collar 540 are joined together by machine screws 202 to form the assembled pivot arm collar 552. The assembled pivot arm collar 552 is connected to the left side clamping shaft 508 by machine screws 202. The assembled pivot arm collar 552 is used to mount both the upper half-split collar 536 and the lower half-split collar 540 having the pivot arm 544 attached thereto to the shaft 508. The pivot bar 544 is connected to the pivot arm mounting bracket 554 by machine screws 202. The pivot bar 544 is used to pivot the left side clamping finger assembly 500 in order to rotate the left side clamping shaft 508. The left finger frame clamp air cylinder 1114 is mounted to the machine base main frame 114 by machine bolts 204 and to the pivot bar 544 by a piston rod clevis bracket 554. The left finger frame air cylinder 1114 is used to pivot the left side clamping finger assembly 500 in order for the clamp fingers 530a and 530b to engage the interior left perimeter side 26 of screen frame 16.

Right Side Clamping Slide Carriage Assembly 600

Figure 12:
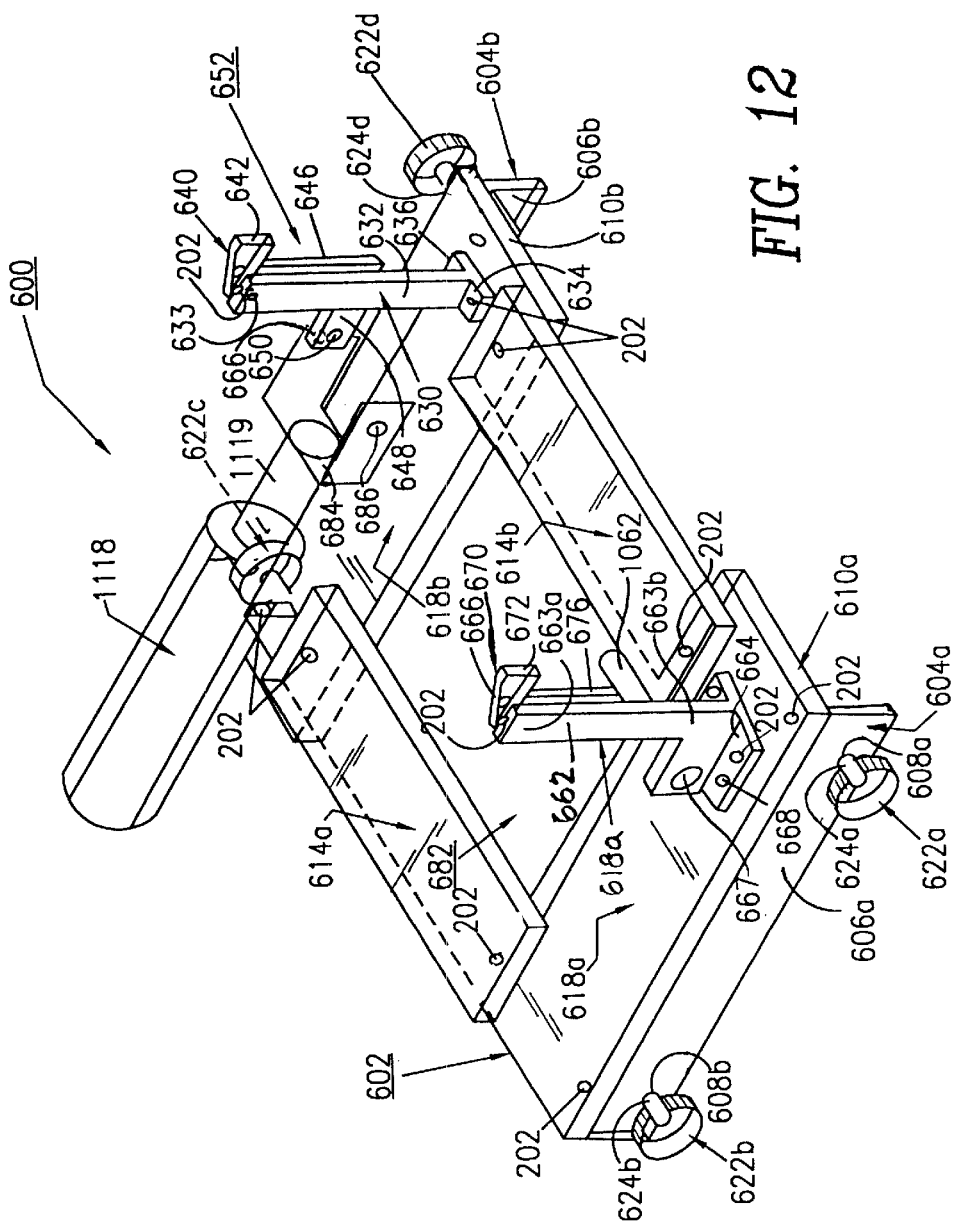
FIG. 12 is a front perspective view of the automated screening machine of the present invention showing the right side clamping carriage assembly and its component parts contained therein and in an assembled state.
Figure 12A:
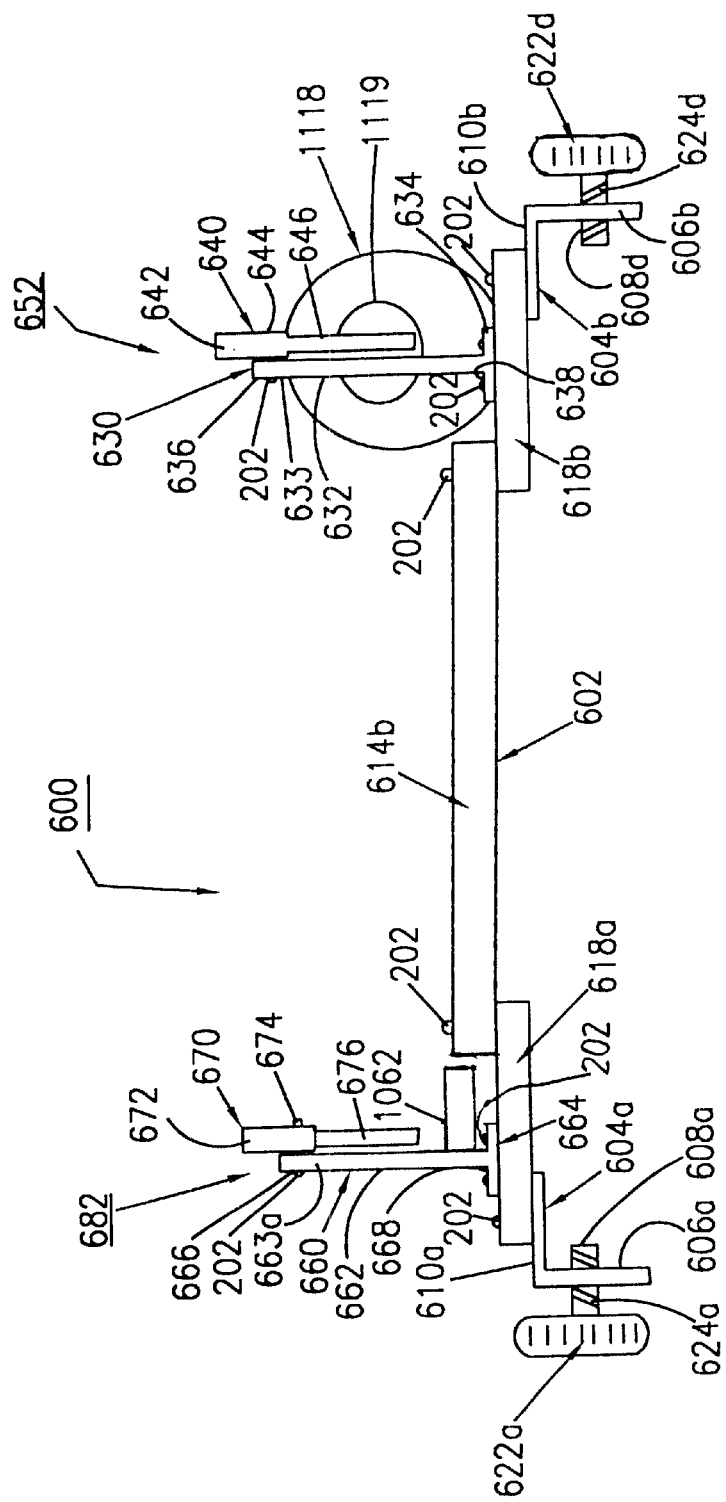
FIG. 12A is a side elevational view of the automated screening machine of the present invention showing the right side clamping carriage assembly and its component parts in an assembled state.
Figure 13:
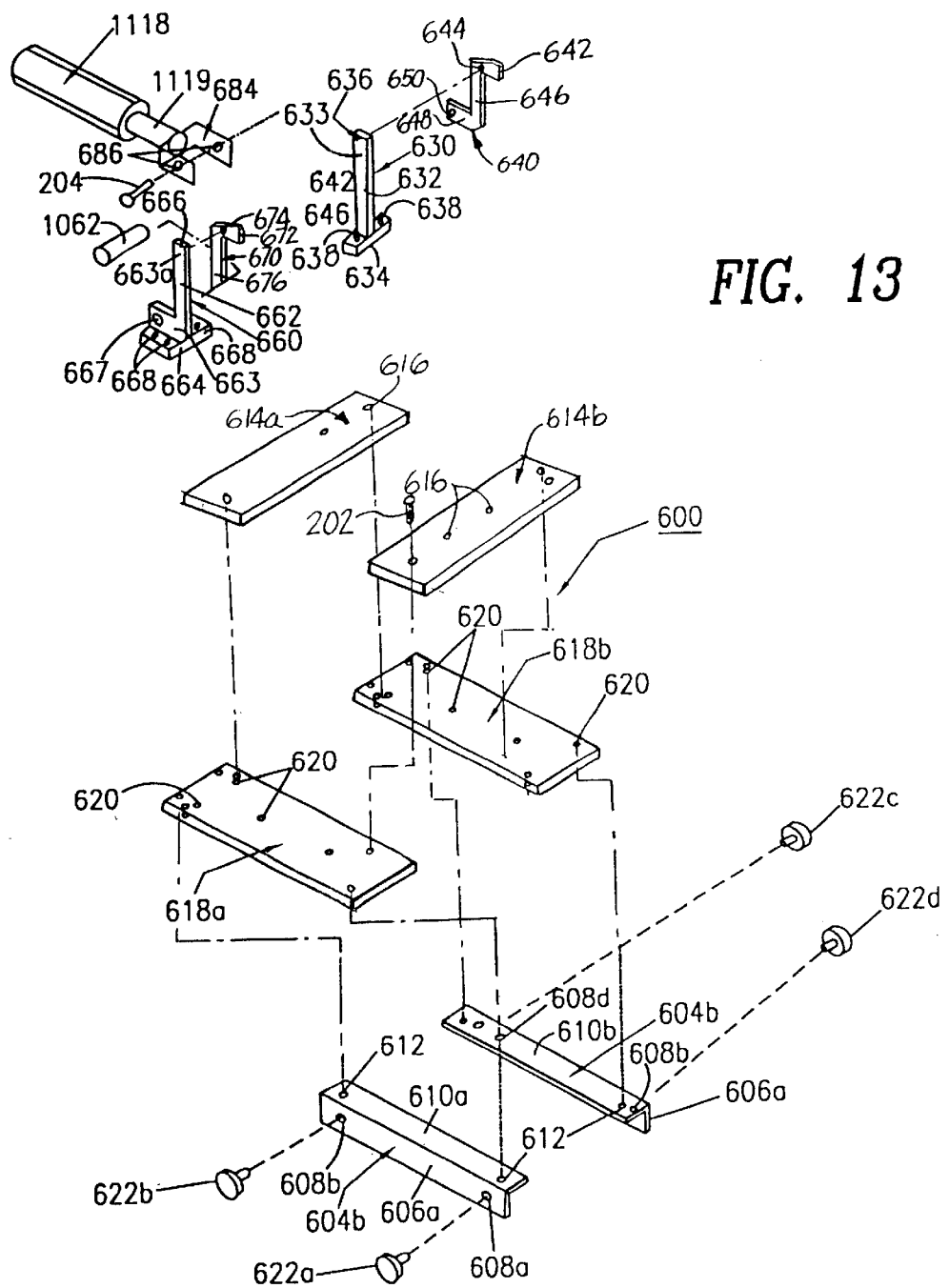
FIG. 13 is an exploded front perspective view of the automated screening machine of the present invention showing the right side clamping carriage assembly and its component parts contained therein and in an unassembled state.

The right side clamping slide carriage assembly 600, as shown in FIGS. 1, 2, 2a, 3, 12, 12a, 13, 18, 22, 24 and 27 of the patent drawings, is used to sense and reference the x-axis size (length) of the window screen frame 16 and is also used for clamping and holding of the interior first side (right side) 22 of the window screen frame 16, respectively. The right side clamping slide carriage assembly 600 includes a carriage frame 602 being substantially rectangular in configuration, as shown in FIG. 12. Carriage frame 602 includes a pair of angled support members 604a and 604b being L-shaped in configuration each having a vertical side wall 606a and 606b with a pair of spaced-apart threaded shaft openings 608a and 608b, and 608c and 608d therein for vertical side walls 606a and 606b, respectively, and having horizontal top walls 610a and 610b with mounting openings 612 thereon, a pair of cross support members 614a and 614b having a plurality of mounting openings 616 thereon, a pair of top support members 618a and 618b having a plurality of mounting openings 620 thereon, and a plurality of bearing wheels 622a, 622b, 622c and 622d each having a threaded shaft 624a, 624b, 624c and 624d thereon. The threaded shaft openings 608a and 608b of angled support member 604a and the threaded shaft openings 608c and 608d of angled support member 604b are for receiving the threaded shafts 624a to 624d of bearing wheels 622a to 622d, respectively, as depicted in FIGS. 12 and 13 of the drawings. The support members 618a, 618b, 614a, 614b, 604a and 604b are mounted and joined together by aligning the corresponding mounting openings 620, 616 and 612 appropriately, which are then held together by a plurality of machine screws 202 in order to form the assembled carriage frame 602, as shown in FIG. 12 of the drawings.

The right side clamping slide carriage assembly 600 also includes a rear right side clamp support member 630 and a rear right side clamping finger support member 640 being substantially S-shaped. The rear right side clamp support member 630 includes a vertical support arm 632 and an integrally attached base member 634 thereon. The upper end 633 of vertical support arm 632 includes an attachment opening 636 therethrough. Base member 634 includes a plurality of mounting opening 638 for attaching to the mounting openings 620 of the (right) top support member 618b via machine screws 202, as shown in FIGS. 12 and 12A of the drawings. The clamping finger support member 640 includes an upper clamping head section 642 having a first attachment opening 644 therein, a vertical middle support section 646 and a lower horizontal support section 648 having a second attachment opening 650 therein. The clamping head section 642 of clamping finger support member 640 is mounted and attached to the vertical support arm 632 of clamp support member 630 by aligning each of the corresponding attachment openings 644 and 636, respectively, and then connected together by a machine screw 202, as shown in FIGS. 12A and 13. The joined and connected clamp support member 630 and clamping finger support member 640 form a rear right clamping finger support member 652, as shown in FIGS. 12 and 12A.

The right side clamping slide carriage assembly 600 further includes a front right side clamp support member 660 and a front right side clamping finger support member 670 being substantially L-shaped. The front right side clamp support member 660 includes a vertical support arm 662 and an integrally attached base member 664 thereon. The upper end 663a of vertical support arm 662 includes an attachment opening 666 therethrough and the lower end 663b of vertical support arm 662 includes sizing sensor opening 667 therethrough. Base member 664 includes a plurality of mounting openings 668 for attaching to the (left) top support member 618a via machine screws 202, as shown in FIGS. 12 and 12A of the drawings. The front right side clamping finger support member 670 includes an upper clamping head section 672 having an attachment opening 674 therein and a vertical support section 676 being integrally attached to the upper clamping head section 672. The clamping head section 672 of clamping finger support member 670 is mounted and attached to the vertical support arm 662 of clamp support member 660 by aligning each of the corresponding attachment openings 674 and 666, respectively, and then connected together by a machine screw 202, as shown in FIGS. 12A and 13. The joined and connected clamp support member 660 and clamping finger support member 670 form a complete structure of an assembled front clamping finger support member 682, as shown in FIGS. 12 and 12A. The assembled rear right and front right clamping finger support members 652 and 682 are in y-axis alignment with each other on each of the top support members 618b and 618a, respectively, such that the clamping heads 642 and 672 of each clamping finger support members 652 and 682 will engage, clamp and hold the interior right side 22 of window screen frame 16 in place for proper splining and screening during the splining and screening operation cycle.

The right side clamping slide carriage assembly 600 additionally includes a rear clamping finger air cylinder 1118 having a piston shaft 1119 thereon and a x-axis frame sizing sensor 1062. Piston shaft 1119 of rear clamping finger air cylinder 1118 includes a piston mounting bracket 684 thereon and having attachment openings 686 therethrough. The attachment openings 686 of piston mounting bracket 684 are aligned with attachment opening 650 of the lower support section 648 of the clamping finger member 640, as shown in FIGS. 12 and 13, where then the aligned attachment openings 686 and 650 receive a machine bolt 204 for connecting and joining of the piston mounting bracket 684 to the lower support section 648 of the clamping finger member 640. The x-axis frame sizing sensor 1062 is received within the sizing sensor opening 677, as shown in FIGS. 12, 12A and 13 of the drawings.

Each of the bearing wheels 622a and 622b having a threaded shaft 624a and 624b are connected to each of the threaded shaft openings 608a and 608b of the angle support members 604a and 604b, respectively, by a screw 202. The bearing wheels 622a and 622b are used to guide the clamping carriage assembly 600 along the guide rails 142a to 142d, respectively. The angle support members 604a and 604b are connected to the mounting openings 620 of the top support members 618a and 618b, respectively, by machine screws 202. The angle support members 604a and 604b are used to support the bearing wheels 622a and 622b, respectively. Each of he cross-support members 614a and 614b are connected to each of the top support members 618a and 618b, respectively, by screws 202. The cross-support members 614a and 614b are used to connect the top support members 618a and 618b, respectively, together. Each of the top support members 618a and 618b are connected to each of the angle support members 604a and 604b and to each of the cross support members 614 and 614b, respectively, by screws 202. The top support members 618a and 618b are used to support the clamp support members 660 and 630, respectively. The rear clamp support member 630 is connected to the top support member 681b by machine screws 202 and through mounting openings 638 on base member 634 of the rear clamp support member 630, and to the rear clamping finger 640 by a machine screw 202. The rear clamp support member 630 is used to support the rear clamping finger 640. The front clamp support member 660 is connected to the top support member 618a by machine screws 202 through mounting openings 668 on base member 664 of the front clamp support member 660 and to the front clamp finger 670 by a machine screw 202. The front clamp support member 660 is used to support the front clamping finger 670. The rear clamping finger 640 is connected to the rear clamp support member 630 by a machine screw 202 and to the air cylinder mounting bracket 684 attached to the piston shaft 1119 of rear clamping finger air cylinder 1118 by a machine bolt 204 through mounting openings 686. The rear clamping finger 640 is used to clamp the interior right side edge 22 of the screen frame 16. The front clamping finger 670 is connected to the front clamp support member 66 by machine screws 202. The front clamping finger 670 is used to clamp the interior right side edge 22 of the screen frame 16, as well as to contact the interior right side edge 22 of the screen frame 16 to trigger the x-axis frame sizing sensor 1062. The x-axis frame sizing sensor 1062 is connected to the assembled front frame clamping finger support member 652 by a machine screw 202. The x-axis frame sizing sensor 1062 is used with the front clamping finger 640 to sense and reference the x-axis or length of side edge 24/28 of the screen frame 16. The rear clamping finger air cylinder 1118 is connected to the top support plate 618b by machine screws 202 and to the assembled rear clamping finger support member 682 by a machine screw 202. The rear clamping finger air cylinder 1118 is used to pivot the assembled rear clamping finger into or out of the clamping position, as shown in FIGS. 12, 22 and 24 of the drawings.

Rear Side Frame Clamping Assembly 700

Figure 24:
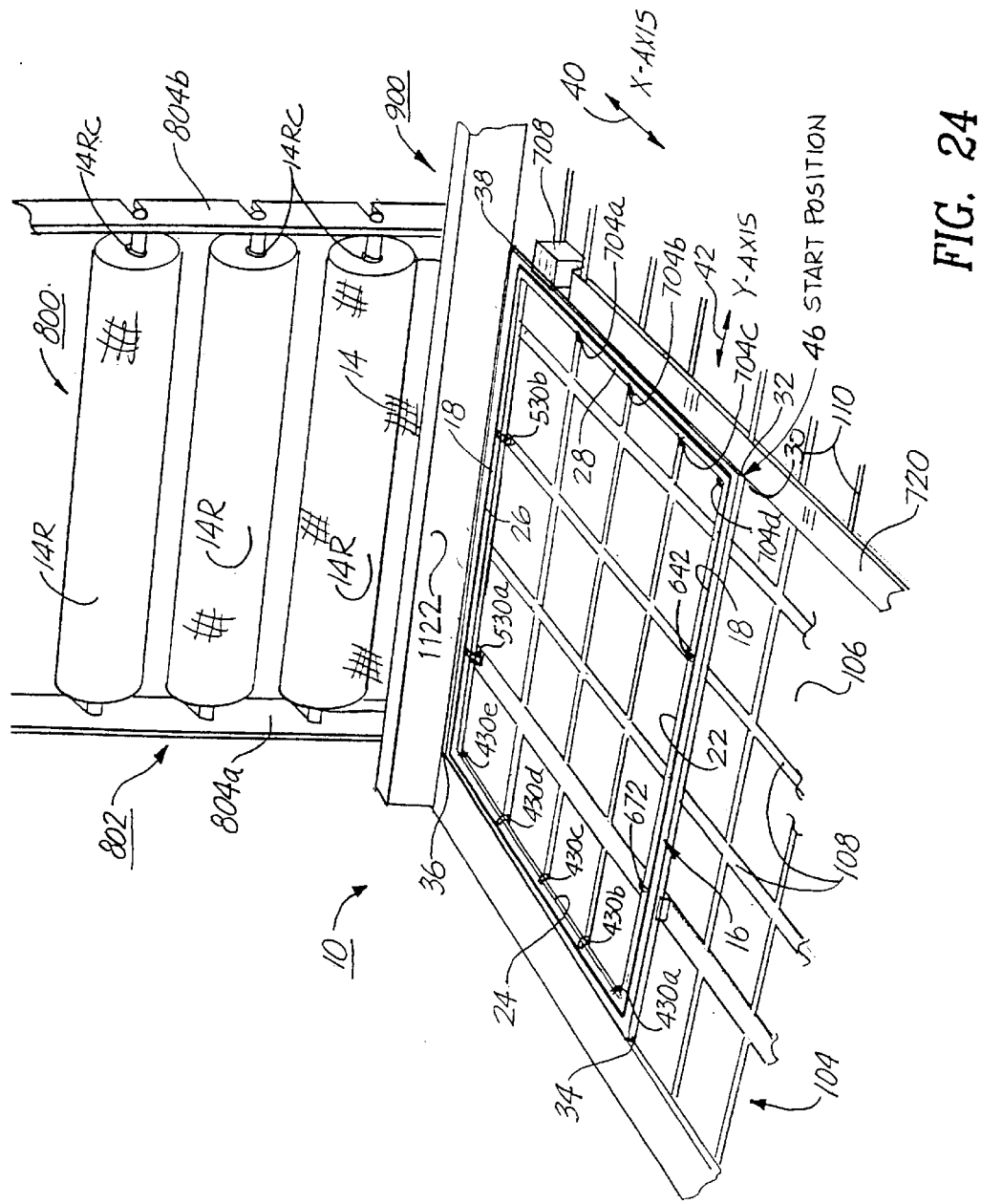
FIG. 24 is a perspective view of the automated screening machine of the present invention showing the clamping fingers from the clamping assemblies placed on each of the four inner perimeter sides of the screen frame prior to the start-up of the screening cycle.
Figure 27:
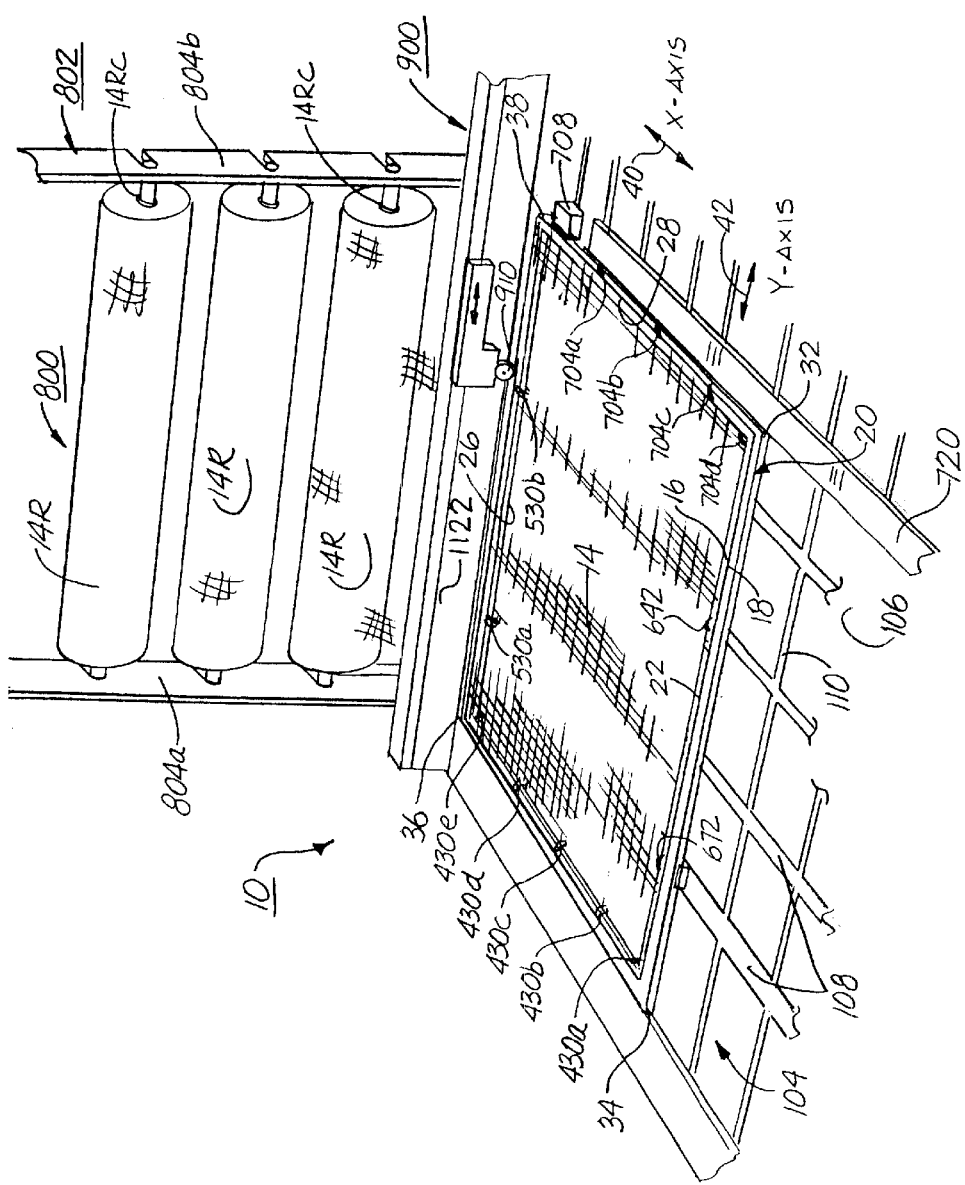
FIG. 27 is a perspective view of the automated screening machine of the present invention showing the cutter wheel knife of the screen roll cutter assembly cutting the screening material off of the screen roll holder from the left side of the screen frame.

The rear side frame clamping assembly 700, as shown in FIGS. 2, 2B, 3, 14, 15, 18, 22, 24 and 27 of the patent drawings, is used to sense and reference the width (y-axis direction 42) of the screen frame 16 using the y-axis frame sizing sensor 1060. The rear side frame clamping assembly 700 is also used for clamping and holding the interior rear perimeter side 28 of the window screen frame 16, as depicted in FIGS. 24 and 27 of the drawings. The rear side frame clamping assembly 700 includes a plurality of rear frame clamping finger members 702a, 702b, 702c and 702d, a y-axis frame sizing sensor block 708 having a sensor block slide bar 710 attached thereto, a plurality of clamping push rods 712a, 712b and 712c, a y-axis frame sizing sensor bracket 714 having mounting openings 716 therein, and a y-axis frame sizing sensor 1600. The rear side frame clamping assembly 700 also includes a pair of drive belt clamps 718a and 718b, a rear frame clamping bar member 720g a rear frame clamp mounting bar 722, and a pair of rear frame clamp air cylinders 1120a and 1120b each having a piston shaft 1121a and 1121b, respectively, thereon.

Figure 14:
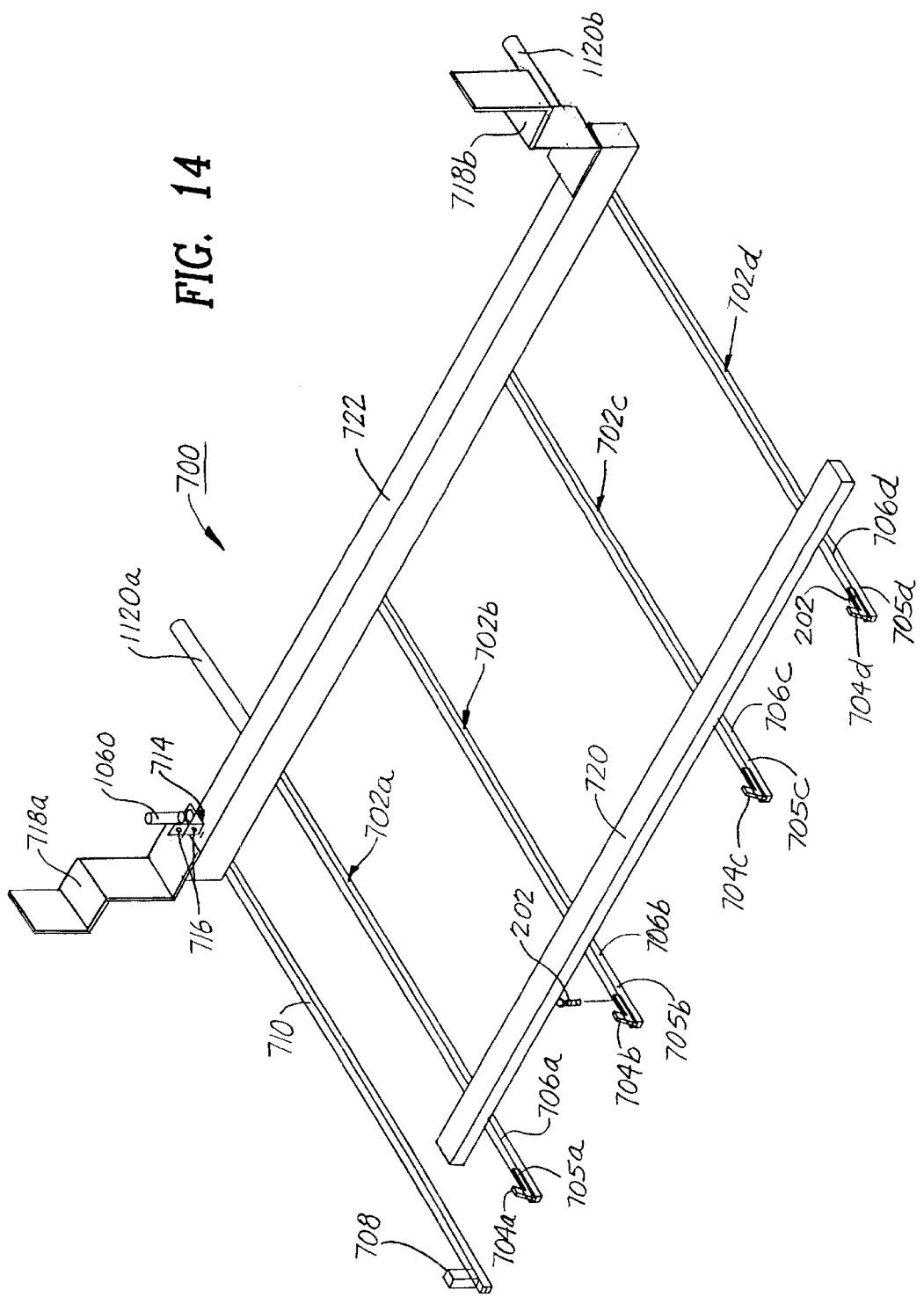
FIG. 14 is a front perspective view of the automated screening machine of the present invention showing the rear side frame clamping assembly and its component parts contained therein and in an assembled state.
Figure 15:
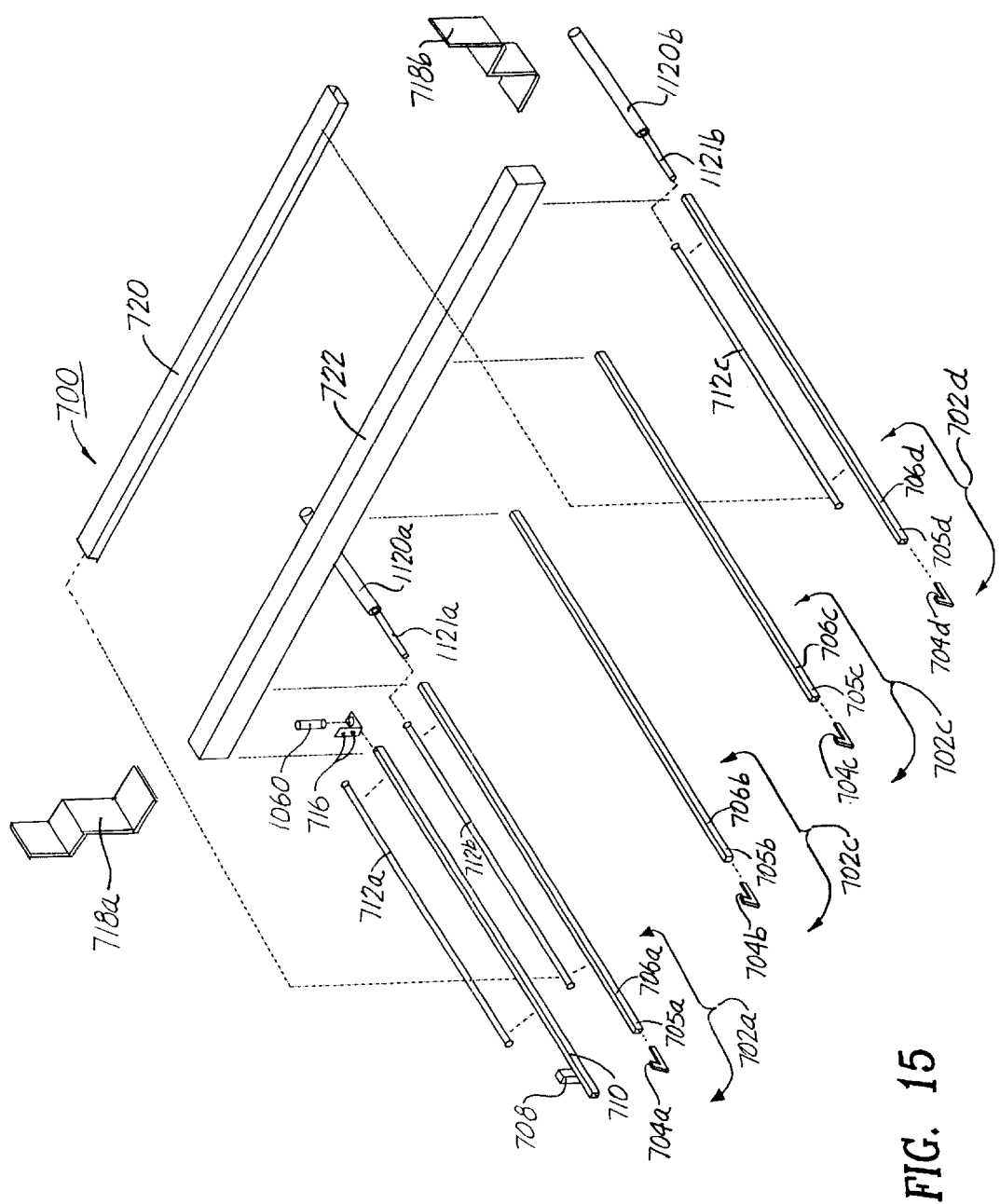
FIG. 15 is an exploded perspective view of the automated screening machine of the present invention showing the rear side frame clamping assembly and its component parts contained therein and in an unassembled state.

Each of the rear frame clamping finger members 702a, 702b, 702c and 702d include a clamping head 704a, 704b, 704c and 704d being attached at the inner end 705a, 705b, 705c and 705d of the U-shaped channeled slide bars 706a, 706b, 706c and 706d, respectively, to form the assembled clamping finger members 702a, 702b, 702c and 702d, as depicted in FIGS. 2B, 14 and 15 of the drawings, respectively. The plurality of clamping heads 704a, 704b, 704c and 704d of the rear frame clamping finger members 702a, 702b, 702c and 702d, respectively, engage the interior perimeter rear side 28 of window screen frame 16 in which to firmly hold the screen frame 16 in position for the screening and splining cycle. Each of the clamping heads 704a to 704d is connected to a clamping slide bar 706a to 706d by a machine screw 202, respectively, to form the aforementioned rear frame clamping finger members 702a to 702d thereof. The clamping heads 704a to 704d, as depicted in FIGS. 18, 22, 24 and 27, are used to clamp and hold the interior perimeter of the rear side 28 of the screen frame 16 prior to the screening and splining cycle.

Figure 18:
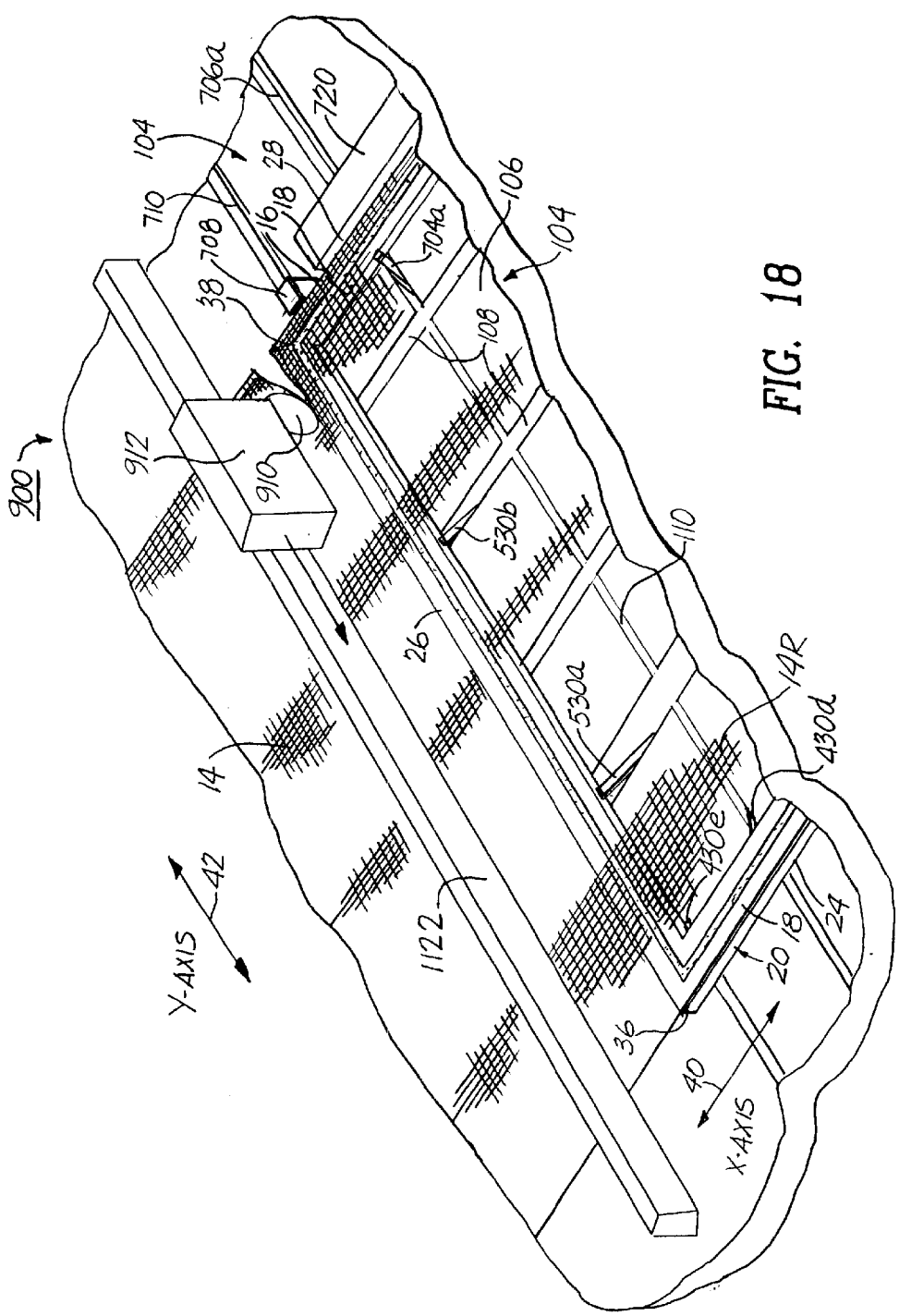
FIG. 18 is a front perspective view of the automated screening machine of the present invention showing the screen roll cutter assembly and its component parts contained therein and in an assembled state.
Figure 19:
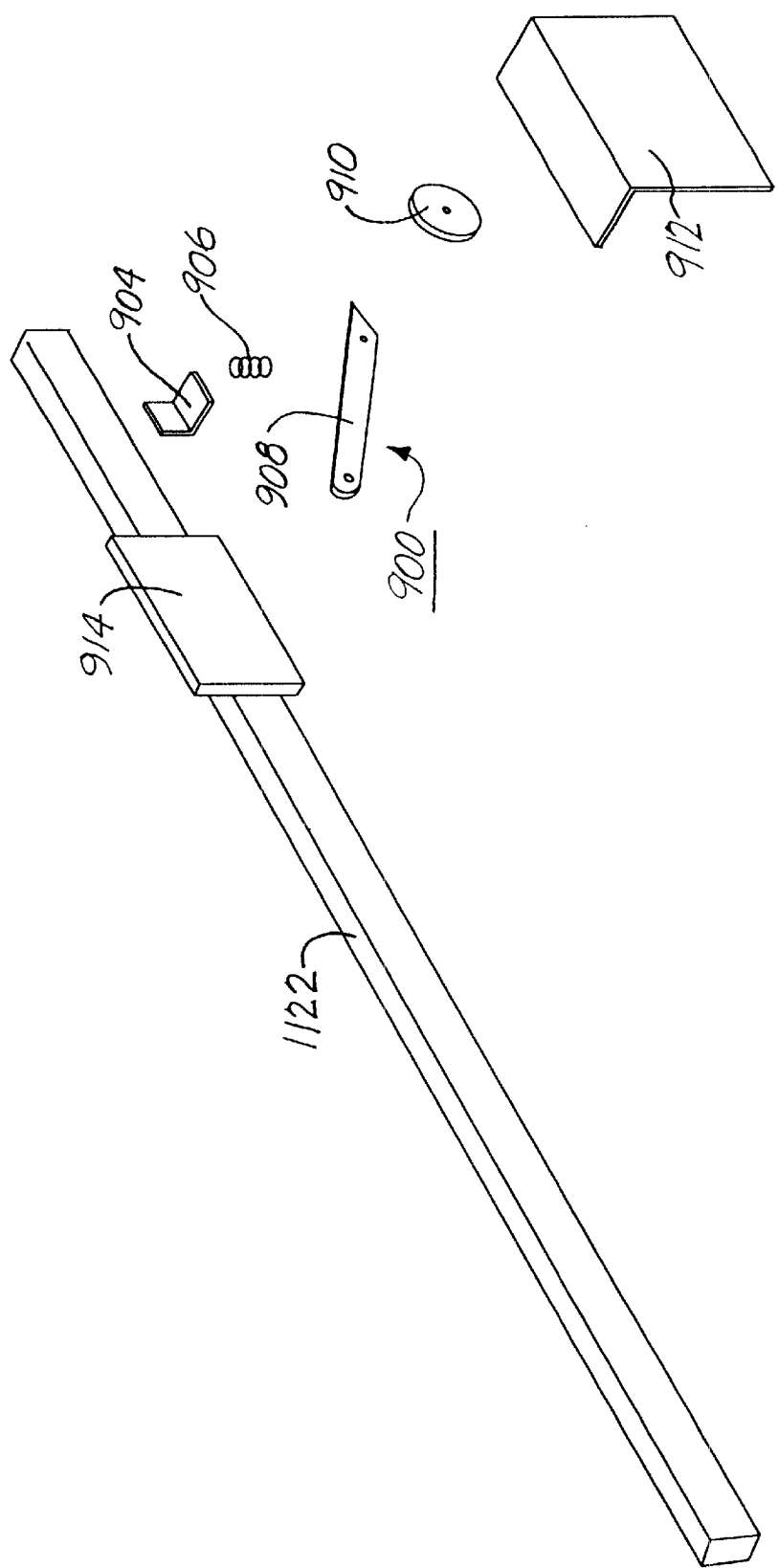
FIG. 19 is an exploded front perspective view of the automated screening machine of the present invention showing the screen roll cutter assembly and its component parts contained therein and in an unassembled state.

The y-axis frame sizing sensor block 708 is connected at the inner end 709a of the sensor block slide bar 710 by machine screws 202, as shown in FIG. 15, and the clamping push rod 712a is received within sensor block slide bar 710 and clamping push rod 712a is connected and aligned at the outer end 709b of the sensor block slide bar 710 by machine screws 202, as depicted in FIG. 15. The y-axis frame sizing sensor block 708 is used to move the clamping push rod 712a in front of the y-axis frame sizing sensor 1060. In operation, the y-axis frame sizing sensor block 708 is positioned on the exterior rear perimeter side 28 and adjustment to corner 38 of screen frame 16, as depicted in FIGS. 18 and 22 of the drawings. Each of the clamping push rods 712b and 712c are received within and connected to clamping slide bars 706a and 706d, respectively, by machine screws 202. Each of the clamping push rods 712b and 712c are also connected to the rear frame clamping bar member 720 and to the rear frame clamp air cylinders 1120a and 1120b, respectively, by machine screws 202, as depicted in FIGS. 14 and 15 of the drawings. Clamping push rods 712*b* and 712*c* are used to move the rear frame clamping bar member 720 to engage and clamp onto the exterior rear perimeter side 28 of the window screen frame 16, as shown in FIG. 22. The y-axis frame sizing sensor bracket 714 is connected to the rear frame clamp mounting bar 722 by machine screws 202 through mounting openings 716, as depicted in FIGS. 14 and 15. The y-axis frame sizing sensor bracket 714 is used to mount and attach the y-axis frame sizing sensor 1060 thereto. The y-axis frame sizing sensor 1060 is connected to the y-axis frame sizing sensor bracket 714 by a set screw 206. The y-axis frame sizing sensor 1060 is used to sense and reference the clamping push rod 712*a*, thereby sensing the width of the screen frame 16 along the y-axis direction 42. Each of the clamping slide bars 706*a* to 706*d* are connected to the rear frame clamp mounting bar 722 by machine screws 202 at the outer ends 707*a*, 707*b*, 707*c* and 707*d* of the clamping slide bars 706*a*, 706*b*, 706*c* and 706*d*, respectively, thereto, as depicted in FIG. 14 of the drawings. The clamping slide bars 706*a*, to 706*d* are used to mount the clamping heads 704*a* to 704*d*, the clamping push rods 712*b* and 712*c* and the rear frame clamp air cylinders 1120*a* and 1120*b*, respectively, thereon.

The drive belt clamps 718*a* and 718*b* are connected at each outer end 728*a* and 728*b* of the rear frame clamp mounting bar 722 by machine screws, as shown in FIGS. 14 and 15. The drive belt clamps 718*a* and 718*b* are used to clamp the rear frame clamping slide belts 162*a* and 162*b*, respectively, of the rear frame clamping slide sub-assembly 160 in position, as shown in FIG. 2B of the drawings. The rear frame clamping bar member 720 is connected to the clamping push rods 712*a* to 712*c* by machine screws 202. The rear frame clamping bar member 720 is used for clamping and holding the exterior rear perimeter side 28 of the window screen frame 16 in position, as shown in FIGS. 22 and 24 of the drawings, prior to the start of the screening and splining cycle. The rear frame clamp mounting bar 722 is connected to the drive belt clamps 718*a* and 718*b* and to the clamping slide bars 708*a* to 708*d* by machine screws 202. The rear frame clamp mounting bar 722 is used to mount and hold the clamping slide bars 708*a* to 708*d*, the drive belt clamps 718*a* and 718*b* and the y-axis frame sensor mounting bracket 714 in position. The rear frame clamp air cylinders 1120*a* and 1120*b* are each connected to clamping slide bars 706*a* and 706*d* and to clamping push rods 712*b* and 712*c*, respectively, by a machine screw 202. The rear frame clamp air cylinders 1120*a* and 1120*b* are used to push and retract the push rods 712*b* and 712*c*, respectively, in which to move and retract the rear frame clamping bar member 720 from the exterior rear perimeter side 28 of the window screen frame 16.

Screen Tensioning and Screening Roll Holder Assembly 800

Figure 16:
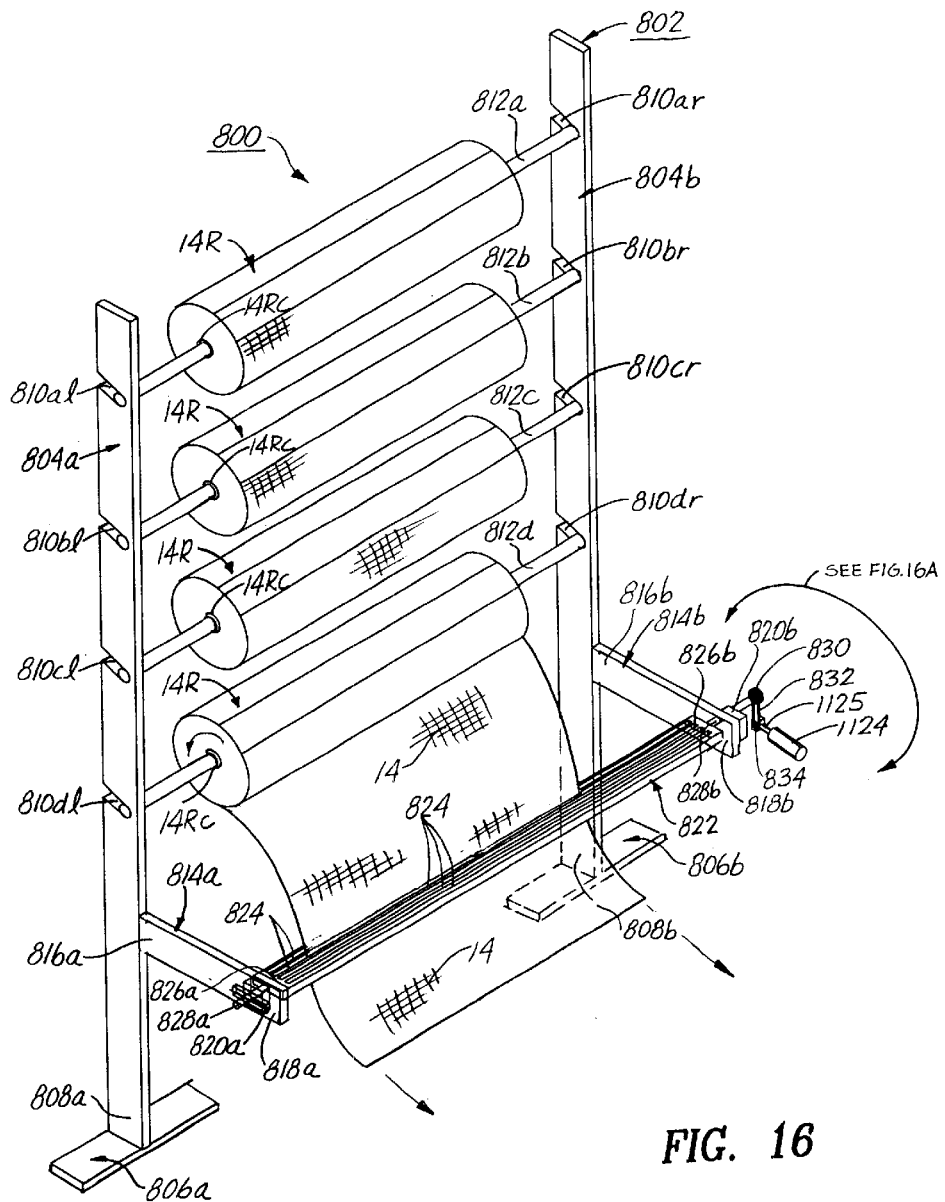
FIG. 16 is a front perspective view of the automated screening machine of the present invention showing the screen tensioning and screen roll holder assembly and its component parts contained therein and in an assembled state.
Figure 16A:
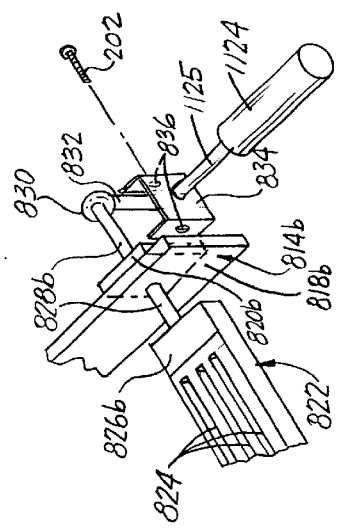
FIG. 16A is an enlarged perspective view of the automated screening machine of the present invention showing the tension bar air cylinder, the pinch bar, the pivot bar retainer, the horizontal support member, the bearing block member, and the screen tensioning bar in an assembled state thereof.
Figure 17:
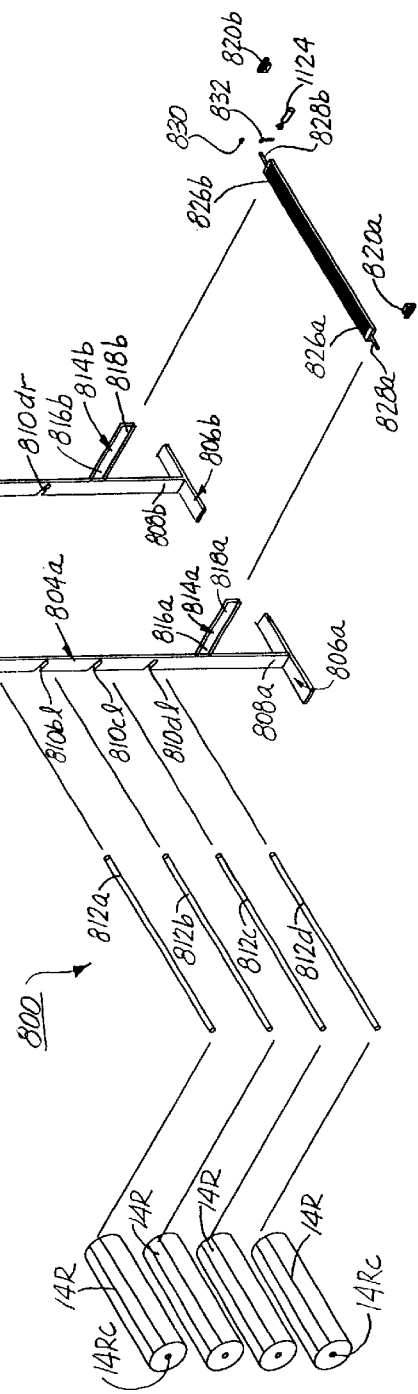
FIG. 17 is an exploded perspective view of the automated screening machine of the present invention showing the screen tensioning and screen roll holder assembly and its component parts contained therein and in an unassembled state.

The screen tensioning and screen roll holder assembly 800, as shown in FIGS. 1, 2, 3, 16, 16*a*, 17 and 27 of the patent drawings, is used to apply tension to the screen material 14 from a screening material roll 14R within the screen tension bar 822 prior to the screening and splining operational cycle. The holder assembly also serves to hold the various width screening material rolls 14R of screen material 14, as depicted in FIGS. 1 and 16 of the drawings. The screen tensioning and screen roll holder assembly 800 includes a holder frame 802 being substantially H-shaped in configuration. The holder frame 802 includes a pair of vertical strut members 804*a* and 804*b* each having an integrally attached base member 806*a* and 806*b*, respectively, thereon, being located at the lower end 808*a* and 808*b* of each vertical strut member 804*a* and 804*b*, respectively, as depicted in FIGS. 16 and 17 of the drawings. Each of the vertical strut members 804*a* and 804*b* includes matched and paired, downwardly slanted grooved channels 810*al* and 810*ar*, 810*bl* and 810*br*, 810*cl* and 810*cr*, and 810*dl* and 810*dr* for receiving and holding a screen material holding rod 812*a*, 812*b*, 812*c* and 812*d*, respectively. Thereon each holding rod 812*a* to 812*d* is detachably received within the roll hole opening 14*rc* of each screening material roll 14R, respectively, therethrough, as shown in FIGS. 16 and 17 of the drawings. The screen tensioning and screen roll holder assembly 800 also includes a pair of screen tension horizontal support members 814*a* and 814*b* being attached to each of the vertical strut members 804*a* and 804*b*, respectively, at the inner ends 816*a* and 816*b*, respectively, as depicted in FIGS. 16 and 17 of the drawings. Each of the horizontal support members 814*a* and 814*b* at their respective outer ends 818*a* and 818*b* includes a bearing block member 820*a* and 820*b*, respectively, thereon. Each of the bearing block members 820*a* and 820*b* are mounted and attached to a screen tensioning bar 822 therebetween. The screen tensioning bar 822 includes a plurality of screen tensioning slits 824 for receiving the screening material 14 within one of the screen tensioning slits 824 therethrough, as depicted in FIG. 16 of the drawings. At each of the outer ends 826*a* and 826*b* of the screen tensioning bar 822 include a tensioning pivot bar 828*a* and 828*b*, respectively, thereon. Each tensioning pivot bar 828*a* and 828*b* is received within each of the bearing block members 820*a* and 820*b*, respectively, in which to enable the screen tensioning bar 822 to rotate in a 120° degree arc. The screen tensioning and screen roll holder assembly 800 further includes a pivot bar retainer 830, a pivot bar 832 and a tension bar air cylinder 1124. Tension bar air cylinder 1124 includes a piston shaft 1125 having a tension bar bracket 834 thereon with mounting openings 836.

The vertical strut members 804*a* and 804*b* of holding frame 802 are connected to base members 806*a* and 806*b* and connected to the screen tension horizontal support members 814*a* and 814*b*, respectively. The vertical strut members 804*a* and 804*b* of holding frame 802 are used to position and hold the screen material holding rods 812*a*, 812*b*, 812*c* and 812*d* within the corresponding slanted grooved channels 810*al* and 810*ar*, 810*bl* and 810*br*, 810*al* and 810*cr* and 810*dl* and 810*dr* of vertical strut members 804*a* and 804*b*, respectively. Each of the screen tension horizontal support members 814*a* and 814*b* are connected to the horizontal frame member 116*l* of the machine base main frame 114 by bolts 130, as depicted in FIGS. 1, 2 and 3 of the drawings. The screen tension horizontal support members 814*a* and 814*b* are used to rotatably hold the screen tensioning bar 822 in place via the bearing block members 820*a* and 820*b*, respectively. The bearing block members 820*a* and 820*b* are connected to the tensioning pivot bars 828*a* and 828*b*, respectively, of screen tensioning bar 822. The bearing block members 820*a* and 820*b* are also connected to the horizontal frame member 116*l* by machine screws 202. The bearing block members 820*a* and 820*b* are used to rotatably support the screen tensioning bar 822 thereto. The pivot bar retainer 830 is connected to the pivot bar 832 by machine screws 202. The pivot bar retainer 830 is used to clamp the pivot bar 832 to the screen tensioning bar 822 via tensioning pivot bar 828*b* on the right side 826*b* of screen tensioning bar 822, as depicted in FIGS. 16 and 16*a* of the drawings. The pivot bar 832 is connected to the tensioning bar 822 via the pivot bar retainer 830. The pivot bar 832 is also connected to the tension bar mounting bracket 834 on piston shaft 1125 of tension bar air cylinder 1124 via a machine screw 202 through mounting openings 836 on mounting bracket 834, as shown in FIG. 16A of the drawings. The tension bar air cylinder 1124 is connected to the outer end 818b of the left horizontal support member 814b by machine screws 202. The tension bar air cylinder 1124 is also connected to the pivot bar 832 by a machine screw 202. The tension bar air cylinder 1124 is used to rotate the screen tensioning bar 822 such that the screening material 14 within the screen tensioning slit 824 of the screen tensioning bar 822 is tensioned, as shown in FIG. 16, during the screening and splining operational cycle in order to apply the proper tension to the screening material 14 for eliminating wrinkling of the screening material 14 during the screening and splining process cycle. In addition, the screen tensioning bar 822 will enable the cutter wheel 910 of the screen roll cutter assembly 900 to cut the screen material 14 from the screen material roll 14R after the screening and splining operational cycle has been completed.

Screen Roll Cutter Assembly 900

The screen roll cutter assembly 900, as shown in FIGS. 1, 2, 3, 18, 19, 24 and 27 of the patent drawings, is used for cutting the tensioned screening material 14 in the y-axis direction 42 from the screen roll 14R being held on the holder frame 802 of screen holder assembly 800. The screen roll cutter assembly 900 includes a rodless air cylinder (screen cutter air cylinder) 1122, a spring retaining bracket 904, a cutter wheel pressure spring 906, a cutter wheel pivot bar 908, a cutter wheel 910, a cutter wheel cover 912, and a pivot bar mounting plate 914.

The rodless air cylinder (screen cutter air cylinder) 1122 is connected to horizontal frame member 116*l* of the machine base main frame 114 by machine screws 202. The rodless air cylinder 1122 is used to move the cutter wheel 910 along the y-axis direction 42 in which to cut the tensioned screening material 14 from the screen material roll 14R, as depicted in FIGS. 18 and 27. The spring retaining bracket 904 is connected to the pivot bar mounting plate 914 by machine screws 202. The spring retaining bracket 904 is used to mount the cutter wheel pressure spring 906 thereto. The cutter wheel pressure spring 906 is connected and mounted to the spring retaining bracket 904 by a set screw 206. The cutter wheel pressure spring 906 is used to apply pressure to the cutter wheel pivot bar 908. The cutter wheel pivot bar 908 is connected to the pivot bar mounting plate 914 by a machine screw 202. The cutter wheel pivot bar 908 is used to mount and attach the cutter wheel 910. The cutter wheel 910 is connected to cutter wheel pivot bar 908 by a machine screw 202. The cutter wheel 910 is used to cut and sever the tensioned screening material 14 from the screen material roll 14R being held in the holder assembly 800, as shown in FIG. 18 of the drawings. The cutter wheel cover 912 is connected to the pivot bar mounting plate 914 by machine screws 202. The cutter wheel cover 912 is used to protect the operator from injury by covering and shielding the cutter wheel 910 when in operational use thereof. The pivot bar mounting plate 914 is connected to the rodless air cylinder 1122 by machine screws 202. The pivot bar mounting plate 914 is used to mount and attach the spring retaining bracket 904, the cutter wheel pivot bar 908 and the cutter wheel cover 912 thereto.

Electronic Control System 1000

The electronic control system 1000, as shown in FIGS. 1 through 7, 12 through 15, 20, 25 and 26 of the patent drawings, is used for electronically controlling the operation of the automatic screening and splining apparatus 10. Electronic control system 1000 provides the electronic for the aforementioned assemblies 100, 200, 300, 400, 500, 600, 700, 800, 900 and 1100. The electronic control system 1000 includes a computer control module 1002, a main power supply 1004, a plurality of solid state relays 1006, 1008, 1010, 1012, 1014, 1016, 1018, 1020, 1022, 1024, 1026, 1028, 1030 being electronically connected to a plurality of solenoid valves 1132, 1134, 1136, 1138, 1140, 1142, 1144, 1146, 1148, 1150, 1152 and 1154, respectively, and to a main contactor 1032. The electronic control system 1000 further includes a plurality of servomotor controllers 1034, 1036, 1038, 1040, 1042 and 1044 for controlling swivel servomotor 242, splining head x-axis servomotor 330, sliding carriage y-axis servomotor 190, spline advance feeder stepper motor 238, clamping carriage servomotor 154 and rear frame clamping slide servomotor 170, respectively, a mounted electronic control panel box 1064 and a portable electronic control cabinet 1070. The electronic control system 1000 also includes a plurality of sensors 1046, 1048, 1050, 1052, 1054, 1056, 1058, 1060 and 1062 for controlling the aforementioned assemblies.

Figure 20:
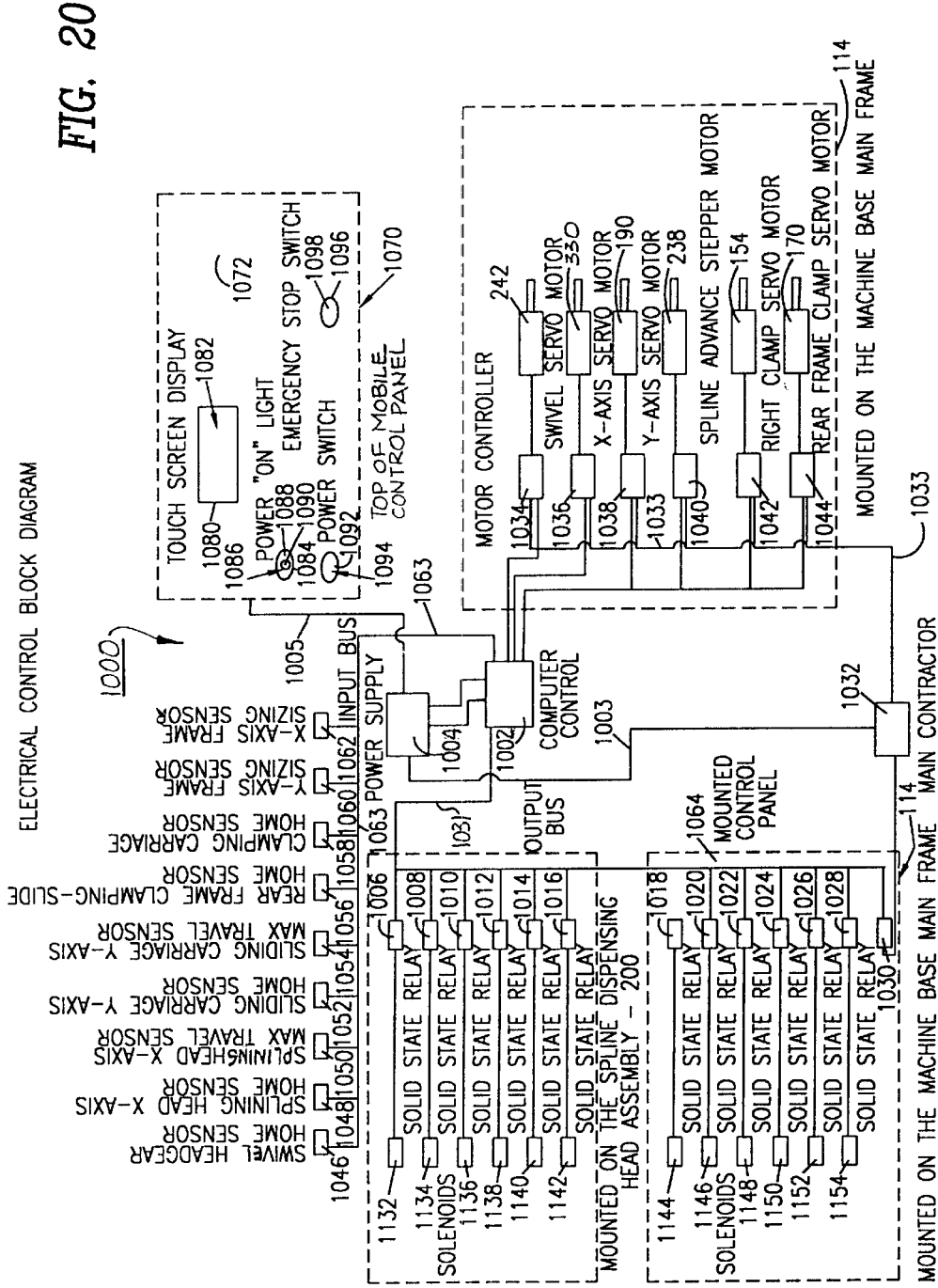
FIG. 20 is a schematic block diagram of the automated screening machine of the present invention showing the electronic control system and its component parts contained therein.

The computer control module 1002 provides the control aspect to the various aforementioned assemblies of apparatus 10. The main power supply 1004 is used for supplying the electrical power to the solid state relays 1006 to 1030 and their corresponding solenoid valves 1132 to 1154 and to the main contactor 1032, respectively, by electrical lines 1031 connected to the computer control module 1002. The solid state relays include a screen cutter frame solid state relay 1006, a spline cutter solid state relay 1008, a spline guide plate solid state relay 1010, a spline pinch solid state relay 1012, a corner height solid state relay 1014, a dispensing head slide solid state relay 1016, a left finger clamp solid state relay 1018, a front finger clamp solid state relay 1020, a right finger clamp solid state relay 1022, a rear frame clamp solid state relay 1024, a screen roll cutter solid state relay 1026, a tension bar solid state relay 1028, and a main contactor solid state relay 1030. The solid state relays 1006 to 1030 are used to enable and activate their corresponding solenoid valves 1132 to 1154, and main contactor 1032, respectively. The main contactor 1032 supplies electrical power, as well as initializing and activating the servomotor controllers 1034, 1036, 1038, 1040, 1042 and 1044 and then corresponding servomotors 242, 330, 190, 238, 154 and 170, respectively, by electrical lines 1033, as shown in FIG. 20 of the drawings. The servomotor controllers include a swivel servomotor controller 1034, an x-axis splining head servomotor controller 1036, a y-axis sliding carriage servomotor controller 1038, a spline advance stepper motor controller 1040, a clamping carriage servomotor controller 1042 and a rear frame clamping slide servomotor controller 1044.

The mounted electronic control panel box 1064 includes an access door 1066 having a handle 1067 thereon, an interior compartment 1068 for mounting various electrical components therein. The mounted control panel cabinet 1070 includes a control panel top wall 1072, a control panel front wall 1073 having an access door 1074 with a handle 1075 thereon, an interior compartment 1076 therein and a bottom wall 1077 having a plurality of castors 1078a, 1078b, 1078c and 1078d thereon for moving the panel cabinet 1070 from one location to another location. The control panel top wall 1072 includes a rectangular opening 1080 for receiving a touch screen display 1082 therein, a first oval/circular opening 1084 for receiving a power-on light 1086 having a lens 1088 and light bulb 1090 therein, a second oval/circular opening 1092 for receiving a power switch/button 1094 therein, and a third oval/circular opening 1096 for receiving an emergency stop switch/button 1098 therein. The touch screen display 1082 include various control commands for the screening and splining cycle, such commands that are displayed for example include "Press to Initialize", "Cycle Start Button," "Reset Start Button," "Clamp Start Button", "Spline Load" "Profile Selection", "Debug" and "Frame Parameter Changes" for use by the operator. The power-on light 1086 is used for signaling the operator that electrical power has been supplied to the main contactor 1032 and apparatus 10 is ready for operational use by the operator. The power button/switch 1094 controls the input of electrical power to apparatus 10. The emergency stop switch/button 1098 allows the operator to instantaneously stop the operation of apparatus 10 when a problem occurs. The electronic controls 1082, 1086, 1094 and 1098 are connected to the main power supply 1004 via electrical line 1005, as shown in FIG. 20 of the drawings.

As shown in FIG. 20, the automatic screening apparatus 10 include various apparatus sensors for the electronic control system 1000 that include a swivel head gear home sensor 1046, an x-axis splining head home sensor 1048, an x-axis splining head max travel sensor 1050, a y-axis sliding carriage home sensor 1052, a y-axis sliding carriage max travel sensor 1054, a rear frame clamping slide home sensor 1056, a clamping carriage home sensor 1058, ay-axis frame sizing sensor 1060 and an x-axis frame sizing sensor 1062. The aforementioned electronic sensors 1046 to 1062 are connected to the computer control module 1002 via electrical lines 1063, as depicted in FIG. 20.

As shown in FIG. 20, the screen cutter frame solid state relay 1006 is mounted within the interior compartment 1076 of the mobile control panel cabinet 1070 by machine screws 202. The screen cutter frame solid state relay 1006 is used to electronically enable the screen cutter frame solenoid valve 1132. The spline cutter solid state relay 1008 is mounted within the interior compartment 1076 of the mobile control panel cabinet 1070 by machine screws 202. The spline cutter solid state relay 1008 is used to electronically enable the spline cutter solenoid valve 1134. The spline guide plate solid state relay 1010 is mounted within the interior compartment 1076 of the mobile control panel cabinet 1070 by machine screws 202. The spline guide plate solid state relay 1010 is used to electronically enable the spline guide plate solenoid valve 1136. The spline pinch solid state relay 1012 is mounted within the interior compartment 1076 of the mobile control panel cabinet 1070 by machine screws 202. The spline pinch solid state relay 1012 is used to electronically enable the spline pinch solenoid valve 1138. The corner height solid state relay 1014 is mounted within the interior compartment 1076 of the mobile control panel cabinet 1070 by machine screws 202. The corner height solid state relay 1014 is used to electronically enable the corner height solenoid valve 1140. The dispensing head slide solid state relay 1016 is mounted within the interior compartment 1076 of the mobile control panel cabinet 1070 by machine screws 202. The dispensing head slide solid state relay 1016 is used to electronically enable the dispensing head slide solenoid valve 1142. The left finger clamp solid state relay 1018 is mounted within the interior compartment 1076 of the mobile control panel cabinet 1070 by machine screws 202. The left finger clamp solid state relay 1018 is used to electronically enable the left finger clamp solenoid valve 1144. The front finger clamp solid state relay 1020 is mounted within the interior compartment 1076 of the mobile control panel cabinet 1070 by machine screws 202. The front finger clamp solid state relay 1020 is used to electronically enable the front finger clamp solenoid valve 1146. The right finger clamp solid state relay 1022 is mounted within the interior compartment 1076 of the mobile control panel cabinet 1070 by machine screws 202. The right finger clamp solid state relay 1022 is used to electronically enable the right finger clamp solenoid valve 1148. The rear frame clamp solid state relay 1024 is mounted within the interior compartment 1076 of the mobile control panel cabinet 1070 by machine screw 202. The rear frame clamp solid state relay 1024 is used to electronically enable the rear frame clamp solenoid valve 1150. The screen roll cutter solid state relay 1026 is mounted within the interior compartment 1076 of the mobile control panel cabinet 1070 by machine screws 202. The screen roll cutter solid state relay 1026 is used to electronically enable the screen roll cutter solenoid valve 1152. The tension bar solid state relay 1028 is mounted within the interior compartment 1076 of the mobile control panel 1070 by machine screws 202. The tension bar solid state relay 1028 is used to electronically enable the tension bar solenoid valve 1154. The main contactor solid state relay 1030 is mounted within the interior compartment 1076 of the mobile control panel 1070 by machine screws 202. The main contactor solid state relay 1030 is used to electronically enable the main contactor 1032 in which enable the aforementioned solenoid valves 1132 to 1154, respectively.

As shown in FIG. 20, the swivel servomotor controller 1034 is mounted within the interior compartment 1076 of the mobile control panel cabinet 1070 by machine screws 202. The swivel servomotor controller 1034 is used to electronically control the swivel servomotor 242 for the rotating spline wheel sub-assembly 240 of spline dispensing head assembly 200. The x-axis splining head servomotor controller 1036 is mounted within the interior compartment 1076 of the mobile control panel cabinet 1070 by machine screws 202. The x-axis splining head servomotor controller 1036 is used to electronically control the x-axis splining head servomotor 330 for the splining head splining head slide assembly 300. The y-axis splining head servomotor controller 1038 is mounted within the interior compartment 1076 of the mobile control panel cabinet 1070 by machine screws 202. The y-axis splining head servomotor controller 1038 is used to electronically control the y-axis sliding carriage servomotor 190 for the sliding carriage sub-assembly 180 of frame assembly 100. The spline advance feeder stepper motor controller 1040 is mounted within the interior compartment 1076 of the mobile control panel cabinet 1070 by machine screws 202. The spline advance feeder stepper motor controller 1040 is used to electronically control the spline advance feeder stepper motor 1040 is used to electronically control the spline advance feeder stepper motor 238 for the spline feed sub-assembly 210 of spline dispensing head assembly 200. The clamping carriage servomotor controller 1042 is mounted within the interior compartment 1076 of the mobile control panel cabinet 1070 by machine screws 202. The clamping carriage servomotor controller 1042 is used to electronically control the clamping carriage servomotor 154 for the clamping carriage sub-assembly 140 of frame assembly 100. The rear frame clamping slide servomotor controller 1044 is mounted within the interior compartment 1076 of the mobile control panel cabinet 1070 by machine screws 202. The rear frame clamping slide servomotor controller 1044 is used to electronically control the rear frame clamping slide servomotor 170 for the rear frame clamping slide sub-assembly 160 of frame assembly 100.

As shown in FIG. 20, the swivel head gear home sensor 1046 is mounted to the head gear mounting bracket 270 of the rotating spline wheel sub-assembly 240 of spline dispensing head assembly 200. The swivel head gear home sensor 1046 is used to sense and reference the home position 64 for the spline swivel head rotation member 256 (circular rotation) of the rotating spline wheel sub-assembly 240 of the spline dispensing head assembly 200. The splining head x-axis home sensor 1048 is connected to the left tube end 303a of the rail support tube 302 by machine screws 202. The x-axis home sensor 1048 is used to sense and reference the home position 52 of the spline dispensing head assembly 200 and splining head splining head slide assembly 300. The splining head x-axis max travel sensor 1050 is connected to the right tube end 303b of the rail support tube 302 by machine screws 202. The x-axis max travel sensor 1050 is used to sense and reference the x-axis max travel distance or position 54 of the spline dispensing head assembly 200 and splining head splining head slide assembly 300. The y-axis home sensor 1052 is mounted and connected to the base main frame 114 by a mounting bracket 196a. The sliding carriage y-axis home sensor 1052 is used to sense and reference the home position 56 of the splining head splining head slide assembly 300. The y-axis max travel sensor 1054 is mounted and connected to the base main frame 114 by a mounting bracket 196b. The sliding carriage y-axis max travel sensor 1054 is used to sense and reference y-axis maximum travel distance 58 of the splining head splining head slide assembly 300. The rear frame clamping slide home sensor 1056 is mounted and connected to the base main frame 114 by a mounting bracket 136. The rear frame clamping slide home sensor 1056 is used to sense and reference the home position 60 of the rear frame clamping assembly 700. The clamping carriage home sensor 1058 is attached and connected to the base main frame 114 by a mounting bracket 136. The clamping carriage home sensor 1058 is used to sense and reference the home position 62 of the clamping slide carriage assembly 600. The y-axis frame sizing sensor 1060 is connected to the y-axis frame sizing sensor bracket 714 by a set screw 206. The y-axis frame sizing sensor 1060 is used to sense and reference the clamping push rod 712a, thereby sensing the width of the side edge 22/26 of the screen frame 16 along the y-axis direction 42. The x-axis frame sizing sensor 1062 is connected to the assembled front frame clamping finger support member 652 by a machine screw 202. The x-axis frame sizing sensor 1062 is used with the front clamping finger 640 to sense and reference the x-axis or length of side edge 24/28 of the screen frame 16.

Electro-Pneumatic Control System 1100

The electro-pneumatic control system 1100, as shown in FIGS. 1, 3, 5, 7, 20, 21, 24, 26 and 27 of the patent drawings, is used for the electro-pneumatic control of the various assemblies 100, 200, 300, 400, 500, 600, 700, 800 and 900. The electro-pneumatic control system 1100 provides the pressurized pneumatic air 1130 from the compressed air supply (compressor) 1126 in which to power and actuate the individual air cylinders 1102, 1104, 1106, 1108, 1110, 1112, 1114, 1116, 1118, 1120, 1122 and 1124, as well as to power and actuate the individual solenoid valves 1132, 1134, 1136, 1138, 1140, 1142, 1144, 1146, 1148, 1150, 1152 and 1154. The electro-pneumatic control system 1100 includes air lines P, A and B having pressurized air 1130 therein, at a regulated pressure of 80 psig via air regulator 1128, for activating various component parts within each of the major assemblies 100, 200, 300, 400, 500, 600, 700, 800 and 900, respectively.

Figure 21:
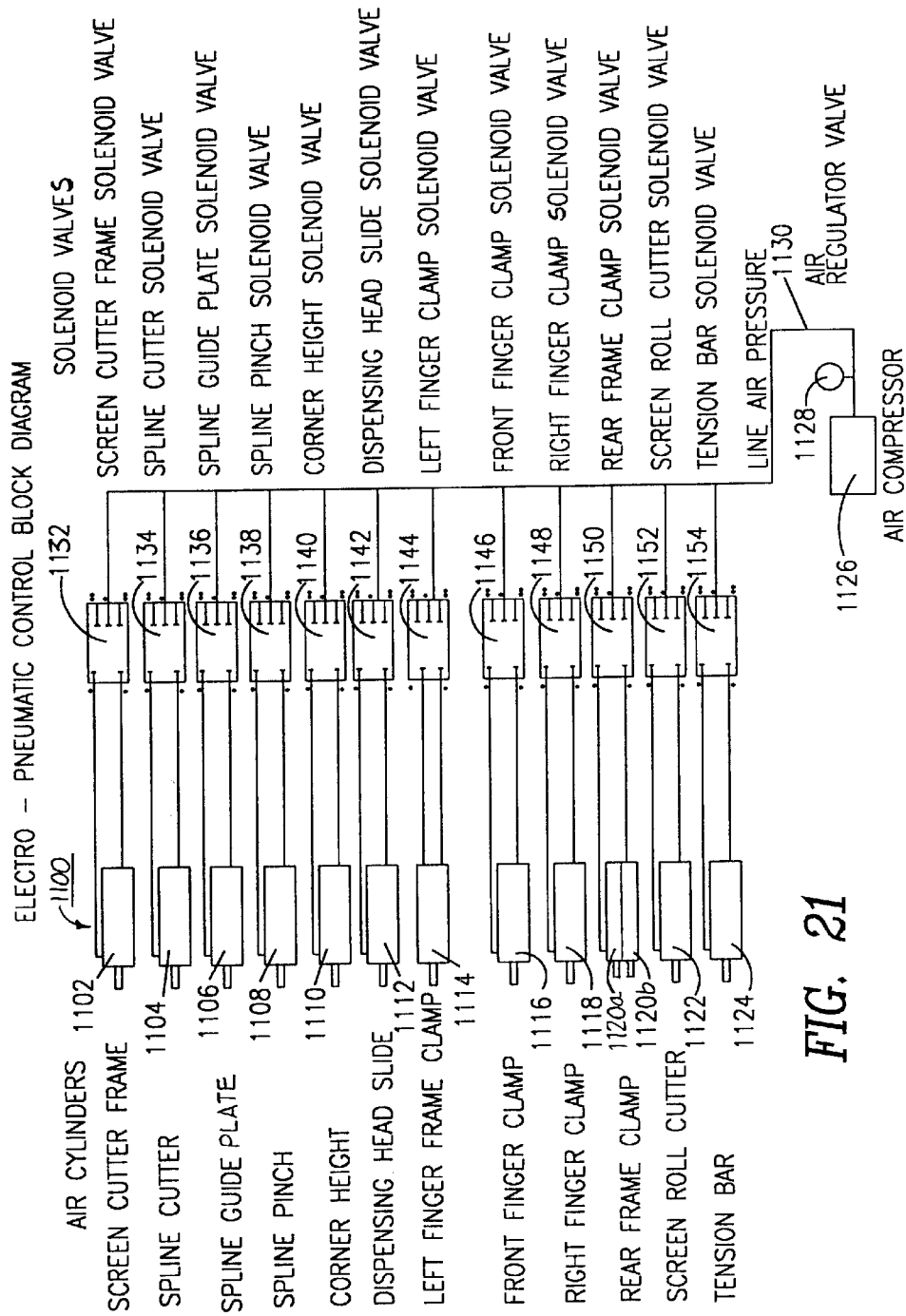
FIG. 21 is a schematic block diagram of the automated screening machine of the present invention showing the electro-pneumatic control system and its component parts contained therein.

These plurality of air cylinders include, as shown in FIG. 21, a screen cutter frame air cylinder 1102, a spline cutter air cylinder 1104, a spline guide plate air cylinder 1106, a spline pinch air cylinder 1108, a corner height air cylinder 1110, a dispensing head slide air cylinder 1112, a left finger frame clamp air cylinder 1114, a front finger clamp air cylinder 1116, a right finger clamp air cylinder 1118, a rear frame clamp air cylinder 1120, a screen roll cutter air cylinder 1122, and a tension bar air cylinder 1124.

The screen cutter frame air cylinder 1102 is connected to one end 290 of the screen cutter pivot bar 286 and to one end 292 of the pivot bar mounting bracket 288, as shown in FIG. 5. The screen cutter frame air cylinder 1102 is used to pivot the screen cutter pivot bar 286 in which to then push the screen cutter 282 into the screen retaining channel 18 of window screen frame 16 in order to cut away the excess screening material 14 away from the window screen frame sides 22, 24, 26 and 28. The spline cutter air cylinder 1104 is mounted to the spline feeder block 232 of spline dispensing head assembly 200 by machine screws 202, as shown in FIG. 5. The spline cutter air cylinder 1104 is used to push the spline cutter 230 into the splining material 12 in order to sever the splining material 12 at the end of the splining and screening cycle. The spline guide plate air cylinder 1106 is mounted and attached to the top and bottom spline guide plate mounting brackets 254 and 264, respectively, as shown in FIG. 5. The spline guide plate air cylinder 1106 is used to raise and lower the lower spline head guide plates 260a and 260b of the spline dispensing head assembly 200 in order to position the splining material 12 under the spline wheel 258. The spline pinch air cylinder 1108 is connected to the spline pinch feeder rear block 218 and to the spline feeder block 232 by machine bolts 204, as shown in FIG. 5. The spline pinch air cylinder 1108 is used to push the spline pinch idler wheel 214 and the spline pinch drive wheel 220, respectively, thereby moving the spline pinch feeder block 218 such that the spline pinch drive wheel 220 grips the splining material 12 for advancement.

The corner height air cylinder 1110 is mounted and connected to the height adjustment plate 322 of splining head splining head slide assembly 300 by machine screws 202, as shown in FIG. 7. The corner height air cylinder 1110 is used to raise and lower the head mount plate 326 of the splining head splining head slide assembly 300 from and to a secondary or corner height position 48 along the z-axis direction 44. The dispensing head slide air cylinder 1112 is mounted and connected to both the piston support plate 324 and the head mount plate 326 of splining head splining head slide assembly 300 by machine bolts 203, as depicted in FIG. 7. The dispensing head slide air cylinder 1112 is used to raise and lower the spline dispensing head assembly 200, as shown in FIGS. 2, 2C, 5 and 7 of the drawings.

Also, these plurality of solenoid valves include, as shown in FIG. 21, a screen cutter frame solenoid valve 1132, a spline cutter solenoid valve 1134, a spline guide plate solenoid valve 1136, a spline pinch solenoid valve 1138, a corner height solenoid valve 1140, a dispensing head slide solenoid valve 1142, a left finger clamp solenoid valve 1144, a front finger clamp solenoid valve 1146, a right finger clamp solenoid valve 1148, a rear frame clamp solenoid valve 1150, a screen roll cutter solenoid valve 1152, and a tension bar solenoid valve 1154.

The left finger frame clamp air cylinder 1114 is connected to a horizontal frame member 116l of base main frame 114 and connected to the pivot bar 544 by means of the mounting bracket 554 of the left finger frame clamp assembly 500, as shown in FIGS. 10 and 11. The left finger frame clamp air cylinder 1114 is used to pivot and move the left finger frame clamp assembly 500 such that the clamping heads 530a and 530b of the joined finger clamp collars 534a and 534b, respectively, clamp and hold the interior left side 26 of the widow screen frame 16 firmly in place. The front finger clamp air cylinder 116 is connected to a horizontal frame member 116f of base main frame 1114 and connected to the pivot bar 444 by means of the mounting bracket 454 of the front clamping finger assembly 400, as shown in FIGS. 8 and 9. The front finger clamp air cylinder 1116 is used to pivot and move the front clamping finger assembly 400 such that the plurality of clamping heads 430a to 430f of the joined finger clamp collars 434a and 434b, respectively, clamp and hold the interior front side 24 of the window screen frame 16 firmly in place. The right finger clamp air cylinder 1118 is connected to the right side clamping slide carriage assembly 600 and to the rear right clamping finger support member 652 by machine screws 202. The right finger clamp air cylinder 1118 is used to pivot the rear right clamping finger support member 652 in which to clamp and hold the interior right perimeter side 22 of screen frame 16 firmly in place. The rear frame clamp air cylinders 1120a and 1120b are each connected to the clamping slide bars 706a and 706b and the clamping push rods 712b and 712c, respectively, by a machine screw 202. The rear frame clamp air cylinders 1120a and 1120b are used to push and retract the push rods 712b and 712c, respectively, in which to move and retreat the rear frame clamping bar member 720 from the exterior rear perimeter side 28 of the window screen frame 16, as shown in FIG. 22. The screen roll cutter air cylinder (rodless air cylinder) 1122 is connected to the horizontal frame member 116l and to the pivot bar mounting plate 914 by machine bolts 204. The screen roll cutter air cylinder (rodless air cylinder) 1122 is used to move the cutter wheel 910 along the y-axis direction 42 in which to cut the tensioned screen material 14 from the screen material roll 14R. The tension bar air cylinder 1124 is connected to the outer end 818b of the left horizontal support member 814b by machine screws. The tension bar air cylinder 1124 is also connected to the pivot bar 832 by a machine screw 202. The tension bar air cylinder 1124 is used to rotate the screen tensioning bar 822, such that the screening material 14 within the screen tensioning slit 824 of the screen tensioning bar 822 is tensioned, as shown in FIG. 16, during the screening and splining operational cycle in order to apply the proper tension to the screening material 14 for eliminating wrinkling of the screening material 14 during the screening and splining process cycle. In addition, the tension bar air cylinder 1124 via the screen tensioning bar 822 will enable the cutter wheel 910 of the screen roll cutter assembly 900 to cut the screen material 14 from the screen material roll 14R after the screening and splining operational cycle has been completed.

The screen cutter frame solenoid valve 1132 is connected to the top wall surface 321 of the top solenoid bracket 320 by machine screws 202 being located at the inner most position. The screen cutter frame solenoid valve 1132 is used to change and reverse the flow direction of the compressed air 1130 (from air compressor 1126) to that of the screen cutter frame air cylinder 1102. The spline cutter solenoid valve 1134 is connected to the top wall surface 321 of the top solenoid bracket 320 by machine screws 202 being positioned between solenoid valves 1132 and 1136. The spline cutter solenoid valve 1134 is used to change and reverse the flow direction of the compressed air 1130 to that of the spline cutter air cylinder 1104. The spline guide plate solenoid valve 1136 is connected to the top wall surface 321 of the top solenoid bracket 320 by machine screws 202 being positioned between solenoid valves 1134 and 1138. The spline guide plate solenoid valve 1136 is used to change and reverse the flow direction of the compressed air 1130 to that of the spline guide plate air cylinder 1106. The spline pinch solenoid valve 1138 is connected to the top wall surface 321 of the top solenoid bracket 320 by machine screws 202 being positioned between solenoid valves 1136 and 1140. The spline pinch solenoid valve 1138 is used to change and reverse the flow direction of the compressed air 1130 to that of the spline pinch air cylinder 1108. The corner height solenoid valve 1140 is connected to the top wall surface 321 of the top solenoid bracket 320 by machine screws 202 being positioned between solenoid valves 1138 and 1142. The corner height solenoid valve 1140 is used to change and reverse the flow direction of the compressed air 1130 to that of the corner height air cylinder 1110. The dispensing head slide solenoid valve 1142 is connected to the top wall surface 321 of the top solenoid bracket 320 by machine screws 202 being located at the outer most position, as shown in FIGS. 6 and 7 of the drawings. The dispensing head slide solenoid valve 1142 is used to change and reverse the flow direction of the compressed air 1130 to that of the dispensing head slide air cylinder 1112.

The front finger clamp solenoid valve 1146 is connected to the interior compartment 1068 of the machine mounted control panel box 1064 by machine screws 202. The front finger clamp solenoid valve 1146 is used to change the air flow direction of the compressed air 1130 to the front finger clamp air cylinder 1116. The right finger clamp solenoid valve 1148 is connected to the interior compartment 1068 of the mounted control panel box 1064 by machine screws 202. The right finger clamp solenoid valve 1148 is used to change the air flow direction of the compressed air 1130 to the right finger clamp air cylinder 1118. The rear frame clamp solenoid valve 1150 is connected to the interior compartment 1068 of the mounted control panel box 1064 by machine screws 202. The rear frame clamp solenoid valve 1150 is used to change the air flow direction of the compressed air 1130 to each of the rear frame clamp air cylinders 1120a and 1120b, respectively. The screen roll cutter solenoid valve 1152 is connected to the interior compartment 1068 of the mounted control panel box 1064 by machine screws 202. The screen roll cutter solenoid valve 1152 is used to change the air flow direction of the compressed air 1130 to the screen roll cutter air cylinder 1122. The tension bar solenoid valve 1154 is connected to the interior compartment 1068 of the mounted control panel box 1064 by machine screws 202. The tension bar solenoid valve 1154 is used to change the air flow direction of the compressed air 1130 to the tension bar air cylinder 1124.

As shown in FIG. 21, the screen cutter frame solenoid valve 1132 is connected to the screen cutter frame air cylinder 1102 via air lines A and B. The spline cutter solenoid valve 1134 is connected to the spline cutter air cylinder 1104 via air lines A and B. The spline guide plate solenoid valve 1136 is connected to the spline guide plate air cylinder 1106 via air lines A and B. The spline punch solenoid valve 1138 is connected to the spline punch air cylinder 1108 via air lines A and B. The corner height solenoid valve 1140 is connected to the corner height air cylinder 1110 via air lines A and B. The dispensing head slide solenoid valve 1142 is connected to the dispensing head slide air cylinder 1112 via air lines A and B. The left finger clamp solenoid valve 1144 is connected to the left finger clamp air cylinder 1114 via air lines A and B. The front finger clamp solenoid valve 1146 is connected to the front finger clamp air cylinder 1116 via air lines A and B. The right finger clamp solenoid valve 1148 is connected to the right finger clamp air cylinder 1118 via air lines A and B. The rear frame clamp solenoid valve 1150 is connected to both the rear frame clamp air cylinders 1120*a* and 1120*b*, respectively via separate air lines A and B, respectively. The screen roll cutter solenoid valve 1152 is connected to the screen roll cutter air cylinder 1122 via air lines A and B. The tension bar solenoid valve 1154 is connected to the tension bar air cylinder 1124 via air lines A and B.

OPERATION OF THE PRESENT INVENTION

STEP A.

Start-up and Apparatus Initialization

When the power switch 1094 located on the movable control panel 1070 is switched to the "ON" position by the operator, electrical power enables the main contactor 1032 which then supplies power to the computer control module 1002, the main power supply 1004 and the servomotor controllers 1034, 1036, 1038, 1040, 1042 and 1044, as shown in FIG. 20 of the drawings. The operator then waits for the touch screen display 1082 to display "Press to Initialize", such that the operator then depresses the touch screen display 1082 to initialize apparatus 10.

The automatic screening apparatus 10 will initialize as follows:

The computer control module 1002 will send a signal to the rear clamping slide servomotor controller 1044 and this will then enable the rear clamping slide servomotor 170, such that the rear clamping slide servomotor 170 will rotate the rear frame clamp drive bar belt 166 which will rotate the rear frame drive bar 164. This action will then move the rear side frame clamp assembly 700 toward the rear frame clamping slide home sensor 1056. When the rear side frame clamp assembly 700 has reached the rear frame clamp home sensor 1056, the rear frame clamping slide servomotor 170 will stop. This is the home position 60 for the rear side frame clamp assembly 700. The next apparatus 10 movement is the clamping slide carriage assembly 600 going to a home position as follows: The computer control module 1002 will send a signal to the clamping carriage servomotor controller 1042 and this signal will enable the clamping carriage servomotor 154 such that the clamping carriage servomotor 154 will rotate the clamping carriage drive bar belt 150 which will in turn rotate the clamping carriage drive bar 148. This action will cause the right side clamping slide carriage assembly 600 to move toward the clamping carriage home sensor 1058. When the clamping slide carriage assembly 600 has reached the clamping carriage home sensor 1058, the clamping carriage servomotor 150 will stop. This is the home position 62 for the clamping carriage assembly 600.

The next apparatus 10 movement is the splining dispensing head assembly 200 will initialize to its y-axis home position 56 as follows: The computer control module 1004 will send a signal to the y-axis sliding carriage servomotor controller 1038 and this signal will enable the y-axis sliding carriage servomotor 190 such that the y-axis sliding carriage servomotor 190 will rotate the y-axis drive bar belt 186 which in turn will rotate the y-axis splining head drive bar 184. This action will then cause the splining head splining head slide assembly 300 to move toward the y-axis sliding carriage home sensor 1052. When the splining head splining head slide assembly 300 reaches the y-axis sliding carriage home sensor 1052, the y-axis sliding carriage servomotor 190 will stop. This is the y-axis home position 56 for the splining head splining head slide assembly 300. Next, the splining head splining head slide assembly 300 will initialize to its x-axis home position as follows: The computer control module 1004 will send a signal to the x-axis splining head servomotor controller 1036, this will enable the x-axis splining head servomotor 330 such that the x-axis splining head servomotor 330 will rotate the x-axis splining head drive belt 338. This action will move the splining head splining head slide assembly 300 toward the x-axis splining head home sensor 1048. When the splining head splining head slide assembly 300 has reached the x-axis splining head home sensor 1048, the splining head x-axis servomotor 330 will stop. This is the x-axis home position 52 for the splining head splining head slide assembly 300.

The final operation in the initialization step A will be to home the rotating spline swivel rotation member 256, this is accomplished as follows: The computer control 1004 will send a signal to the swivel servomotor controller 1034 and this will enable the swivel servomotor 242, such that the swivel servomotor 242 will rotate the swivel head gear 250. The swivel head gear 250 being connected to the spline swivel head rotation member 256 will rotate toward the swivel head gear home sensor 1046. The swivel head gear 250 and the spline swivel head rotation member 256 will continue to rotate until the swivel head gear home sensor 1046 aligns with the head gear home locating hole opening 253 in the swivel head gear 250, such that when this alignment occurs, the swivel servomotor 242 will stop. This is the home position 64 for the spline swivel head rotation member 256.

STEP B.

Figure 25:
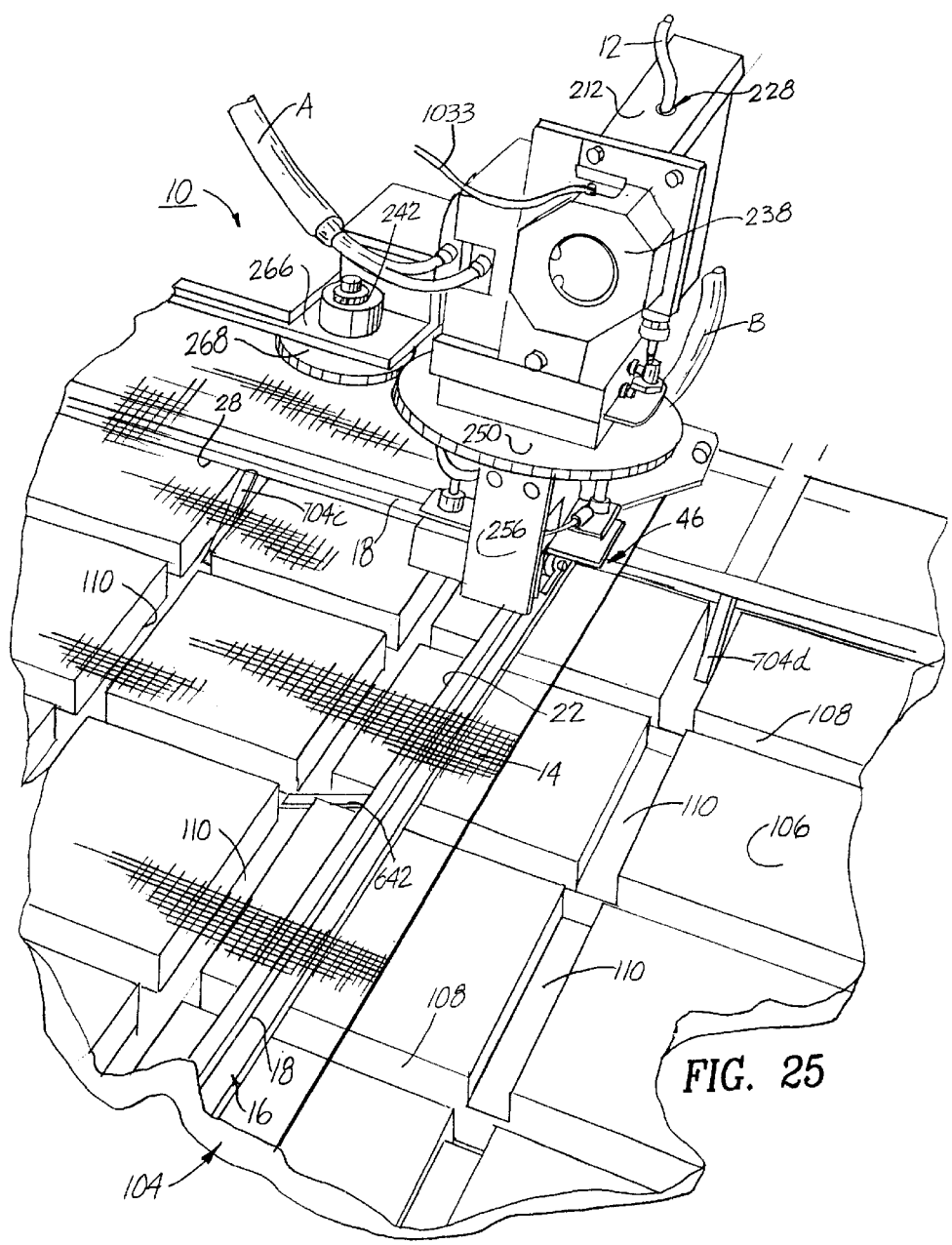
FIG. 25 is a perspective view of the automated screening machine of the present invention showing the initial insertion of splining material into the right side at the first corner of the screen frame via the spline dispensing head assembly.
Figure 26:
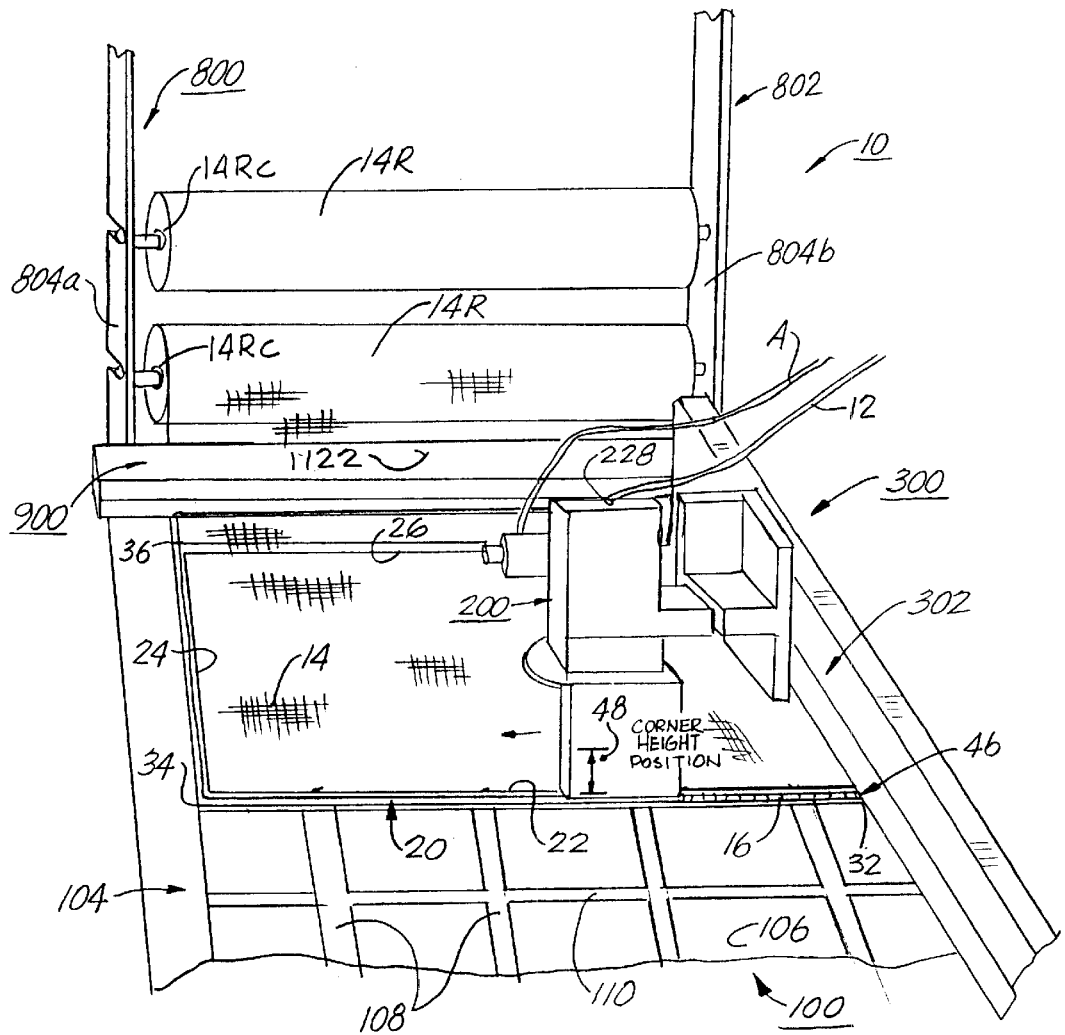
FIG. 26 is a perspective view of the automated screening machine of the present invention showing the insertion of splining material into the right side of the screen frame via the spline dispensing head assembly, and simultaneously cutting the excess screening material from the screen frame via the screen cutter knife of the spline dispensing head assembly.

Inserting the Screen Frame and Starting the Clamping Cycle Operational Process The operator installs screen roll material 14 by inserting the screen material holding rods 812*a* to 812*d* through the center hole 14R*c* of the rolls 14R of screen material 14. The rolls 14R of screen material 14 are then placed on to the screen tension/holder frame 802, as shown in FIG. 16. The operator then takes the screen material 14 and threads it through the screen tensioning slit 824 located on the screen tensioning bar 822, as shown in FIG. 16. The operator then places a roll 12R of spline material 12 onto the holding bar 350 of the spline roll holder 344. The operator then takes the spline material 12 from the spline material roll 12R and places it through the spline hole opening 228 in the spline feed cover 212, as shown in FIGS. 4, 25 and 26 of the drawings.

After the machine 10 initializes, the operator then inserts a screen frame 16 against the left and front side guides 125 and 126, respectively, of the L-shaped guide brace 129, as shown in FIG. 22. The operator then presses the touch screen display 1082 for initiating the "Clamp Start Button". The machine 10 will start the clamping cycle the screen frame 16 as follows: The computer control module 1002 will send a signal to the front finger clamp solid state relay 1020. This will enable the front finger clamp solenoid valve 1146, which will supply compressed air 1130 to the front finger clamp air cylinder 1116 which will push on pivot bar 444, rotating the front side clamping shaft 408 which will push on the clamping finger heads 430*a* to 430*e* of the formed finger clamp collars 434*a* to 434*e*, as shown in FIG. 22. This action has the clamping finger heads 430*a* to 430*e* clamping the interior front perimeter side edge 24 of the screen frame 16 against the front side guide 126 of the L-shaped guide brace 129.

The computer control module 1002 will next send a signal to the left finger frame clamp solid state relay 1018 and this will enable the left finger frame clamp solenoid valve 1144, which will then supply compressed air 1130 to the left finger frame clamp air cylinder 1114. The left finger frame clamp air cylinder 1114 will then push on pivot bar 544, rotating the left side shaft 508 which will push on the clamping finger heads 530 and 530b of the formed finger clamp collars 534a and 534b, as shown in FIG. 22. This action has the clamping finger heads 530a and 530b clamping the interior left perimeter side edge 26 of the screen frame 16 against the left side guide 125 of the L-shaped guide brace 129.

Next, the computer control module 1002 will send a signal to the rear frame clamp servomotor controller 1044, enabling the rear frame clamp servomotor 170. The rear frame clamp servomotor 170 will then rotate the rear frame clamping slide drive bar belt 166 which will then rotate the rear frame clamping slide drive bar 164, thereby moving the rear side frame clamping assembly 700 towards the interior rear perimeter side edge 28 of the screen frame 16. The rear side frame clamp assembly 700 will continue to move until the y-axis frame sizing sensor block 708 contacts the exterior perimeter side edge 28 of the screen frame 16. Upon this contact, the rear frame clamp assembly 700 will advance slightly further until the rear frame clamping finger heads 704a to 704d are on the interior rear perimeter side edge 28 of the screen frame 16. Next, the direction of the rear frame clamping slide servomotor 17 is reversed, thereby reversing the direction of the rear side frame clamp assembly 700. The rear frame clamping slide sub-assembly 160 will move a preset distance in this direction as to position the rear frame clamping finger heads 704a to 704d in contact with the interior perimeter side edge 28. Upon the completion of this operational step, a signal is sent from the computer control module 1002 to the rear frame clamp solid state relay 1024, which will enable the rear frame clamp solenoid valve 1150, thereby supplying the rear frame clamp air cylinders 1120a and 1120b with compressed inwardly air 1130. The rear frame clamp air cylinders 1120a and 1120b will move the push rods 712b and 712c, respectively, thereby moving the rear frame clamping member 720 inwardly against the outer exterior rear perimeter side edge 28 of the screen frame 16, which completes the rear frame clamping sequence.

Next, the computer control module 1002 will send a signal to the clamping carriage servomotor controller 1042, enabling the clamping carriage servomotor 154. The clamping carriage servomotor 154 will rotate the clamping carriage drive bar belt 150, thereby rotating the clamping bar carriage drive bar 148 of the clamping carriage sub-assembly 140, thus causing the right side clamping slide carriage assembly 600 to move towards the interior right side edge 26 of the screen frame 16. The right side clamping slide carriage assembly 600 will continue to move in this direction until the first upper clamping finger head 642 of the rear right clamping finger support member 652, as shown in FIGS. 12 and 12A of the drawings, contacts the outer/exterior right perimeter side edge 22 of the screen frame 16. Upon this contact, the first upper clamping finger head 642 will pivot and contact the x-axis frame sizing sensor 1062. Upon this contact, the right side clamping slide carriage assembly 600 will be advanced further until the first upper clamping finger head 642 and the second upper clamping finger head 672 are position on the interior right perimeter side edge 22 of the screen frame 16. At this point, as signal is sent from the computer control module 1002 to the right finger clamping finger solid state relay 1022 which will enable the right finger clamp solenoid valve 1148, thereby supplying compressed air 1130 to the right finger clamp air cylinder 1118. This pneumatic action will then pivot the second upper clamping finger head 672 into the clamping position and the direction of the clamping carriage servomotor 154 is reversed which allows the right side clamping slide carriage assembly 600 to be moved toward the interior right perimeter side edge 22 of the screen frame 16, until the first upper clamping finger head 642 and the second upper clamping finger head 672 are in contact with the interior right side edge 22 of screen frame 16, as depicted in FIGS. 22, 24 and 25 of the drawings. The operator then pulls the screen material 14 across the screen frame 16 via the screen tensioning bar 822, this then completes the clamping cycle operational step B.

Next, the operator then presses the "Cycle Start Button" on the touch screen display 1082 to start the splining process cycle. The computer control module 1002 will send a signal to the x-axis splining head servomotor controller 1036 and the y-axis splining head servomotor controller 1038, which will enable the x-axis splining head servomotor 330 and the y-axis sliding carriage servomotor 190 simultaneously, which will then move the spline dispensing head assembly 200 to the start position 46 on the first corner 32 and on side 22 of the screen frame 16, as shown in FIG. 25 of the drawings.

Figure 23:
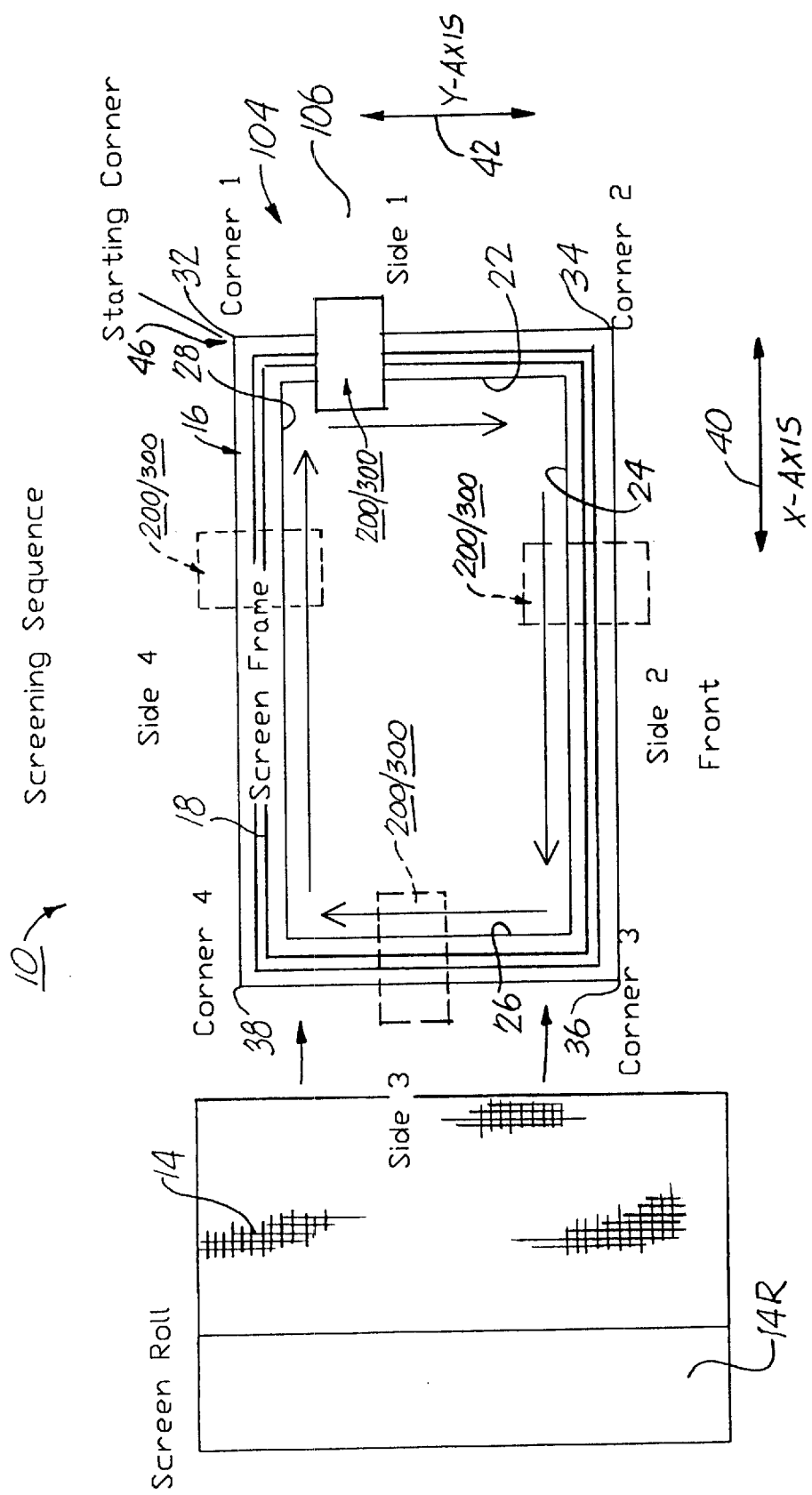
FIG. 23 is a schematic diagram of the automated screening machine of the present invention showing the screening sequence for inserting spline into the screen frame using the spline dispensing head assembly during the screening cycle operation.

Next, the computer control module 1002 will enable the dispensing head slide solid state relay 1016 which will enable the dispensing head slide solenoid valve 1142 and this will supply compressed air 1130 to the dispensing head slide air cylinder 1112, thereby lowering the spline dispensing head assembly 200 and placing the spline material 12 and the splining wheel 258 into the screen retaining groove/channel 18 located on the perimeter right side 22 of the screen frame 16, as shown in FIGS. 23, 25 and 26 of the drawings.

If the side width 22/26 of the screen frame 16 is of such dimension that the perimeter side rail 22 of the screen frame 16 is in line with the clamping finger heads 430a to 430e and 704a to 704d on the front clamping frame assembly 400 and the rear side frame assembly 700, respectively. The clamping finger heads 430a to 430e and 704a to 704d will pivot under the side rail 22 of screen frame 16, thereby preventing the clamping finger heads 430a to 430e and 704a to 704d, respectively, from lifting the screen frame 16 off of the upper table surface 106 of splining tabletop 104 when the clamping cycle had commenced.

STEP C.

Spline Processing Cycle for the Right Side of Screen Frame

In the next processing action, a signal is sent from the computer control module 1002 to the spline guide solid state relay 1010 and this will enable the spline guide plate solenoid valve 1136 to supply compressed air 1130 to the spline guide plate air cylinder 1106, thereby raising the spline head guide plates 260a and 260b off of the screen frame 16. Next, a signal is sent from the computer control module 1002 to the y-axis servomotor 190 which moves the spline dispensing head assembly 200 along the right perimeter side edge 22 of the screen frame 16. Simultaneously, a signal is sent from the computer control module 1004 to the screen cutter frame solid state relay 1006 which will enable the screen cutter frame solenoid valve 1132 to supply compressed air 1130 to the screen cutter frame air cylinder 1102, thereby pivoting the screen cutting wheel 282 into the screen retaining groove 18 within the screen frame 16. This will cut the screen material 14 within the screen retaining groove 18 in the screen frame 16 as the spline dispensing head assembly 200 is traveling towards the second corner 34. When the spline dispensing head assembly 200 reaches the second corner 34 of the screen frame 16, the y-axis sliding carriage servomotor 190 is stopped. After the y-axis sliding carriage servomotor 190 is stopped, the spline guide plate solenoid valve 1136 is disabled, thereby reversing the air flow of compressed air 1130 on the spline guide plate air cylinder 1106 which causes the spline head guide plates 260a and 260b to lower and contact the screen frame 16. Then a signal is sent to the corner height solid state relay 1014 from the computer control module 1002 which will then enable the corner height solenoid valve 1140 to supply compressed air 1130 to the corner height air cylinder 1110, thereby raising the spline dispensing head assembly 200 to a secondary or corner height position 48. Simultaneously, the screen cutter frame solenoid valve 1132 is disabled, thereby pivoting the screen cutter wheel 282 out of the screen retaining groove 18 of screen frame 16.

Next, a signal is sent from computer control module 1002 to enable the spline guide plate solenoid valve 1136 which will change the air flow direction of compressed air 1130 to the spline guide plate air cylinder 1106, thereby raising the spline head guide plates 260a and 260b. Next, a signal is sent to the swivel servomotor controller 1034 from computer control module 1004 which will enable the swivel servomotor 242 to rotate the swivel head gear 250 which is connected to the spline swivel head rotation member 256, causing it to rotate 90 degrees. Next, the spline guide plate solenoid valve 1136 is disabled causing the air flow of compressed air 1130 to be reversed to the spline guide plate air cylinder 1106 thereby lowering the spline head guide plates 260a and 260b Simultaneously, the corner height solenoid valve 1140 is disabled thereby reversing the flow of compressed air 1130 to the corner height air cylinder 1110 causing the spline dispensing head assembly 200 to lower. This action will again insert the spline material 12 and the splining wheel 258 into the screen retaining channel 18 along the front perimeter side edge 24 of the screen frame 16.

STEP D.

Spline Processing Cycle For the Front Side of Screen Frame

Next, a signal is sent from the computer control module 1002 to the spline guide plate solid state relay 1010 and this will enable the spline guide plate solenoid valve 1136 to supply compressed air 1130 to the spline guide plate air cylinder 1106 thereby raising the spline head guide plates 260a and 260b off of the screen frame 16. Next, a signal is sent to the x-axis splining head servomotor 330 from the computer control module 1104 which moves the spline dispensing head assembly 200 along the front perimeter side edge 24 of the screen frame 16. Simultaneously, a signal is sent to the screen cutter frame solid state relay 1006 from the computer control module 1002 which will enable the screen cutter frame solenoid valve 1132 to supply compressed air 1130 to the screen cutter frame air cylinder 1102, thereby pivoting the screen cutting wheel 282 into the screen retaining groove 18 within the screen frame 16. This pneumatic action will then cut the screen material 14 within the screen frame 16 as the spline dispensing head assembly 200 is traveling towards the third corner 36. When the spline dispensing head assembly 200 reaches the third corner 36 of the screen frame 16, the x-axis splining head servomotor 330 is stopped. After the x-axis splining head servomotor 330 is stopped, the spline guide plate solenoid valve 1136 is disabled thereby reversing the air flow direction of the compressed air 1130 to the spline guide plate air cylinder 1106. This pneumatic action causes the spline head guide plates 260a and 260b to lower and contact the screen frame 16. Then a signal is sent to the corner height solid state relay 1014 which will enable the corner height solenoid valve 1140 which will then supply compressed air 1130 to the corner height air cylinder 1110. This then raises the spline dispensing head assembly 200 to a secondary or corner height position 48. Simultaneously, the screen cutter frame solenoid valve 1132 is disabled, thereby pivoting the screen cutter wheel 282 out of the screen retaining groove 18 of screen frame 16.

Next, a signal is sent to enable the spline guide plate solenoid valve 1136 from the computer control module 1002 which will change the air flow direction of the compressed air 1130 to the spline guide plate air cylinder 1106, thereby raising the spline head guide plates 260a and 260b off of the screen frame 16. Next, a signal is sent to the swivel servomotor controller 1034 from computer control module 1004 which will enable the swivel servomotor 242 to rotate the swivel head gear 250 which is connected to the spline swivel head rotation member 256, causing it to rotate 90 degrees. Next, the spline guide plate solenoid valve 1136 is disabled causing the air flow direction of the compressed air 1130 to be reversed to the spline guide air cylinder 1106 thereby lowering the spline head guide plates 260a and 260b onto the screen frame 16. Simultaneously, the corner height solenoid valve 1140 is disabled thereby reversing the air flow direction of compressed air 1130 to the corner height air cylinder 1110 causing the spline dispensing head assembly 200 to lower. This action will again insert the spline material 12 and the splining wheel 258 into the screen retaining groove 18 along the left perimeter side edge 26 of the screen frame 16, as depicted in FIGS. 22, 23, 26 and 27 of the drawings.

STEP E.

Spline Processing Cycle for the Left Side of Screen Frame

Next, a signal is sent from the computer control module 1002 to the spline guide plate solid state relay 101 and this will enable the spline guide plate solenoid valve 1136 to supply compressed air 1130 to the spline guide plate air cylinder 1106, thereby raising the spline head guide plates 260a and 260b off of the screen frame 16. Next, a signal is sent to the y-axis sliding carriage servomotor 190 which moves the spline dispensing head assembly 200 along the left perimeter side 26 of the screen frame 16. Simultaneously, a signal is sent to the screen cutter frame solid state relay 1006 which will enable the screen cutter frame solenoid valve 1132 to supply compressed air 1130 to the screen cutter frame air cylinder 1102, thereby pivoting the screen cutting wheel 282 into the screen retaining groove 18 within the screen frame 16. This pneumatic action will then cut the screen material 16 within the screen frame 16 as the spline dispensing head assembly 200 is traveling towards the fourth corner 38. When the spline dispensing head assembly 200 reaches the fourth corner 38 of the screen frame 16, the y-axis sliding carriage servomotor 190 is stopped. After the y-axis sliding carriage servomotor 190 is stopped, the spline guide plate solenoid valve 1136 is disabled thereby reversing the air flow direction of the compressed air 1130 to the spline guide plate air cylinder 1106. This pneumatic action causes the spline head guide plates 260a and 260b to lower and contact the screen frame 16. Then a signal is sent to the corner height solid state relay 1014 which will then enable the corner height solenoid valve 1140 which will then supply compressed air 1130 to the corner height air cylinder 1110. Thereby raising the spline dispensing head assembly 200 to a secondary or corner height position 48. Simultaneously, the screen cutter frame solenoid valve 1132 is disabled thereby pivoting the screen cutter wheel 282 out of the screen retaining groove 18 of screen frame 16.

Next, a signal is sent to enable the spline guide plate solenoid valve 1136 from the computer control module 1004 which will change the air flow direction of the compressed air 1130 to the spline guide plate air cylinder 1106, thereby raising the spline head guides plates 260a and 260b off of the screen frame 16. Next, a signal is sent to the swivel servomotor controller 1034 from computer control module 1002 which will enable the swivel servomotor 242 to rotate the swivel head gear 250 which is connected to the spline swivel head rotation member 256, causing it to rotate 90 degrees. Next, the spline guide plate solenoid valve 1136 is disabled causing the air flow direction of the compressed air 1130 to be reversed to the spline guide plate air cylinder 1106 thereby lowering the spline head guide plates 260a and 260b onto the screen frame 16. Simultaneously, the corner height solenoid valve 1140 is disabled thereby reversing the air flow direction of compressed air 1130 to the corner height air cylinder 1110 causing the spline dispensing head assembly 200 to lower. This action will again insert the spline material 12 and the splining wheel 258 into the screen retaining groove 18 along the rear perimeter side edge 28 of the screen frame 16.

STEP F.

Spline Processing Cycle for the Rear Side of Screen Frame

Next, a signal is sent from the computer control module 1002 to the spline guide plate solid state relay 1010 and this will enable the spline guide plate solenoid valve 1136 to supply compressed air 1130 to the spline guide plate air cylinder 1106, thereby raising the spline head guide plates 260a and 260b off of the screen frame 16. Next, a signal is sent to the x-axis splining head servomotor 330 from the computer control module 1002 which moves the spline dispensing head assembly 200 along the rear perimeter side 28 of the screen frame 16. Simultaneously, a signal is sent to the screen cutter frame solid state relay 1006 from the computer control module 1002 which will enable the screen cutter frame solenoid valve 1132 to supply compressed air 1130 to the screen cutter frame air cylinder 1102, thereby pivoting the screen cutting wheel 282 into the screen retaining groove 18 within the screen frame 16. This pneumatic action will then cut the screen material 14 within the screen frame 16 as the spline dispensing head assembly 200 is traveling towards the first corner 32. When the spline dispensing head assembly 200 reaches a preset distance from the first corner 32 a signal is sent to the spline cutter solid state relay 1008 which will enable the spline cutter solenoid valve 1134. This pneumatic action will supply compressed air 1130 to the spline cutter air cylinder 1104. This action will then push the spline cutter knife/blade 230 through the spline material 12 thereby cutting it. The spline dispensing head assembly 200 continues to travel towards the first corner 32 inserting the spline material 12 and the screen material 14 into the screen retaining groove 18 of screen frame 16. When the spline dispensing head assembly 200 reaches the first corner 32, a signal is sent from the computer control module 1004 disabling the dispensing head slide solenoid valve 1142. This will change the air flow direction of the compressed air 1130 going to the dispensing head slide air cylinder 1112. This will raise the spline dispensing head assembly 200 to its full raised position 50. Simultaneously, a signal is sent to the screen roll cutter solid state relay 1026 from the computer control module 1002 which will enable the screen roll cutter solenoid valve 1152, to supply compressed air 1130 to the rodless air cylinder 1122. This will move the screen roll cutter assembly 900 and its associated screen roll cutting wheel 910 across the screen material 14 in which to cut the screen material 14 from the screen roll 14R. Next, a signal is sent to the swivel servomotor controller 1034 which will enable the swivel servomotor 242 to rotate the swivel head gear 250 which is connected to the spline swivel head rotation member 256, causing it to rotate back to the home position 64.

STEP G.

Unclamping The Screen Frame Procedure

The following unclamping actions occur simultaneously. The front finger clamp solid state relay 1020, causes the front frame clamp solenoid valve 1146, to reverse the air flow direction of the compressed air 1130 to the front frame clamp air cylinder 1116, thereby rotating the front side clamping shaft 408 which will move the clamping finger heads 430a to 430e away from interior front perimeter side edge 24 of the screen frame 16. The left frame clamp solid state relay 1018, causes the left finger clamp solenoid valve 1144, to reverse the air flow direction of the compressed air 1130 to the left finger clamp air cylinder 1114, thereby rotating the left side clamping shaft 508 which will move the clamping finger heads 530a and 530b away from interior left perimeter side edge 26 of the screen frame 16. The rear frame clamp solid state relay 1024, causes the rear frame clamp solenoid valve 1150, to reverse the air flow direction of the compressed air 1130 to the rear frame clamp air cylinders 1120a and 1120b, thereby moving the rear frame clamping member 720 away from the exterior rear perimeter side edge 28 of the screen frame 16. The right finger clamp solid state relay 1022, causes the right finger clamp solenoid valve 1148, to reverse the air flow direction of the compressed air 1130 to the right finger clamp air cylinder 1118, thereby pivoting the upper first clamping finger head 642 away from interior right side edge 22 of the screen frame 16. The operator then manually removes the completed screen frame 20 from the machine 10.

STEP H.

Reset for the Next Screen Frame

If the next window screen frame 16 is the same size as the previously screened and splined window screen frame 16, the clamping assemblies 400, 500, 600 and 700 remain in their present position. The new window screen frame 16 is simply reclamped and the screening and splining cycle process restarted at the starting corner position 46. If the next screen window frame 16 is a different size that the previously screened frame 16, then the spline dispensing head assembly 200 will be initialized back to its home position 30 as previously described. The splining head slide assembly 300, the rear frame clamp assembly 700 and the clamping carriage assembly 600 are returned to their home positions as previously described in the initialization procedure.

ADVANTAGES OF THE PRESENT INVENTION

Accordingly, an advantage of the present invention is that it provides for an improved automatic window screening machine that continuously and automatically applies spline to a window screen frame.

Another advantage of the present invention is that it provides for an automated window screening machine that automatically adjusts for different sized window screen frames.

Another advantage of the present invention is that it provides for an automated window screening machine that automatically clamps the window screen frame from the interior perimeter of the window screen frame to prevent bowing of the window screen frame.

Another advantage of the present invention is that it provides for an automated window screening machine that automatically inserts the spline and the window screen material into the spline groove on all four sides of the window screen frame in one cycle without turning the window screen frame.

Another advantage of the present invention is that it provides for an automated window screening machine that automatically is inserting one continuous piece of spline around the perimeter of the window screen frame.

Another advantage of the present invention is that it provides for an automated window screening machine that automatically trims the excess window screen material from the window screen frame and the screen roll.

A further advantage of the present invention is that it provides for an automated window screening machine that is simple to manufacture and assemble; and is also more cost efficient in operational use than previous automated window screening machines.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An automated screening and splining apparatus for continuously seating an elongated flexible spline material in a screen frame having a screen retaining channel along first, second, third and fourth perimeter sides and corners of the screen frame during a screening and splining cycle and defining a spline sealing area within the screen retaining channel for receiving spline material therein, and the screen frame having first, second, third and fourth perimeter edges, comprising:

a) a frame assembly having a work support for receiving and holding the screen frame thereon; said frame assembly including rectangular-shaped structural support means;

b) slide carriage means mounted on said structural support means having first moving means for latitudinal movement along a y-axis between a first position and a second position, and for latitudinal movement along the y-axis between a third position and fourth position; and said slide carriage means having second moving means for longitudinal movement along an x-axis between a second position and a third position, and for longitudinal movement along the x-axis between a fourth position and a first position;

c) a plurality of clamping means for holding at least one perimeter edge of the screen frame in position prior to and during said screening and splining cycle;

d) a plurality of bracing means for immobilizing at least one perimeter edge of the screen frame in position prior to said screening and splining cycle;

e) a spline dispensing head assembly mounted on said slide carriage means for supplying the spline material to the screen retaining channel of the screen frame in a continuous splining cycle, as said slide carriage means moves from said first position to said second position, to said third position, to said fourth position, and then returns to said first position in a continuous, uninterrupted cycle;

f) said spline dispensing head assembly including a spline feed sub-assembly for feeding the spline material and a screen material into the screen retaining channel of the screen frame as said slide carriage means and said spline dispensing head assembly moves along the first, second, third and fourth perimeter sides of the screen frame;

g) said spline dispensing head assembly including a rotating spline wheel sub-assembly for inserting and seating the spline material and the screen material into the screen retaining channel as said slide carriage means and said spline dispensing head assembly moves along the first, second, third and fourth perimeter sides and corners of the screen frame in a 90° degree arc in a continuous cycle during the screening and cycle;

h) said spline dispensing head assembly including a screen cutter sub-assembly for cutting the screen material as said screen cutter sub-assembly moves along the first, second, third and fourth perimeter sides, and for severing the spline material at said fourth position adjacent to the first corner after the spline material and screen material have been seated in the screen retaining channel of the screen frame; and i) sensor means for sensing and referencing the end of the screen frame at the fourth position adjacent to the first corner of the screen frame for stopping the movement of said spline dispensing head assembly at the fourth position.

2. An automated screening and splining apparatus in accordance with claim 1, wherein said work support includes a splining tabletop having said plurality of clamping means.

3. An automated screening and splining apparatus in accordance with claim 1, wherein said structural support means include a plurality of horizontal frame members and a plurality of vertical frame members connected together to form said rectangular-shaped structural support means.

4. An automated screening and splining apparatus in accordance with claim 2, wherein said plurality of bracing means includes a first bracing means, a second bracing means and a third bracing means connected to said work support for immobilizing said perimeter edges of the screen frame.

5. An automated screening and splining apparatus in accordance with claim 4, wherein said first bracing means includes a left side guide bar on said splining tabletop.

6. An automated screen and splining apparatus in accordance with claim 5, wherein said second bracing means includes a front side guide bar on said splining tabletop.

7. An automated screening and splining apparatus in accordance with claim 6, wherein said left side guide bar and said front side guide bar form an L-shaped guide brace for squaring the second perimeter side, the third perimeter corner and the third perimeter side of the screen frame prior to the screening and splining cycle.

8. An automated screening and splining apparatus in accordance with claim 7, wherein said L-shaped guide brace is movable away from the second perimeter side, the third perimeter corner and the third perimeter side for allowing said splining head slide assembly to move along the first, second, third and fourth perimeter sides and corners on the screen frame in a continuous cycle during said splining and screening process.

9. An automated screening and splining apparatus in accordance with claim 3, wherein said frame assembly includes a clamping carriage sub-assembly, a rear frame sub-assembly and a sliding carriage sub-assembly for cooperating with said slide carriage means for moving said plurality of clamping means.

10. An automated screening and splining apparatus in accordance with claim 8, wherein said slide carriage means includes a splining head slide assembly being mounted on said plurality of horizontal frame members.

11. An automated screening and splining apparatus in accordance with claim 9, wherein said splining head slide assembly includes a pair of x-axis guide rails being mounted on a rail support tube for moving said spline dispensing head assembly along the x-axis direction.

12. An automated screening and splining apparatus in accordance with claim 11, wherein said second moving means includes an x-axis splining head servomotor mounted on said rail support tube and for rotating an x-drive pulley connected to said splining head slide assembly.

13. An automated screening and splining apparatus in accordance with claim 10, wherein said splining head slide assembly includes a pair of sliding carriage y-axis drive belts being mounted on said horizontal frame members oriented in the y-axis direction.

14. An automated screening and splining apparatus in accordance with claim 10, wherein said sliding carriage sub-assembly is connected to and used in conjunction with said splining head slide assembly for moving said splining head assembly in the y-axis direction.

15. An automated screening and splining apparatus in accordance with claim 10, wherein sensor means for sensing and referencing the end of the screen frame at the fourth position includes an x-axis frame sizing sensor for sensing and referencing the precise length of the second and fourth perimeter edges of the screen frame along the x-axis for allowing said spline dispensing head assembly and said splining head slide assembly to travel along the fourth perimeter side of the screen frame in order to stop said and screening and splining cycle.

16. An automated screening and splining apparatus in accordance with claim 10, further including a second sensor for sensing and referencing said rotating spline wheel sub-assembly of said spline dispensing head assembly in a home position for initiating the inserting of the spline material and screen material at the first corner and first perimeter side of the screen frame in moving along the y-axis direction.

17. An automated screening and splining apparatus in accordance with claim 10, further including a third sensor for sensing and referencing said spline dispensing head assembly and said splining head slide assembly in a home position along the x-axis prior to the start of said screening and splining cycle.

18. An automated screening and splining apparatus in accordance with claim 10, further including a fourth sensor for sensing and referencing a maximum allowable distance along the x-axis that said splining head slide assembly may travel to seat the spline material within the screen retaining channel along the second and fourth perimeter sides of the screen frame during said screening and splining cycle.

19. An automated screening and splining apparatus in accordance with claim 10, further including a fifth sensor for sensing and referencing when said sliding carriage sub-assembly and said splining head slide assembly are in a home position along the y-axis prior to the start of said screening and splining cycle.

20. An automated screening and splining apparatus in accordance with claim 10, further including a sixth sensor for sensing and referencing a maximum allowable distance along the y-axis that said splining head slide assembly may travel to seat the spline material within the screen retaining channel along the first and third perimeter sides of the screen frame during said screening and splining cycle.

21. An automated screening and splining apparatus in accordance with claim 4, wherein said plurality of clamping means include a first frame clamping means, a second frame clamping means, a third frame clamping means and a fourth frame clamping means for clamping and holding an interior perimeter edge of the screen frame prior to and during said splining and screening cycle.

22. An automated screening and splining apparatus in accordance with claim 21, wherein said first frame clamping means includes a front clamping finger assembly having a plurality of clamping finger heads thereon for holding the interior of the second perimeter edge of the screen frame in position, while the exterior of the second perimeter edge of the screen frame is held in position against said first bracing means in order to immobilize the second perimeter side of the screen frame prior to and during said screening and splining cycle.

23. An automated screening and splining apparatus in accordance with claim 21, wherein said second frame clamping means includes a left side clamping finger assembly having a pair of clamping finger heads thereon for holding the interior of the third perimeter edge of the screen frame in position, while the exterior of the third perimeter edge of the screen frame is held in position against said second bracing means in order to immobilize the third perimeter side of the screen frame prior to and during said screening and splining cycle.

24. An automated screening and splining apparatus in accordance with claim 21, wherein said third frame clamping means includes a rear side frame clamping assembly having a plurality of clamping finger heads thereon for holding the interior of the fourth perimeter edge of the screen frame in position, while the exterior of the fourth perimeter edge of the screen frame is held in position against said third bracing means in order to immobilize the fourth perimeter side of the screen frame prior to and during said screening and splining cycle.

25. An automated screening and splining apparatus in accordance with claim 21, wherein said fourth frame clamping means includes a right side clamping slide carriage assembly having a pair of clamping finger head sections thereon for holding the interior of the first perimeter edge of the screen frame in position in order to immobilize the first perimeter side of the screen frame prior to and during said screening and splining cycle.

26. An automated screening and splining apparatus in accordance with claim 24, wherein said third bracing means includes a rear frame clamping bar member attached to said rear side frame clamping assembly for holding the exterior fourth perimeter edge of the screen frame in place in order to immobilize the fourth perimeter side of the screen frame prior to said screening and splining cycle.

27. An automated screening and splining apparatus in accordance with claim 24, wherein said rear frame sub-assembly is connected to and used in conjunction with said rear frame clamping assembly for moving said rear frame clamping assembly in the y-axis direction.

28. An automated screening and splining apparatus in accordance with claim 24, further including a seventh sensor for sensing and referencing when said rear side frame clamping assembly is in a home position along the y-axis prior to the start of the clamping cycle.

29. An automated screening and splining apparatus in accordance with claim 24, further including an ninth sensor for sensing and referencing the perimeter edge of the screen frame along the y-axis direction of the screen frame for automatically sizing the width of the screen frame in the y-axis direction, said ninth sensor being mounted on said rear side frame clamping assembly.

30. An automated screening and splining apparatus in accordance with claim 24, further including a sixth moving means being a rear frame clamping slide servomotor for rotating a rear frame clamping slide drive bar of a rear frame clamping slide sub-assembly and said rear side frame clamping assembly in order to move said rear side frame clamping assembly in the y-axis direction for the clamping of the interior of the fourth perimeter edge of the screen frame during the clamping cycle.

31. An automated screening and splining apparatus in accordance with claim 25, wherein said clamping carriage sub-assembly is connected to and used in conjunction with said right side clamping slide carriage assembly for moving said clamping slide carriage assembly in the x-axis direction.

32. An automated screening and splining apparatus in accordance with claim 25, further including an eighth sensor for sensing and referencing when a clamping carriage sub-assembly and said clamping slide carriage assembly are in a home position along the x-axis prior to the start of the clamping cycle.

33. An automated screening and splining apparatus in accordance with claim 25, further including a fifth moving means being a clamping carriage servomotor for rotating a clamping drive bar belt of a clamping carriage sub-assembly in order to move said clamping slide carriage assembly in the x-axis direction for the clamping of the interior of the first perimeter edge of the screen frame during the clamping cycle.

34. An automated screening and splining apparatus in accordance with claim 1, further including means for supplying screen material including a screen tensioning and screen roll holder assembly for dispensing screen material from a screen material roll held on a screen roll holder assembly.

35. An automated screening and splining apparatus in accordance with claim 34, wherein said screen tensioning and screen roll holder assembly includes a screen tensioning bar having a plurality of screen tensioning slits therein, such that screen material is received within one of said screen tensioning slits and is tensioned during said screening and splining cycle in order to apply a proper tension to the screen material for eliminating wrinkling of the screen material during said screening and splining cycle.

36. An automated screening and splining apparatus in accordance with claim 34, further including a screen roll cutter assembly having a cutter wheel knife for use in cutting the screen material in the y-axis direction from the screen roll being held on said screen roll holder assembly, such that said cutter wheel knife of said screen roll cutter assembly cuts the screen material from the screen material roll after said screening and splining cycle has been completed.

37. An automated screening and splining apparatus in accordance with claim 1, further including means for supplying spline material including a spline holder having a holder bar thereon for dispensing the spline material from a spline material roll being held on said holder bar on said spline holder, and being mounted on a splining head slide assembly.

38. An automated screening and splining apparatus in accordance with claim 1, wherein said first moving means includes a y-axis sliding carriage servomotor mounted on said frame assembly and for moving said spline dispensing head assembly in the y-axis direction.

39. An automated screening and splining apparatus in accordance with claim 1, further including a third moving means being a swivel servomotor for rotating and positioning said rotating spline wheel sub-assembly of said spline dispensing head assembly in order to guide and align the splining material and the screen material into the screen retaining channel as said rotating spline wheel sub-assembly proceeds along each of the first, second, third and fourth perimeter sides and perimeter corners of the screen frame.

40. An automated screening and splining apparatus in accordance with claim 1, further including a fourth moving means being a spline advance stepper motor for advancing the spline material through said spline feed sub-assembly of said spline dispensing head assembly in order to feed the spline material to the screen retaining channel of the screen frame as said spline feed sub-assembly moves along each of the first, second, third and fourth perimeter sides and perimeter corners of the screen frame.

41. An automated screening and splining apparatus in accordance with claim 1, further including an electronic control system for electronically controlling said screening and splining cycle of said apparatus.

42. An automated screening and splining apparatus in accordance with claim 41, wherein said electronic control system includes a computer control module, a power supply, a plurality of solid state relays being electronically connected to a plurality of actuating means, a plurality of servomotor controllers being electronically connected to a plurality of servomotors, a plurality of sensors for positioning said splining head slide assembly and said spline dispensing head assembly, and a control panel box and a portable and movable control panel cabinet.

43. An automated screening and splining apparatus in accordance with claim 42, wherein said mounted control panel box includes power control means and said plurality of actuating means.

44. An automated screening and splining apparatus in accordance with claim 43, wherein said power control means includes a power button for controlling said power supply, a main contactor and a reset button for sending electrical power from said power supply to said main contactor in order to lock said main contactor in the "ON" position.

45. An automated screening and splining apparatus in accordance with claim 44, wherein said power control means includes a power button for controlling said power supply, and an emergency stop button for allowing an operator to instantaneously stop said screening and splining cycle of said apparatus when a problem occurs.

46. An automated screening and splining apparatus in accordance with claim 44, wherein said signaling means includes a power-on light for signaling an operator that electrical power has been supplied to said main contactor and said apparatus is ready for operational use by the operator.

47. An automated screening and splining apparatus in accordance with claim 42, wherein said portable and movable control panel cabinet includes a touch screen display, power control means, signaling means, said plurality of solid state relays and said plurality of servomotor controllers.

48. An automated screening and splining apparatus in accordance with claim 47, wherein said touch screen display includes electronic control commands including press to initialize, cycle star button, reset start button, clamp start button, spline load, profile selection, debug and frame parameter changes for use by an operator.

49. An automated screening and splining apparatus in accordance with claim 42, wherein said plurality of solid state relays includes a screen cutter frame solid state relay, a spline cutter solid state relay, a spline guide plate solid state relay, a spline pinch solid state relay, a corner height solid state relay, a dispensing head slide solid state relay, a left finger clamp solid state relay, a front finger clamp solid state relay, a right finger clamp solid state relay, a rear frame clamp solid state relay, a screen roll cutter solid state relay, a tension bar solid state relay, and a main contactor solid state relay for electrically enabling said plurality of actuating means.

50. An automated screening and splining apparatus in accordance with claim 42, wherein said plurality of servomotor controllers include a swivel servomotor controller, an x-axis splining head servomotor controller, a spline advance feeder stepper motor controller, a clamping carriage servomotor controller and a rear frame clamping slide servomotor for electronically controlling said first, second, third, fourth, fifth and sixth moving means, respectively.

51. An automated screening and splining apparatus in accordance with claim 1, further including an electro-pneumatic air system for providing pneumatic air to a plurality of air cylinders and pistons within said splining apparatus.

52. An automated screening and splining apparatus in accordance with claim 51, wherein said electro-pneumatic air system includes a plurality of air lines, a compressor for supplying compressed air to a plurality of air lines; said plurality of actuating means connected to said plurality of air lines for controlling the air supply to said air cylinders and pistons in said apparatus.

53. An automated screening and splining apparatus in accordance with claim 52, wherein said plurality of actuating means include a screen cutter frame solenoid valve, a spline cutter solenoid valve, a spline guide plate solenoid valve, a spine pinch solenoid valve, a corner height solenoid valve, a dispensing head slide solenoid valve, a left finger clamp solenoid valve, a front finger clamp solenoid valve, a right finger clamp solenoid valve, a rear frame clamp solenoid valve, a screen roll clamp solenoid valve, a screen roll cutter solenoid valve and a tension bar cutter solenoid valve for changing and reversing the air flow direction of the compressed air from said air compressor.

54. An automated screening and splining apparatus in accordance with claim 51, wherein said plurality of air cylinders include a screen cutter frame air cylinder, a spline cutter air cylinder, a splining guide plate air cylinder, a spline pinch air cylinder, a corner height air cylinder, a dispensing head slide air cylinder, a left finger clamp air cylinder, a front finger clamp air cylinder, a right finger clamp air cylinder, a pair of rear frame clamp air cylinders, a screen roll cutter air cylinder and a tension bar air cylinder being used for moving, positioning and/or clamping of said spline dispensing head assembly, said splining head slide assembly, a front clamping finger assembly, a left side clamping finger assembly, a right side clamping slide carriage assembly, a rear side frame clamping assembly, a screen tensioning and screen roll holder assembly and a screen roll cutter assembly, respectively.

* * * * *